(12) United States Patent
Nikipelov et al.

(10) Patent No.: US 9,853,412 B2
(45) Date of Patent: Dec. 26, 2017

(54) RADIATION SOURCE

(71) Applicant: ASML Netherlands B.V., Veldhoven (NL)

(72) Inventors: Andrey Alexandrovich Nikipelov, Eindhoven (NL); Teis Johan Coenen, Vught (NL); Wouter Joep Engelen, Eindhoven (NL); Gerrit Jacobus Hendrik Brussaard, Boxtel (NL); Gijsbertus Geert Poorter, Veldhoven (NL); Erik Roelof Loopstra, Eindhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 15/502,462

(22) PCT Filed: Jul. 27, 2015

(86) PCT No.: PCT/EP2015/067159
§ 371 (c)(1),
(2) Date: Feb. 7, 2017

(87) PCT Pub. No.: WO2016/023740
PCT Pub. Date: Feb. 18, 2016

(65) Prior Publication Data
US 2017/0237225 A1 Aug. 17, 2017

(30) Foreign Application Priority Data

Aug. 15, 2014 (EP) ..................................... 14181152
Jun. 4, 2015 (EP) ..................................... 15170640

(51) Int. Cl.
*H01S 3/00* (2006.01)
*H01S 3/09* (2006.01)
(Continued)

(52) U.S. Cl.
CPC .......... *H01S 3/0903* (2013.01); *H01S 3/0959* (2013.01); *H01S 3/1103* (2013.01); *H01S 3/1024* (2013.01); *H01S 3/11* (2013.01)

(58) Field of Classification Search
CPC .... H01S 3/0903; H01S 3/0959; H01S 3/1103; H01S 3/1024; H01S 3/11
See application file for complete search history.

(56) References Cited

U.S. PATENT DOCUMENTS 5,029,172 A 7/1991 Edighoffer
5,805,620 A * 9/1998 Liu ....................... H01S 3/0903
                                                    372/2

(Continued)

OTHER PUBLICATIONS

International Search Report and Written Opinion dated Jun. 30, 2016 in corresponding International Patent Application No. PCT/EP2015/067159.

(Continued)

*Primary Examiner* — Kinam Park
(74) *Attorney, Agent, or Firm* — Pillsbury Winthrop Shaw Pittman LLP

(57) ABSTRACT

Passage through LINACs of electron bunches in their acceleration phase is coordinated with passage through the LINACs of electron bunches in their deceleration phase. Each successive pair of electron bunches are spaced in time by a respective bunch spacing, in accordance with a repeating electron bunch sequence. The electron source provides clearing gaps in the electron bunch sequence to allow clearing of ions at the undulator. The electron source provides the clearing gaps in accordance with a clearing gap sequence such that, for each of the plurality of energy recovery LINACS, and for substantially all of the clearing gaps: for each passage of the clearing gap through the LINAC in an acceleration phase or deceleration phase the clearing gap is coordinated with a further one of the clearing (Continued)

gaps passing through the LINAC in a deceleration phase or acceleration phase thereby to maintain energy recovery operation of the LINAC.

19 Claims, 21 Drawing Sheets

(51) Int. Cl.
  *H01S 3/0959* (2006.01)
  *H01S 3/11* (2006.01)
  *H01S 3/102* (2006.01)

(56) References Cited

U.S. PATENT DOCUMENTS

| | | | | |
|---|---|---|---|---|
| 2002/0191650 | A1* | 12/2002 | Madey | H04L 43/026 370/381 |
| 2005/0175042 | A1 | 8/2005 | Hajima | |
| 2014/0131594 | A1* | 5/2014 | Hidding | H05H 15/00 250/503.1 |
| 2015/0285749 | A1* | 10/2015 | Moncton | G01N 23/201 378/86 |
| 2015/0340834 | A1* | 11/2015 | Powers | H01S 3/0903 372/2 |
| 2016/0301180 | A1* | 10/2016 | Nikipelov | H01J 1/34 |
| 2016/0307659 | A1* | 10/2016 | Nanni | H01J 23/18 |

OTHER PUBLICATIONS

Georg H. Hoffstaetter et al., "Ion clearing in an ERL," Nuclear Instruments & Methods in Physics Research, Section A, vol. 557, No. 1, pp. 205-212 (Feb. 1, 2006).

T.O. Raubenheimer, "Ion Effects in Future Circular and Linear Accelerators," Proceedings of the 1995 Particle Accelerator Conference, IEEE, vol. 4, pp. 2752-2756 (May 1, 1995).

Y. Socol et al., "Compact 13.5-nm free-electron laser for extreme ultraviolet lithography," American Physical Society, vol. 14, No. 40702, pp. 040702-1-040702-7 (Apr. 25, 2011).

C. Pagani et al., "Design considerations of a MW-scale, high-efficiency, industrial-use, ultraviolet FEL amplifier," Nuclear Instruments & Methods in Physics Research, Section A, vol. 455, No. 3, pp. 733-758 (Dec. 11, 2000).

Eva Bozoki et al., "Ion Shaking in the 200 MeV XLS-Ring," EPAC 92: 3. European Particle Accelerator Conference, pp. 789-791 (Dec. 31, 1992).

* cited by examiner

RADIATION SOURCE

CROSS-REFERENCE TO RELATED APPLICATIONS

This application is the U.S. national phase entry of PCT patent application no. PCT/EP2015/067159, which was filed on Jul. 27, 2015, which claims the benefit of priority of European patent application no. 14181152.1 which was filed on Aug. 15, 2014 and of European patent application no. 15170640.5 which was filed on Jun. 4, 2015, and which are incorporated herein in their entireties by reference.

FIELD

The present invention relates to a free electron laser (FEL) radiation source, for example an FEL radiation source configured to produce radiation having a wavelength in a range 4 nm to 25 nm. The radiation source may, for example, be configured to provide radiation to a lithographic apparatus for projecting a pattern from a patterning device onto a substrate.

BACKGROUND

It is known to use free electron laser (FEL) radiation sources to produce radiation of a desired wavelength, in which an electron beam comprising a periodic sequence of electron bunches is passed through an undulator to generate the radiation. Such sources can be used to produce radiation in a range 4 nm to 25 nm, for example extreme ultra-violet (EUV) radiation.

In known FEL radiation sources, ions are produced from residual gas in the electron beam through collisional ionization. An expected rate of ion generation in EUV FEL sources with a beam energy of a few hundred MeV and a beam current of a few tens of mA is such that, in the absence of counter-measures, the electron beam could be fully neutralized (e.g. ion charge matches electron charge per meter of electron beam) in less than 10 seconds. As a result, emittance of electron bunches at the undulator could significantly exceed 10 mm mRad and conversion efficiency would be expected to drop more than ten times, thus effectively disabling the operation of the EUV FEL.

In order to counteract ion concentration build-up several strategies have been suggested, including placing extraction electrodes along the electron beam or implementing a beam current pattern with short additional gaps between selected pairs of electron bunches (also referred to as clearing gaps). The short additional gaps can also be thought of as representing missing bunches in the sequence of electron bunches. The use of clearing gaps is intended to give ions, otherwise trapped in the potential of the bunched electron beam, some time to drift away. The use of clearing gaps according to known suggestions may not completely remove trapped ions but may allow mitigation of fast ion instability which can be detrimental for FEL operation.

Known FEL sources include LINACs for accelerating (and decelerating) electron bunches before (and after) they pass through the undulator. Energy recovery LINACs can be used, which are usually designed to operate with a balanced cavity load close to zero (e.g. currents in accelerating and decelerating beams match, and energy extracted and deposited upon acceleration and deceleration almost match).

The use of clearing gaps between electron bunches may distort operation of energy recovery LINACs. In the case of a single-pass LINAC system it has been suggested in G. H. Hoffstaetter et al, Nuclear Instruments & Methods in Physics Research A, 557 (2006), 205-212 to match clearing gaps (e.g. trains of missing bunches) in accelerating and decelerating electron beams within LINAC modules in a single pass LINAC. The matching of clearing gaps in a single pass LINAC may be relatively straightforward, given that each electron bunch circulates once around a loop and only passes through the single LINAC once when it is accelerating and once when it is decelerating, and may be achieved by a requirement that missing bunches are provided at a suitable regular rate.

It is an aim of the present invention to provide an improved, or at least alternative, FEL radiation source and method of operation of such a source that can provide for reduction of ion build-up.

SUMMARY

According to an aspect of the invention, there are provided timing pattern design rules for electron source and design rules for path lengths within FEL radiation source such that beam current from the source is periodically interrupted and gaps, thus formed in the beam substantially overlap when co-propagate through multiple LINAC sections during acceleration and deceleration phases.

According to another aspect of the invention there is provided a free electron laser (FEL) radiation source comprising an electron source for generating bunches of electrons, a plurality of linear accelerators (LINACs) for accelerating and decelerating the bunches of electrons, an undulator configured such that in operation passage of the bunches of electrons through the undulator generates radiation at a desired wavelength, and a plurality of steering units for guiding the bunches of electrons along a desired electron bunch path between the electron source, the plurality of LINACs and the undulator. The FEL radiation source is configured to operate such that in operation:—each electron bunch passes along the electron bunch path from the electron source through each of the plurality of LINACs at least once during an acceleration phase, then passes through the undulator, then passes through the plurality of LINACs at least once during a deceleration phase; passage through the LINACs of electron bunches in their acceleration phase is co-ordinated with passage through the LINACs of electron bunches in their deceleration phase, to provide for energy recovery operation of the LINACs; and each successive pair of electron bunches are spaced in time by a respective bunch spacing, in accordance with a repeating electron bunch sequence. The electron source is configured to provide clearing gaps in the electron bunch sequence for allowing clearing of ions at the undulator, and the electron source is configured to provide the clearing gaps in accordance with a clearing gap sequence such that, for each of the plurality of energy recovery LINACS, and for substantially all of the clearing gaps:—for each passage of the clearing gap through the LINAC in an acceleration phase or deceleration phase the clearing gap is co-ordinated with a further one of the clearing gaps passing through the LINAC in a deceleration phase or acceleration phase thereby to maintain energy recovery operation of the LINAC. The clearing gaps in the electron bunch sequence may also provide clearing of ions at other parts of the electron beam path as well as in the undulator, for example in parts of the path where the electron beam is more focused than in other parts. Such parts of the path where the electron beam is more focused may comprise substantially straight sections of the path, for example one or more of a LINAC, a matching section before or after a bend, as well as the undulator.

In operation, each electron bunch may pass through each LINAC at least twice during an acceleration phase and at least twice during a deceleration phase.

The clearing gaps and the further one of the clearing gaps may be co-ordinated such that preceding and/or following electron bunches of the clearing gaps may have different phases during their passage through the LINACs, the difference may be approximately 180 degrees The electron bunch sequence may comprise a periodic electron bunch sequence and the clearing gaps may be provided by providing missing electron bunches from the periodic electron bunch sequence and/or or bunches that carry substantially lower charge than normal bunches of the sequence. For example, the bunches that carry substantially lower charge may carry less than 50% of the charge of a normal bunch of the sequence, optionally less than 20% of the charge of a normal bunch of the sequence, optionally less than 10% of the charge of the sequence. The bunches that carry substantially lower charge may carry substantially no charge.

The clearing gap sequence may be such that the clearing gaps are provided at a selected periodic rate that is dependent on the length of the electron bunch path, the electron bunch path may comprise a plurality of loops, and the length of one of the loops that includes the undulator may have a selected relationship to a length of at least one other of the loops, wherein the selected periodic rate and the selected relationship between loop lengths may be such as to provide for the co-ordination of the clearing gaps in operation.

The plurality of LINACs may comprise a first LINAC and a second LINAC, which may be arranged such that in operation each electron bunch passes through each of the first and second LINACs at least two times during an acceleration phase and at least two times during a deceleration phase and there is a point (Z) in a path of the electron bunches such that:

a distance (ZK) along the electron bunch path for an electron bunch in its deceleration phase from the point (Z) to the entrance (K) to the second LINAC for a first pass of the electron bunch in its deceleration phase through the second LINAC is substantially equal to a distance (BC) along the electron bunch path for an electron bunch in its acceleration phase from the exit (B) from the first LINAC to the entrance (C) to the second LINAC for a first pass of the electron bunch in its acceleration phase through the second LINAC;

a distance (DE) along the electron bunch path for an electron bunch in its acceleration phase from the exit (D) from the second LINAC to the entrance (E) to the first LINAC for a second pass of the electron bunch in its acceleration phase through the first LINAC is substantially equal to a distance (LM) along the electron bunch path for an electron bunch in its deceleration phase from the exit (L) from the second LINAC to the entrance (M) to the first LINAC for the first pass of the electron bunch in its deceleration phase through the first LINAC;

a distance (FG) along the electron bunch path for an electron bunch in its acceleration phase from the exit (F) from the first LINAC to the entrance (G) to the second LINAC for the first pass of the electron bunch in its acceleration phase through the second LINAC is substantially equal to a distance (NO) along the electron bunch path for an electron bunch in its deceleration phase from the exit (N) from the first LINAC to the entrance (O) to the second LINAC for the second pass of the electron bunch in its deceleration phase through the second LINAC;

a distance (HZ) along the electron bunch path for an electron bunch in its acceleration phase from the exit (H) of the second LINAC to the point (Z) in the undulator is substantially equal to a distance (PQ) along the electron bunch path for an electron bunch in its deceleration phase from the exit (P) from the second LINAC to the entrance (Q) to the first LINAC for the second pass of the electron bunch in its deceleration phase through the first LINAC.

The clearing gaps may be provided at a repetition rate R, and R or R*n (n is an integer) is substantially equal to one per AZ/c, where AZ is a distance along the electron bunch path from the entrance to the first LINAC for an electron bunch for its first passage through the first LINAC during its acceleration phase to said point (Z), and c is the average speed of the electron bunches along the electron bunch path.

For each pair of distances along the electron bunch path that are stated as being substantially equal (ZK=BC, DE=LM, FG=NO, HZ=PQ) a travel time of an electron bunch along one of those distances of the pair (ZK, DE, FG, or HZ) may substantially the same as, optionally different by less than +/−$\Delta L$/4 where $\Delta L$ is clearing gap duration, to the travel time of an electron bunch along the other of those distances of the pair (BC, LM, NO, PQ).

The source may be configured to operate such that two or three clearing gaps are present simultaneously on the electron bunch path.

The plurality of LINACs may comprise a first LINAC and a second LINAC, which may be arranged such that in operation each electron bunch passes through each of the first and second LINACs at least two times during an acceleration phase and at least two times during a deceleration phase and there is a point (Z) in the path of the electron bunches such that:

the distances AC, CE, EG, GZ, ZK, KM, MO and OQ are substantially equal, where:

AC is a distance along the electron bunch path for an electron bunch in its acceleration phase from the entrance (A) to the first LINAC to the entrance (C) to the second LINAC for a first pass of the electron bunch in its acceleration phase through the first and second LINACs;

CE is a distance along the electron bunch path for an electron bunch in its acceleration phase from the entrance (C) to the second LINAC to the entrance (E) to the first LINAC for a second pass of the electron bunch in its acceleration phase through the first LINAC;

EG is a distance along the electron bunch path for an electron bunch in its acceleration phase from the entrance (E) to the first LINAC to the entrance (G) to the second LINAC for a second pass of the electron bunch in its acceleration phase through the first and second LINACs;

GZ is a distance along the electron bunch path for an electron bunch in its acceleration phase from the entrance (G) to the second LINAC to a point (Z) in the undulator for a second pass of the electron bunch in its acceleration phase through the second LINAC;

KM is a distance along the electron bunch path for an electron bunch in its deceleration phase from the entrance (K) to the second LINAC to the entrance (M) to the first LINAC for a first pass of the electron bunch in its deceleration phase through the first and second LINACs;

MO is a distance along the electron bunch path for an electron bunch in its deceleration phase from the entrance (M) to the first LINAC to the entrance (O) to the second LINAC for a first pass of the electron bunch in its deceleration phase through the first LINAC;

OQ is a distance along the electron bunch path for an electron bunch in its deceleration phase from the entrance (O) to the second LINAC to the entrance (Q) to the first LINAC for a second pass of the electron bunch in its deceleration phase through the first and second LINACs.

The clearing gaps may be provided at a repetition rate R, and R or an integer multiple of R (R*n, n is an integer) may be substantially equal to one per AC/c, where c is the average speed of the electron bunches along the electron bunch path.

The source may be configured to operate such that eight or nine clearing gaps are present simultaneously on the electron bunch path.

Travel times of electron bunches along each of the distances AC, CE, EG, GZ, ZK, KM, MO and OQ may be substantially the same, optionally different by less than +/−ΔL/4, where ΔL is clearing gap duration.

The plurality of LINACs may comprise a first LINAC and a second LINAC, which may be arranged such that in operation each electron bunch passes through each of the first and second LINACs at least two times during an acceleration phase and at least two times during a deceleration phase and there is a point (Z) in the path of the electron bunches such that:

the distances AC, EG, ZK, and MO are substantially equal; and
the distances CE, GZ, KM and OQ are substantially equal,
where:

AC is a distance along the electron bunch path for an electron bunch in its acceleration phase from the entrance (A) to the first LINAC to the entrance (C) to the second LINAC for a first pass of the electron bunch in its acceleration phase through the first and second LINACs;

CE is a distance along the electron bunch path for an electron bunch in its acceleration phase from the entrance (C) to the second LINAC to the entrance (E) to the first LINAC for a second pass of the electron bunch in its acceleration phase through the first LINAC;

EG is a distance along the electron bunch path for an electron bunch in its acceleration phase from the entrance (E) to the first LINAC to the entrance (G) to the second LINAC for a second pass of the electron bunch in its acceleration phase through the first and second LINACs;

GZ is a distance along the electron bunch path for an electron bunch in its acceleration phase from the entrance (G) to the second LINAC to a point (Z) in the undulator for a second pass of the electron bunch in its acceleration phase through the second LINAC;

KM is a distance along the electron bunch path for an electron bunch in its deceleration phase from the entrance (K) to the second LINAC to the entrance (M) to the first LINAC for a first pass of the electron bunch in its deceleration phase through the first and second LINACs;

MO is a distance along the electron bunch path for an electron bunch in its deceleration phase from the entrance (M) to the first LINAC to the entrance (O) to the second LINAC for a first pass of the electron bunch in its deceleration phase through the first LINAC;

OQ is a distance along the electron bunch path for an electron bunch in its deceleration phase from the entrance (O) to the second LINAC to the entrance (Q) to the first LINAC for a second pass of the electron bunch in its deceleration phase through the first and second LINACs.

The clearing gaps may be provided at a repetition rate R, and R or an integer multiple of R (R*n, n is an integer) may be substantially equal to one per c/AE, where c is the average speed of the electron bunches along the electron bunch path.

The travel times of electron bunches along each of the distances AC, EG, ZK, and MO may be substantially the same, optionally different by less than +/−ΔL/4, where ΔL is clearing gap duration; and the travel times of electron bunches along each of the distances CE, GZ, KM and OQ may be substantially the same, optionally different by less than +/−ΔL/4, where ΔL is clearing gap duration.

Each clearing gap may be separated from the next clearing gap in the bunch sequence by a clearing gap repetition period, each clearing gap having a clearing gap duration, and a ratio of the clearing gap duration to a clearing gap repetition period may be between 5% and 20%, optionally substantially equal to 10%.

The clearing gaps may be provided at a clearing gap repetition rate, and the repetition rate may be in the range 0.5 MHz to 1.5 MHz, optionally substantially equal to 1 MHz.

Each of the clearing gaps may have a duration greater than 10 ns, optionally greater than 100 ns.

The electron bunches may have an electron bunch duration in a range 10 fs to 10 ps (when measured at the electron source)

The electron bunches may be provided at a bunch repetition rate in a range 100 MHz to 1 GHz.

The electron bunches may follow a bunch path and the length of the bunch path for each of the bunches between the electron source and the exiting of a last of the LINACs by the bunch for a final time may be in a range 500 m to 1500 m, optionally around 800 m.

The undulator may be configured such that in operation passage of the bunches of electrons through the undulator generates radiation at a wavelength in a range 4 nm to 25 nm.

In a further aspect of the invention, which may be provided independently, there is provided a lithographic system comprising a radiation source as claimed or described herein, and a lithographic apparatus arranged to receive radiation from the radiation source and to use the radiation to project a pattern from a patterning device onto a substrate.

In a further aspect of the invention, which may be provided independently, method of operation free electron laser (FEL) radiation source that comprises an electron source for generating bunches of electrons, a plurality of linear accelerators (LINACs) for accelerating and decelerating the bunches of electrons, an undulator configured such that in operation passage of the bunches of electrons through the undulator generates radiation at a desired wavelength, and a plurality of steering units for guiding the bunches of electrons along a desired electron bunch path between the electron source, the plurality of LINACs and the undulator. The method comprises operating the FEL radiation source such that in operation:—each electron bunch passes along the electron bunch path from the electron source through each of the plurality of LINACs at least once during an acceleration phase, then passes through the undulator, then passes through the plurality of LINACs at least once during a deceleration phase. Passage through the LINACs of electron bunches in their acceleration phase is co-ordinated with passage through the LINACs of electron bunches in their deceleration phase, to provide for energy recovery operation of the LINACs. Successive pairs of electron bunches are spaced in time by a respective bunch spacing, in accordance with a repeating electron bunch sequence. Clearing gaps are provided in the electron bunch sequence for allowing clearing of ions at the undulator. The method comprises providing the clearing gaps in accordance with a clearing gap sequence such that, for each of the plurality of energy recovery LINACS, and for substantially all of the clearing gaps for each passage of the clearing gap through the LINAC in an acceleration phase or deceleration phase the clearing gap is co-ordinated with a further one of the clearing gaps passing through the LINAC in a deceleration phase or acceleration phase thereby to maintain energy recovery operation of the LINAC.

In a further aspect of the invention there is provided a method of producing extreme ultraviolet (EUV) radiation using a free electron laser (FEL), the method comprising directing a drive laser beam onto a cathode to generate electron bunches, passing the electron bunches to a linear accelerator (LINAC) to accelerate the electron bunches, passing the electron bunches along an electron bunch path through an undulator configured to generate EUV radiation, the method further comprising removing positively charged ions from the electron bunch path by applying a variation of charge or emittance of the electron bunches within a pre-determined range, wherein the pre-determined range of charge or emittance variation is selected to restrict variation of accelerating gradients in the LINAC.

The method is advantageous because it remove ions from the FEL without for example requiring the use of extraction electrodes.

The pre-determined range of the variation of charge or emittance of the electron bunches may be 10% or less of the charge or emittance of the electron bunches.

The variation may be applied to both the charge and the emittance of the electron bunches.

The applied variation may be implemented by altering the energy of laser pulses of the drive laser beam which are incident upon the cathode.

Altering the energy of laser pulses of the drive laser beam may comprise an amplification of noise associated with the drive laser.

A Pockels cell may be used to alter the energy of pulses of the drive laser.

A wavefront of pulses produced by the drive laser may be varied.

A Pockels cell may be used to vary the wavefront of pulses produced by the drive laser.

The temperature of the cathode may be varied to apply the variation of emittance of the electron bunches.

A laser incident on the cathode may be used to vary the temperature of the cathode.

In a further aspect of the invention there is provided a free electron laser (FEL) extreme ultraviolet (EUV) radiation source comprising a drive laser configured to emit laser pulses, a cathode configured to receive the laser pulses and generate electron bunches, a linear accelerator (LINAC) configured to accelerate the electron bunches, and an undulator configured to receive the electron bunches and output an EUV radiation beam, wherein the FEL further comprises an ion removal apparatus which comprises an electron bunch charge or emittance variation apparatus controlled by a control unit to vary the charge or emittance of the electron bunches within a pre-determined range, the pre-determined range being selected to remove ions from the FEL but restrict variation of accelerating gradients in the LINAC.

This is advantageous because it remove ions from the FEL without for example requiring the use of extraction electrodes.

The pre-determined range of the variation of charge or emittance of the electron bunches may be 10% or less of the charge or emittance of the electron bunches.

The variation may be applied to both the charge and the emittance of the electron bunches.

The applied variation may be implemented by altering the energy of laser pulses of the drive laser beam which are incident upon the cathode.

Altering the energy of laser pulses of the drive laser beam may comprise an amplification of noise associated with the drive laser.

A Pockels cell may be used to alter the energy of pulses of the drive laser.

A wavefront of pulses produced by the drive laser may be varied.

A Pockels cell may be used to vary the wavefront of pulses produced by the drive laser.

The temperature of the cathode may be varied to apply the variation of emittance of the electron bunches.

A laser incident on the cathode may be used to vary the temperature of the cathode.

In a further aspect of the invention there is provided a free electron laser (FEL) extreme ultraviolet (EUV) radiation source comprising a linear accelerator (LINAC) configured to accelerate electron bunches and an undulator configured to receive the electron bunches and output an EUV radiation beam; wherein the FEL further comprises an RF electromagnetic wave emitter configured to provide an RF evanescent electromagnetic wave or a beating RF electromagnetic wave which extends into a beam pipe of the FEL.

This is advantageous because it allows ions to be pushed along the beam pipe to a point where they may be extracted, and as a result the ions spend less time in the beam pipe.

The RF electromagnetic wave emitter may be connected to the beam pipe on one side of an undulator module of the undulator.

Extraction electrodes may be provided on an opposite side of the undulator module.

In a further aspect of the invention there is provided a method of producing extreme ultraviolet (EUV) radiation using a free electron laser (FEL), the method comprising passing electron bunches to a linear accelerator (LINAC) to accelerate the electron bunches then passing the electron bunches along an electron bunch path through an undulator configured to generate EUV radiation, the method further comprising generating an RF evanescent electromagnetic wave or a beating RF electromagnetic wave which extends into a beam pipe of the FEL and which pushes the ions along the beam pipe.

This is advantageous because it allows ions to be pushed along the beam pipe to a point where they may be extracted, and as a result the ions spend less time in the beam pipe.

The beam pipe into which the RF evanescent electromagnetic wave or beating RF electromagnetic wave extends may be located in an undulator module.

The RF evanescent electromagnetic wave or beating RF electromagnetic wave may provide an electrical potential which pushes ions towards an opposite end of the undulator module.

Extraction electrodes may be provided at that opposite side of the undulator module.

The electrical potential may have a sufficiently high gradient to remove ions from the free electron laser within around 1 ms.

Aspects and/or features of the invention set out above or below may be combined with other aspects and/or features of the invention as will be readily apparent to the skilled person.

BRIEF DESCRIPTION OF THE DRAWINGS

Embodiments of the invention will now be described, by way of example only, with reference to the accompanying schematic drawings, in which:

FIGS. 9 to 15 are schematic illustrations showing the progress of pair of clearing gaps along an electron bunch path according to a second mode of operation of the free-electron laser radiation source of FIG. 7;

DETAILED DESCRIPTION

Figure 1:
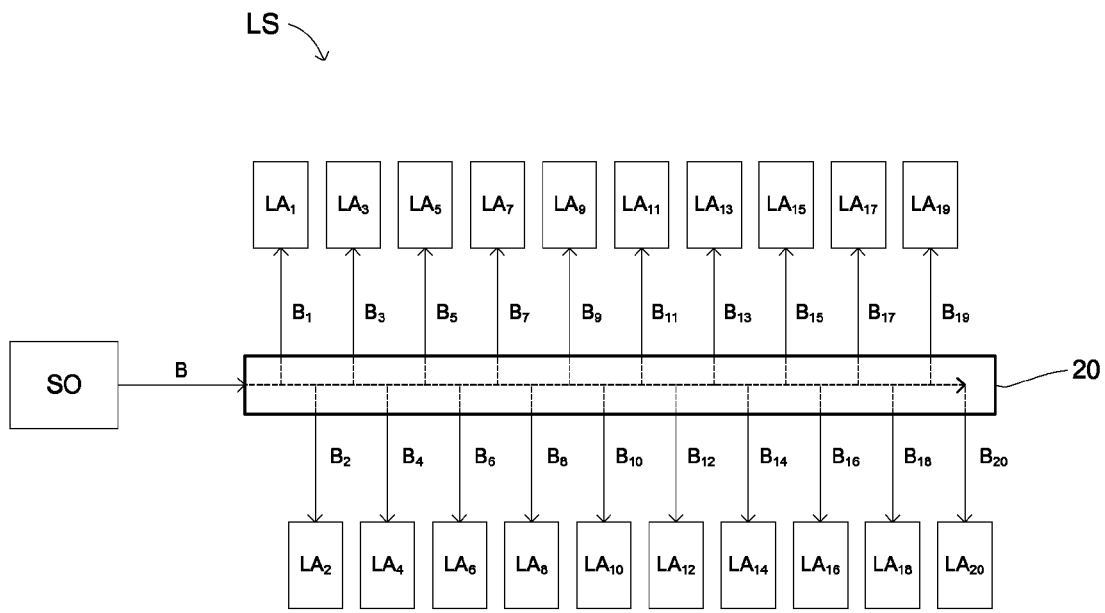
FIG. 1 is a schematic illustration of a lithographic system comprising a radiation source and a plurality of lithographic apparatus.

FIG. 1 shows a lithographic system LS, comprising: a radiation source SO, a beam splitting apparatus 20 and a plurality of lithographic apparatus $LA_1$-$LA_{20}$. The radiation source SO comprises at least one free electron laser and is configured to generate an extreme ultraviolet (EUV) radiation beam B (which may be referred to as a main beam). The main radiation beam B is split into a plurality of radiation beams $B_1$-$B_{20}$ (which may be referred to as branch beams), each of which is directed to a different one of the lithographic apparatus $LA_1$-$LA_{20}$, by the beam splitting apparatus 20. The branch radiation beams $B_1$-$B_{20}$ may be split off from the main radiation beam B in series, with each branch radiation beam being split off from the main radiation beam B downstream from the preceding branch radiation beam. The beam splitting apparatus may, for example, comprise a series of mirrors (not shown) which are each configured to split off a portion of the main radiation beam B into a branch radiation beam $B_1$-$B_{20}$.

The branch radiation beams $B_1$-$B_{20}$ are depicted in FIG. 1 as being split off from the main radiation beam B such that the branch radiation beams $B_1$-$B_{20}$ propagate in directions which are approximately perpendicular to the direction of propagation of the main radiation beam B. However, in some embodiments the branch radiation beams $B_1$-$B_{20}$ may instead be split off from the main radiation beam B such that an angle between the direction of propagation of each branch radiation beam $B_1$-$B_{20}$ and the direction of propagation of the main radiation beam is substantially less than 90 degrees. This may allow mirrors of the beam splitting apparatus to be arranged such that the main radiation beam B is incident on the mirrors at an angle of incidence which is less than normal. This may advantageously decrease the amount of radiation which is absorbed by the mirrors and therefore increase the amount of radiation which is reflected from the mirrors and which is provided to the lithographic apparatus $LA_1$-$LA_{20}$ via the branch radiation beams $B_1$-$B_{20}$.

The lithographic apparatus $LA_1$-$LA_{20}$ may all be positioned on the same vertical level. The vertical level on which the lithographic apparatus $LA_1$-$LA_{20}$ are positioned may be substantially the same vertical level as the vertical level on which the beam splitting apparatus 20 is positioned and on which the main beam B is received from the radiation source SO. Alternatively, the beam splitting apparatus 20 may direct at least some of the branch radiation beams $B_1$-$B_{20}$ to one or more different vertical levels on which at least some of the lithographic apparatus $LA_1$-$LA_{20}$ are positioned. For example, the main radiation beam B may be received by the beam splitting apparatus on a basement or ground floor vertical level. The beam splitting apparatus 20 may direct at least some branch radiation beams $B_1$-$B_{20}$ to a vertical level which is positioned above the beam splitting apparatus and on which at least some of the lithographic apparatus $LA_1$-$LA_{20}$ are positioned. The lithographic apparatus $LA_1$-$LA_{20}$ may be positioned on multiple vertical levels and as such the beam splitting apparatus 20 may direct the branch radiation beams $B_1$-$B_{20}$ to different vertical levels in order to be received by the lithographic apparatus $LA_1$-$LA_{20}$.

The radiation source SO, beam splitting apparatus 20 and lithographic apparatus $LA_1$-$LA_{20}$ may all be constructed and arranged such that they can be isolated from the external environment. A vacuum may be provided in at least part of the radiation source SO, beam splitting apparatus 20 and lithographic apparatus $LA_1$-$LA_{20}$ so as to minimise the absorption of EUV radiation. Different parts of the lithographic system LS may be provided with vacuums at different pressures (i.e. held at different pressures which are below atmospheric pressure).

Figure 2:
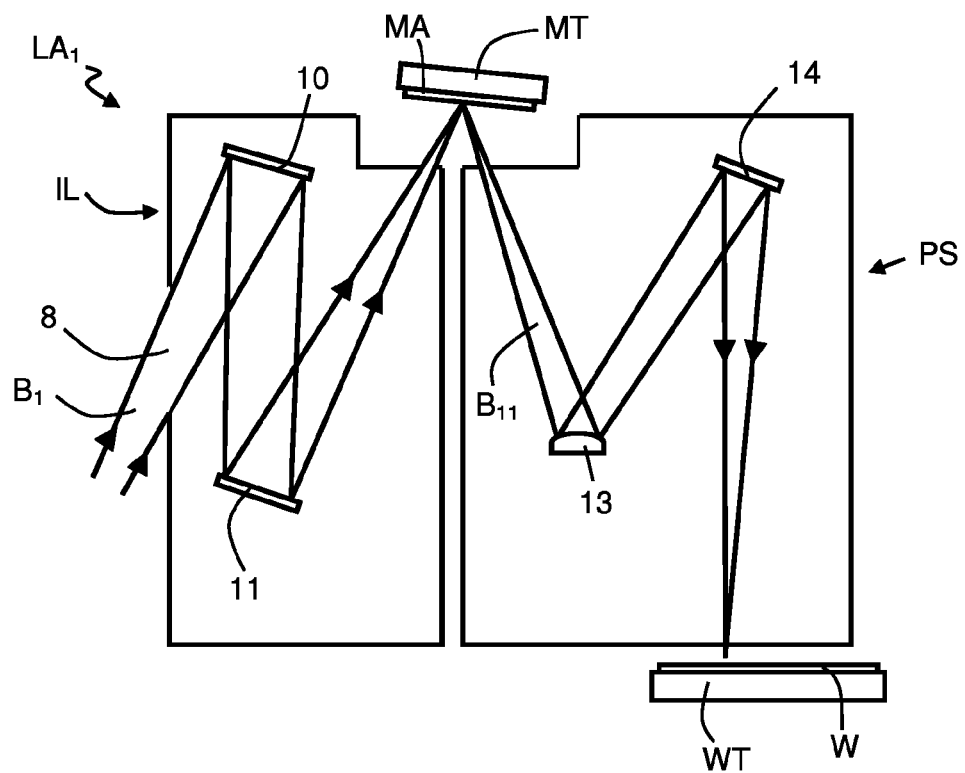
FIG. 2 is a schematic illustration of a lithographic apparatus that forms part of the lithographic system of FIG. 1.

FIG. 2 is a schematic depiction of a lithographic apparatus $LA_1$ of the lithographic system LS shown in FIG. 1. The lithographic apparatus $LA_1$ comprises an illumination system IL, a support structure MT configured to support a patterning device MA (e.g. a mask), a projection system PS and a substrate table WT configured to support a substrate W. The illumination system IL is configured to condition the branch radiation beam $B_1$ that is received by the lithographic apparatus $LA_1$ before it is incident upon the patterning device MA. The projection system PS is configured to project the branch radiation beam $B_1$ (now patterned by the mask MA) onto the substrate W. The substrate W may include previously formed patterns. Where this is the case, the lithographic apparatus aligns the patterned radiation beam $B_1$ with a pattern previously formed on the substrate W.

The branch radiation beam $B_1$ that is received by the lithographic apparatus $LA_1$ passes into the illumination system IL from the beam splitting apparatus 20 through an opening 8 in an enclosing structure of the illumination system IL. Optionally, the branch radiation beam $B_1$ may be focused to form an intermediate focus at or near to the opening 8.

The illumination system IL may include a facetted field mirror device 10 and a facetted pupil mirror device 11. The faceted field mirror device 10 and faceted pupil mirror device 11 together provide the radiation beam $B_1$ with a desired cross-sectional shape and a desired angular distribution. The radiation beam $B_1$ passes from the illumination system IL and is incident upon the patterning device MA held by the support structure MT. The patterning device MA reflects and patterns the radiation beam to form a patterned beam $B_{11}$. The illumination system IL may include other mirrors or devices in addition to or instead of the faceted field mirror device 10 and faceted pupil mirror device 11. The illumination system IL may for example include an array of independently moveable mirrors. The independently moveable mirrors may for example measure less than 1 mm across. The independently moveable mirrors may for example be MEMS devices.

Following reflection from the patterning device MA the patterned radiation beam $B_{11}$ enters the projection system PS. The projection system comprises a plurality of mirrors 13, 14 which are configured to project the radiation beam $B_{11}$ onto a substrate W held by the substrate table WT. The projection system PS may apply a reduction factor to the radiation beam, forming an image with features that are smaller than corresponding features on the patterning device MA. A reduction factor of 4 may for example be applied. Although the projection system PS has two mirrors 13, 14 in FIG. 2, the projection system may include any number of mirrors (e.g. six mirrors).

In some embodiments a lithographic system LS may include one or more mask inspection apparatus (not shown). A mask inspection apparatus may include optics (e.g. mirrors) configured to receive a branch radiation beam $B_1$-$B_{20}$ from the beam splitting apparatus 20 and direct the branch radiation beam at a mask MA. The mask inspection apparatus may further include optics (e.g. mirrors) configured to collect radiation reflected from the mask and form an image of the mask at an imaging sensor. The image received at the imaging sensor may be used to determine one or more properties of the mask MA. The mask inspection apparatus may, for example, be similar to the lithographic apparatus LA1 shown in FIG. 2, with the substrate table WT replaced with an imaging sensor.

In some embodiments a lithographic system LS may include one or more Aerial Image Measurement System (AIMS) which may be used to measure one or more properties of a mask MA. An AIMS may, for example, be configured to receive a branch radiation beam $B_1$-$B_{20}$ from the beam splitting apparatus 20 and use the branch radiation beam $B_1$-$B_{20}$ to determine one or more properties of a mask MA.

The radiation source SO comprises a free electron laser FEL which is operable to produce a beam of EUV radiation. Optionally, the radiation source SO may comprise more than one free electron laser FEL.

A free electron laser comprises an electron source, which is operable to produce a bunched relativistic electron beam, and a periodic magnetic field through which the bunches of relativistic electrons are directed. The periodic magnetic field is produced by an undulator and causes the electrons to follow an oscillating path about a central axis. As a result of the acceleration caused by the magnetic fields the electrons spontaneously radiate electromagnetic radiation generally in the direction of the central axis. The relativistic electrons interact with radiation within the undulator. Under certain conditions, this interaction causes the electrons to bunch together into microbunches, modulated at the wavelength of radiation within the undulator, and coherent emission of radiation along the central axis is stimulated.

Figure 3:
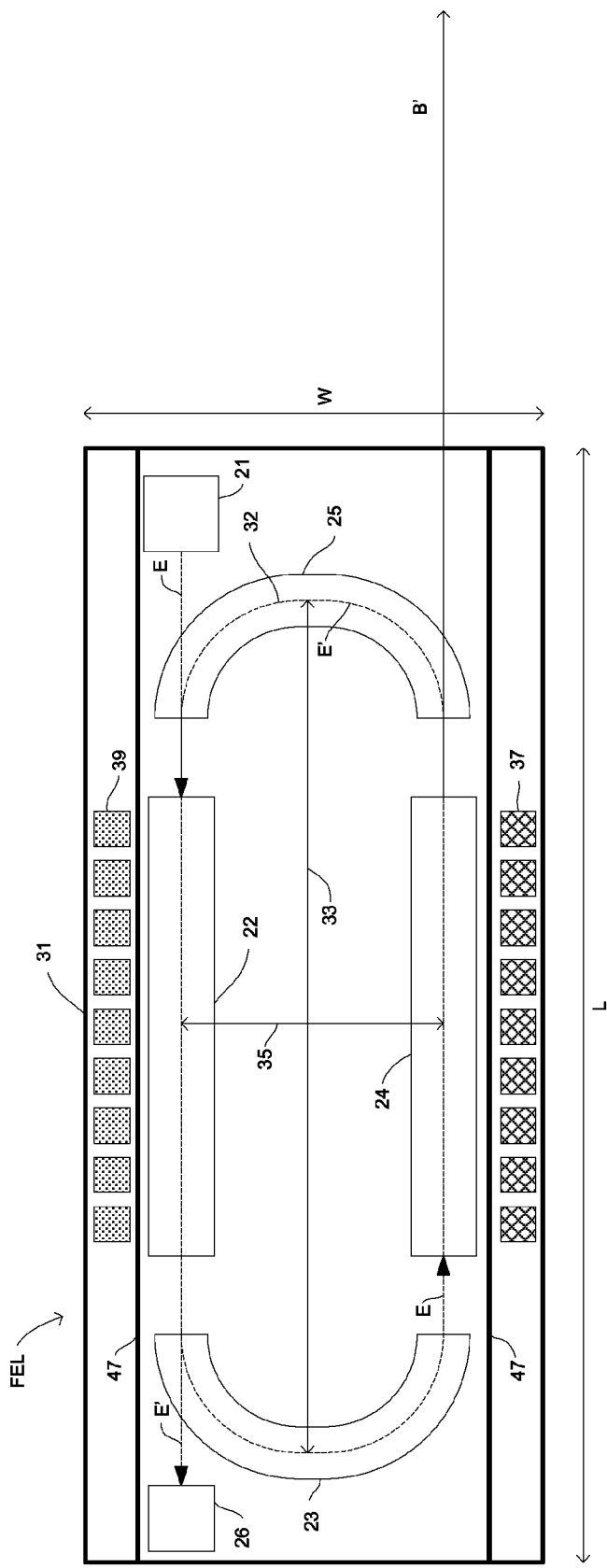
FIG. 3 is a schematic illustration of a free electron laser.

FIG. 3 is a schematic depiction of a free electron laser FEL comprising an electron source 21, a linear accelerator 22, a steering unit 23 and an undulator 24. The electron source 21 may alternatively be referred to as an injector.

The electron source 21 is operable to produce a beam of electrons E. The electron source 21 may, for example, comprise a photo-cathode or a thermionic cathode and an accelerating electric field. The electron beam E is a bunched electron beam E which comprises a series of bunches of electrons. The electron beam E is accelerated to relativistic energies by the linear accelerator 22. In an example, the linear accelerator 22 may comprise a plurality of radio frequency cavities, which are axially spaced along a common axis, and one or more radio frequency power sources, which are operable to control the electromagnetic fields along the common axis as bunches of electrons pass between them so as to accelerate each bunch of electrons. The cavities may be superconducting radio frequency cavities. Advantageously, this allows: relatively large electromagnetic fields to be applied at high duty cycles; larger beam apertures, resulting in fewer losses due to wakefields; and for the fraction of radio frequency energy that is transmitted to the beam (as opposed to dissipated through the cavity walls) to be increased. Alternatively, the cavities may be conventionally conducting (i.e. not superconducting), and may be formed from, for example, copper. Other types of linear accelerators may also be used. For example, the linear accelerator 22 may comprise a laser accelerator, wherein the electron beam E passes through a focused laser beam and the electric field of the laser beam causes the electrons to accelerate.

The relativistic electron beam E which exits the linear accelerator 22 enters the steering unit 23. The steering unit 23 is operable to alter the trajectory of the relativistic electron beam E so as to direct the electron beam E from the linear accelerator 22 to the undulator 24. The steering unit 23 may, for example, comprise one or more electromagnets and/or permanent magnets configured to generate a magnetic field in the steering unit 23. The magnetic field exerts a force on the electron beam E which acts to alter the trajectory of the electron beam E. The trajectory of the electron beam E upon leaving the linear accelerator 22 is altered by the steering unit 23 so as to direct the electrons to the undulator 24.

In embodiments in which the steering unit 23 comprises one or more electromagnets and/or permanent magnets, the magnets may be arranged to form one or more of a magnetic dipole, a magnetic quadrupole, a magnetic sextupole and/or any other kind of multipole magnetic field arrangement configured to apply a force to the electron beam E. The steering unit 23 may additionally or alternatively comprise one or more electrically charged plates, configured to create an electric field in the steering unit 23 such that a force is applied to the electron beam E. In general the steering unit 23 may comprise any apparatus which is operable to apply a force to the electron beam E to alter its trajectory.

The steering unit 23 directs the relativistic electron beam E to the undulator 24. The undulator 24 is operable to guide the relativistic electrons along a periodic path so that the electron beam E interacts with radiation within the undulator 24 so as to stimulate emission of coherent radiation. Generally the undulator 24 comprises a plurality of magnets, which are operable to produce a periodic magnetic field which causes the electron beam E to follow a periodic path. As a result the electrons emit electromagnetic radiation generally in the direction of a central axis of the undulator 24. The undulator 24 may comprise a plurality of sections (not shown), each section comprising a periodic magnet structure. The electromagnetic radiation may form bunches at the beginning of each undulator section. The undulator 24 may further comprise a mechanism for refocusing the electron beam E such as, for example, a quadrupole magnet in between one or more pairs of adjacent sections. The mechanism for refocusing the electron beam E may reduce the size of the electron bunches, which may improve the coupling between the electrons and the radiation within the undulator 24, increasing the stimulation of emission of radiation.

As electrons move through the undulator 24, they interact with the electric field of the electromagnetic radiation in the undulator 24, exchanging energy with the radiation. In general the amount of energy exchanged between the electrons and the radiation will oscillate rapidly unless conditions are close to a resonance condition, given by:

$$\lambda_{em} = \frac{\lambda_u}{2\gamma^2}\left(1 + \frac{K^2}{A}\right), \quad (1)$$

where $\lambda_{rm}$ is the wavelength of the radiation, $\lambda_a$ is the undulator period, $\gamma$ is the Lorentz factor of the electrons and K is the undulator parameter. A is dependent upon the geometry of the undulator 24: for a helical undulator A=1, whereas for a planar undulator A=2. In practice, each bunch of electrons will have a spread of energies although this spread may be minimised as far as possible (by producing an electron beam E with low emittance). The undulator parameter K is typically approximately 1 and is given by:

$$K = \frac{q\lambda_u B_0}{2\pi mc}, \quad (2)$$

where q and m are, respectively, the electric charge and mass of the electrons, $B_0$ is the amplitude of the periodic magnetic field, and c is the speed of light.

The resonant wavelength $\lambda_{rm}$ is equal to the first harmonic wavelength spontaneously radiated by electrons moving through the undulator 24. The free electron laser FEL may operate in self-amplified spontaneous emission (SASE) mode. Operation in SASE mode may require a low energy spread of the electron bunches in the electron beam E before it enters the undulator 24. Alternatively, the free electron laser FEL may comprise a seed radiation source, which may be amplified by stimulated emission within the undulator 24.

Electrons moving through the undulator 24 may cause the amplitude of radiation to increase, i.e. the free electron laser FEL may have a non-zero gain. Maximum gain may be achieved when the resonance condition is met or when conditions are close to but slightly off resonance.

An electron which meets the resonance condition as it enters the undulator 24 will lose (or gain) energy as it emits (or absorbs) radiation, so that the resonance condition is no longer satisfied. Therefore, in some embodiments the undulator 24 may be tapered. That is, the amplitude of the periodic magnetic field and/or the undulator period may vary along the length of the undulator 24 in order to keep bunches of electrons at or close to resonance as they are guided though the undulator 24. Note that the interaction between the electrons and radiation within the undulator 24 produces a spread of energies within the electron bunches. The tapering of the undulator 24 may be arranged to maximise the number of electrons at or close to resonance. For example, the electron bunches may have an energy distribution which peaks at a peak energy and the tapering maybe arranged to keep electrons with this peak energy at or close to resonance as they are guided though the undulator 24. Advantageously, tapering of the undulator has the capacity to significantly increase conversion efficiency. The use of a tapered undulator may increase the conversion efficiency (i.e. the portion of the energy of the electron beam E which is converted to radiation in the radiation beam B) by more than a factor of 2. The tapering of the undulator may be achieved by reducing the undulator parameter K along its length. This may be achieved by matching the undulator period and/or the magnetic field strength $B_0$ along the axis of the undulator and/or a parameter (often denoted A) defining polarisation of produced radiation and defined by undulator geometry to the electron bunch energy to ensure that they are at or close to the resonance condition. Meeting the resonance condition in this manner increases the bandwidth of the emitted radiation.

After leaving the undulator 24, the electromagnetic radiation is emitted as a radiation beam B'. The radiation beam B' comprises EUV radiation and may form all or part of the radiation beam B which is provided to the beam splitting apparatus 20 (depicted in FIG. 1) and which forms the branch radiation beams $B_{1-20}$ which are provided to the lithographic apparatus $LA_{1-20}$.

In the embodiment of a free electron laser which is depicted in FIG. 3, the electron beam E' which leaves the undulator 24 enters a second steering unit 25. The second steering unit 25 alters the trajectory of the electron beam E' which leaves the undulator 24 so as to direct the electron beam E' back through the linear accelerator 22. The second steering unit 25 may be similar to the steering unit 23 and may, for example, comprise one or more electromagnets and/or permanent magnets. The second steering unit 25 does not affect the trajectory of the radiation beam B' which leaves the undulator 24. The steering unit 25 therefore decouples the trajectory of the electron beam E' from the radiation beam B'. In some embodiments, the trajectory of the electron beam E' may be decoupled from the trajectory of the radiation beam B' (e.g. using one or more magnets) before reaching the second steering unit 25.

The second steering unit 25 directs the electron beam E' to the linear accelerator 22 after leaving the undulator 24.

Electron bunches which have passed through the undulator 24 may enter the linear accelerator 22 with a phase difference of approximately 180 degrees relative to accelerating fields in the linear accelerator 22 (e.g. radio frequency fields). The phase difference between the electron bunches and the accelerating fields in the linear accelerator 22 causes the electrons to be decelerated by the fields. The decelerating electrons E' pass some of their energy back to the fields in the linear accelerator 22 thereby increasing the strength of the fields which accelerate the electron beam E arriving from the electron source 21. This arrangement therefore recovers some of the energy which was given to electron bunches in the linear accelerator 22 (when they were accelerated by the linear accelerator) in order to accelerate subsequent electron bunches which arrive from the electron source 21. Such an arrangement may be known as an energy recovering LINAC.

Electrons E' which are decelerated by the linear accelerator 22 are absorbed by a beam dump 26. The steering unit 23 may be operable to decouple the trajectory of the electron beam E' which has been decelerated by the linear accelerator 22 from the trajectory of the electron beam E which has been accelerated by the linear accelerator 22. This may allow the decelerated electron beam E' to be absorbed by the beam dump 26 whilst the accelerated electron beam E is directed to the undulator 24.

Alternatively the free electron laser FEL may comprise a beam splitting unit (not shown) which is separate from the steering unit 23 and which is configured to decouple the trajectory of the accelerated electron beam E from the trajectory of the decelerated electron beam E' upstream of the steering unit 23.

Alternatively the trajectory of the accelerated electron beam E may be decoupled from the trajectory of the decelerated electron beam E' by generating a substantially constant magnetic field. The difference in energies between the accelerated electron beam E and the decelerated electron beam E' causes the trajectories of the two electron beams to be altered by different amounts by the constant magnetic field. The trajectories of the two electron beams will therefore become decoupled from each other.

The beam dump 26 may, for example, include a large amount of water or a material with a high threshold for radioactive isotope generation by high energy electron impact. For example, the beam dump 26 may include aluminium with a threshold for radioactive isotope generation of approximately 15 MeV. By decelerating the electron beam E' in the linear accelerator 22 before it is incident on the beam dump 26, the amount of energy the electrons have when they are absorbed by the beam dump 26 is reduced. This reduces the levels of induced radiation and secondary particles produced in the beam dump 26. This removes, or at least reduces, the need to remove and dispose of radioactive waste from the beam dump 26. This is advantageous since the removal of radioactive waste requires the free electron laser FEL to be shut down periodically and the disposal of radioactive waste can be costly and can have serious environmental implications.

When operating as a decelerator, the linear accelerator 22 may be operable to reduce the energy of the electrons E' to below a threshold energy. Electrons below this threshold energy may not induce any significant level of radioactivity in the beam dump 26.

In some embodiments a decelerator (not shown) which is separate to the linear accelerator 22 may be used to decelerate the electron beam E' which has passed through the undulator 24. The electron beam E' may be decelerated by the decelerator in addition to being decelerated by the linear accelerator 22 or instead of being decelerated by the linear accelerator 22. For example, the second steering unit 25 may direct the electron beam E' through a decelerator prior to the electron beam E' being decelerated by the linear accelerator 22. Additionally or alternatively the electron beam E' may pass through a decelerator after having been decelerated by the linear accelerator 22 and before being absorbed by the beam dump 26. Alternatively the electron beam E' may not pass through the linear accelerator 22 after leaving the undulator 24 and may be decelerated by one or more decelerators before being absorbed by the beam dump 26.

Optionally, the free electron laser FEL may comprise one or more bunch compressors (not shown). A bunch compressor may be disposed downstream or upstream of the linear accelerator 22. A bunch compressor is configured to bunch electrons in the electron beam E and spatially compress existing bunches of electrons in the electron beam E. One type of bunch compressor comprises an acceleration field directed parallel to the electron beam E. An electron in the electron beam E interacts with the provided field and bunches with other electrons nearby. The imposed energy difference for electrons in the bunch translates into a different propagation time to the non-relativistic case. Thus at a certain distance from such a bunch compressor the beam can be compressed longitudinally. Another type of bunch compressor comprises a magnetic chicane, wherein the length of a path followed by an electron as it passes through the chicane is dependent upon its energy. This type of bunch compressor may be used to compress a bunch of electrons which have been accelerated in a linear accelerator 22 by a plurality of conductors whose potentials oscillate at, for example, radio frequencies.

A gain length of the undulator defines a characteristic scale of light amplification. Gain length shortens with higher charge density in the bunch sent through the undulator. Thus it can be beneficial to compress the bunch radially and longitudinally. Simultaneously, bunch emittance degradation rate increases for a compressed bunch. That is, normalized emittance grows per meter of propagation in the beam line, and higher losses due to wake-fields and coherent synchrotron radiation are associated with shorter bunches. Thus it can be most beneficial to place a bunch compressor between the steering unit 23 and the undulator 24.

The free electron laser FEL shown in FIG. 3 is housed within a building 31. The building 31 may comprise walls which do not substantially transmit radiation which is generated in the free electron laser FEL whilst the free electron laser FEL is in operation. For example, the building 31 may comprise thick concrete walls (e.g. walls which are approximately 4 meters thick). The walls of the building 31 may be further provided with radiation shielding materials such as, for example, lead and/or other materials which are configured to absorb neutrons and/or other radiation types. Providing walls of a building 31 with radiation absorbing materials may advantageously allow the thickness of the walls of the building 31 to be reduced. However adding radiation absorbing materials to a wall may increase the cost of constructing the building 31. A relatively cheap material which may be added to a wall of the building 31 in order to absorb radiation may, for example, be a layer of earth.

In addition to providing walls of the building 31 which have radiation shielding properties. The building 31 may also be configured to prevent radiation generated by the free electron laser FEL from contaminating ground water below the building 31. For example, the base and/or foundations of the building 31 may be provided with radiation shielding materials or may be sufficiently thick to prevent radiation from contaminating ground water below the building 31. In an embodiment the building 31 may be positioned at least partly underground. In such an embodiment ground water may surround portions of the exterior of the building 31 as well as being below the building 31. Radiation shielding may therefore be provided around the exterior of the building 31 in order to prevent radiation from contaminating ground water which surrounds the building 31.

In addition to or as an alternative to shielding radiation at the exterior of the building 31, radiation shielding may also be provided inside of the building 31. For example, radiation shielding may be provided inside the building 31 at locations proximate to portions of the free electron laser FEL which emit large amounts of radiation.

The building 31 has a width W and a length L. The width W and the length L of the building 31 is partly determined by the size of a loop 32 which the electron beam E follows through the free electron laser FEL. The loop 32 has a length 33 and a width 35.

The length 33 of the loop 32 is determined by the length of the linear accelerator 22 and the length of the undulator 24. A given length of linear accelerator 22 may, for example, be required in order to accelerate the electron beam E to high enough energies such that the electrons emit EUV radiation in the undulator 24. For example, a linear accelerator 22 may have a length of greater than about 40 meters. In some embodiments a linear accelerator 22 may have a length of up to about 80 meters. Additionally a given length of undulator 24 may be required in order to stimulate emission of coherent radiation in the undulator 24. For example, an undulator 24 may have a length of greater than about 40 m. In some embodiments an undulator 24 may have a length of up to about 60 meters.

The width of the loop is determined by the radius of curvature with which the steering unit 23 adjusts the trajectory of the electron beam E. The radius of curvature of the electron beam E in the steering unit 23 may depend, for example, on the velocity of the electrons in the electron beam E and on the strength of a magnetic field which is generated in the steering unit 23. An increase in the strength of a magnetic field which is generated in the steering unit 23 will decrease the radius of curvature of the electron beam E whereas an increase in the velocity of the electrons will increase the radius of curvature of the electron beam E. The radius of curvature of the electron beam E through the steering unit 23 may, for example, be approximately 12 m. In some embodiments the radius of curvature of the electron beam E through the steering unit 23 may be less than 12 m. For example, the radius of curvature of an electron beam E through the steering unit 23 may be approximately 7 m.

The loop 32 which the electron beam E follows through the free electron laser FEL may have a length 33 which is greater than about 60 meters. In some embodiments the loop 32 may have a length 33 which is up to about 120 meters. The loop 32 may have a width 35 which is greater than about 12 meters. In some embodiments the loop 32 may have a width 35 which is up to about 25 meters.

The building 31 may also house other components. For example, electrical cabinets 37 which contain electrical components which supply electrical power to, for example, the undulator 24, the steering units 23, 25 and/or other components of the free electron laser FEL may be housed within the building 31. It may be advantageous to provide the electrical cabinets 37 in close proximity to the undulator 24 as is shown in FIG. 3. However electrical cabinets 37 may be positioned in other positions relative to the components of the free electron laser FEL.

Additionally cryogenic cooling cabinets 39 which contain apparatus which is configured to provide cryogenic cooling to components of the free electron laser FEL may be housed within the building 31. Cryogenic cooling may, for example, be provided to the linear accelerator 22 and may cool superconducting cavities of the linear accelerator 22. It may be advantageous to provide the cryogenic cooling cabinets 39 in close proximity to the linear accelerator 22. This may reduce any energy loss between the cryogenic cooling cabinets 39 and the linear accelerator 22.

It may be desirable to provide electrical cabinets 37 and cryogenic cooling cabinets 39 on the outside of the loop 32 which the electron beam E follows through the free electron laser FEL (as is shown in FIG. 3). Providing the cabinets 37, 39 on the outside of the loop 32 may allow easy access to the cabinets, for example, to monitor, control, maintain and/or repair components which are housed within the cabinets 37, 39. As will be appreciated from FIG. 3, positioning the cabinets 37, 39 on the outside of the loop 32 may increase the minimum width W of the building 31 which is required to house the components of the free electron laser FEL within the building 31. The building 31 may also house other components which are not shown in FIG. 3 which may also determine the dimensions of the building 31.

As is shown in FIG. 3, a wall 47 is positioned between the loop 32 which the electron beam follows through the free electron laser FEL and the electric cabinets 37. A wall 47 is also positioned between the loop 32 and the cryogenic cooling cabinets 39. The walls 47 may shield the electric cabinets 37 and the cryogenic cabinets 39 from radiation which is generated by the electron beam E in the free electron laser FEL. This protects the components in the cabinets 37, 39 from being damaged by radiation and may allow maintenance workers to access the cabinets 37, 39 whilst the free electron laser FEL is in operation without being exposed to dangerous levels of radiation.

In the embodiment depicted in FIG. 3 the cabinets 37, 39 are shown as being housed in the same building 31 as the loop 32 which the electron beam follows through the free electron laser FEL whilst being shielded from the loop 32 by the walls 47. The cryogenic cooling components which are housed within the cabinets 39 may generate vibrations which may be transferred to components of the free electron laser FEL and may adversely affect components of a free electron laser FEL which are sensitive to vibrations. In order to prevent vibrations which are generated by cryogenic cooling components from transferring to sensitive parts of the free electron laser, a portion of the building 31 in which the cryogenic cooling cabinets 39 are housed may be mechanically isolated from the portion of the building in which sensitive components are housed. For example, the cryogenic cooling cabinets 39 may be mechanically isolated from the linear accelerator 22, the steering unit 23 and the undulator 24. In order to provide mechanical isolation the portion of the building 31 in which the cryogenic cooling cabinets 39 are housed may, for example, have separate foundations to a portion of the building in which the linear accelerator 22, the steering unit 23 and the undulator 24 are housed.

Alternatively the cryogenic cooling cabinets 39 and/or the electrical cabinets 37 may be housed in one or more buildings which are separate from the building 31. This may ensure that the cabinets 37, 39 are shielded from radiation which is produced by the electron beam E and that sensitive components of the free electron laser FEL are mechanically isolated from the cryogenic cooling cabinets 39.

A lithographic system LS may comprise a single free electron laser FEL. The free electron laser FEL may supply an EUV radiation beam to a beam splitting apparatus 20 which provides branch radiation beams to a plurality of lithographic apparatus. The radiation source SO may comprise an optical system which includes dedicated optical components configured to direct a radiation beam B' output from a free electron laser FEL to a beam splitter 20 of a lithographic system LS. Since EUV radiation is generally well absorbed by all matter, reflective optical components are generally used (rather than transmissive components) so as to minimise losses. The dedicated optical components of the optical system may adapt the properties of the radiation beam produced by the free electron laser FEL so that it is suitable for acceptance by the illumination systems IL of the lithographic apparatus $LA_1$-$LA_{20}$ and/or a mask inspection apparatus.

Alternatively a radiation source SO may comprise a plurality of free electron lasers (e.g. two free electron lasers) which may each provide an EUV radiation beam to an optical system which also forms part of the radiation source SO. The optical system may receive a radiation beam from each of a plurality of free electron lasers and may combine the radiation beams into a composite radiation beam which is provided to a beam splitting apparatus 20 in order to provide branch radiation beams $B_1$-$B_{20}$ to lithographic apparatus $LA_1$-$LA_{20}$.

Figure 4:
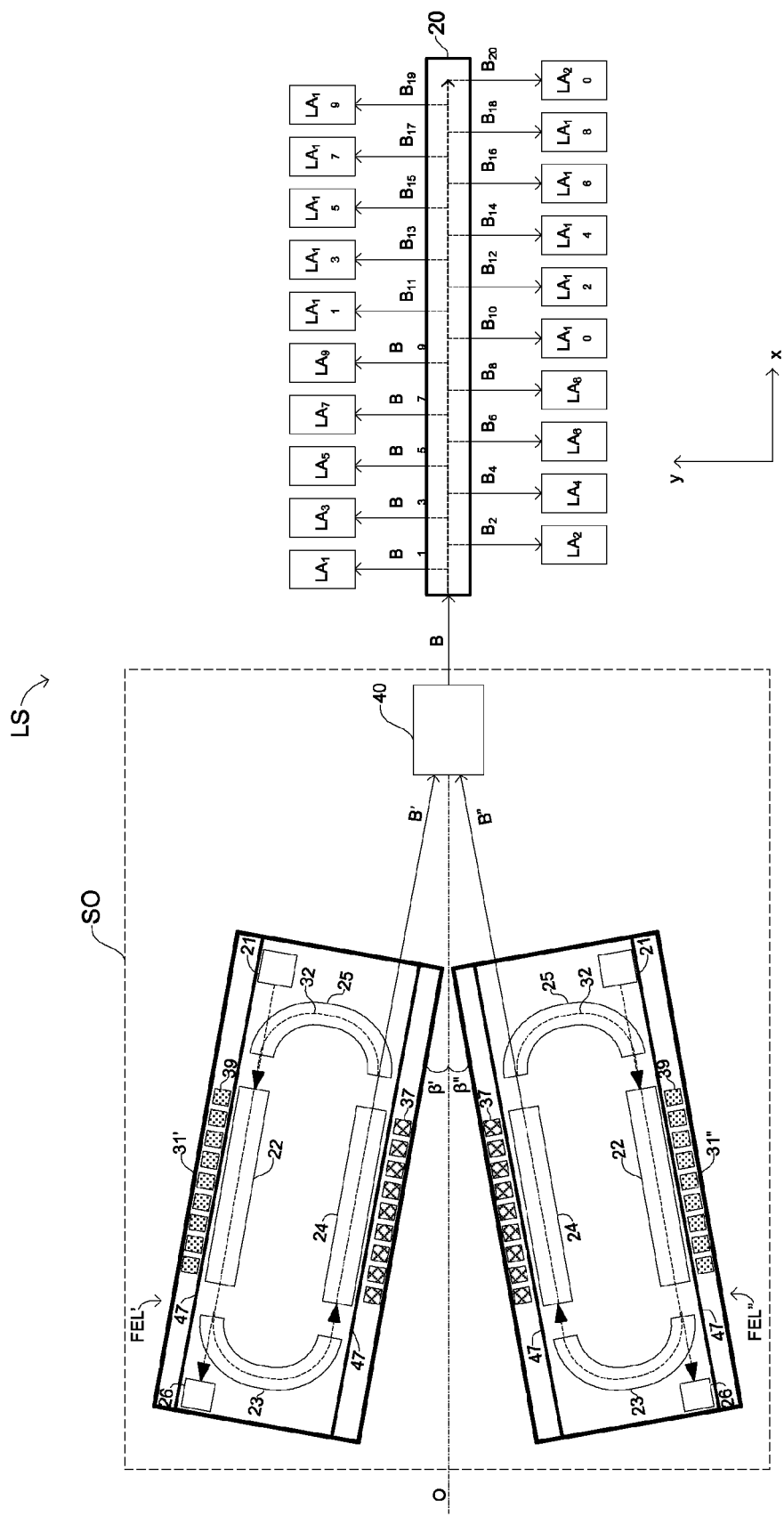
FIG. 4 is a schematic illustration of a lithographic system including a radiation source comprising two free electron lasers.

FIG. 4 is a schematic depiction of a lithographic system LS which includes a radiation source SO comprising a first free electron laser FEL' and a second free electron laser FEL". The first free electron laser FEL' outputs a first EUV radiation beam B' and the second free electron laser FEL" outputs a second EUV radiation beam B". The first free electron laser FEL' is housed within a first building 31'. The second free electron laser FEL" is housed within a second building 31".

The first and second radiation beams B', B" are received by an optical system 40. The optical system 40 comprises a plurality of optical elements (e.g. mirrors) which are arranged to receive the first radiation beam B' and the second radiation beam B" and output a main radiation beam B. At times at which both the first and second free electron lasers are operating, the main radiation beam B is a composite radiation beam which comprises radiation from both the first and second radiation beams B', B". The composite radiation beam B is provided to the beam splitting apparatus 20 which provides branch radiation beams $B_1$-$B_{20}$ to lithographic apparatus $LA_1$-$LA_{20}$.

The arrangement which is depicted in FIG. 4 in which two free electron lasers are arranged to provide radiation beams B', B" to form a main radiation beam B, may allow one of the free electron lasers to be turned off whilst radiation is continuously provided to the lithographic apparatus $LA_1$-$LA_{20}$. For example, one of the free electron lasers may be taken out of operation in order to, for example, allow the free electron laser to be repaired or to undergo maintenance. In this event the other free electron laser may continue to provide a radiation beam which is received by the optical system 40. In the event that only one of the free electron lasers provides radiation to the optical system 40, the optical system 40 is operable to form a main radiation beam B which comprises radiation from the free electron laser which is providing radiation to the optical system 40. This allows for continuous operation of the lithographic apparatus $LA_1$-$LA_{20}$ even when one of the free electron lasers is taken out of operation.

Figure 5:
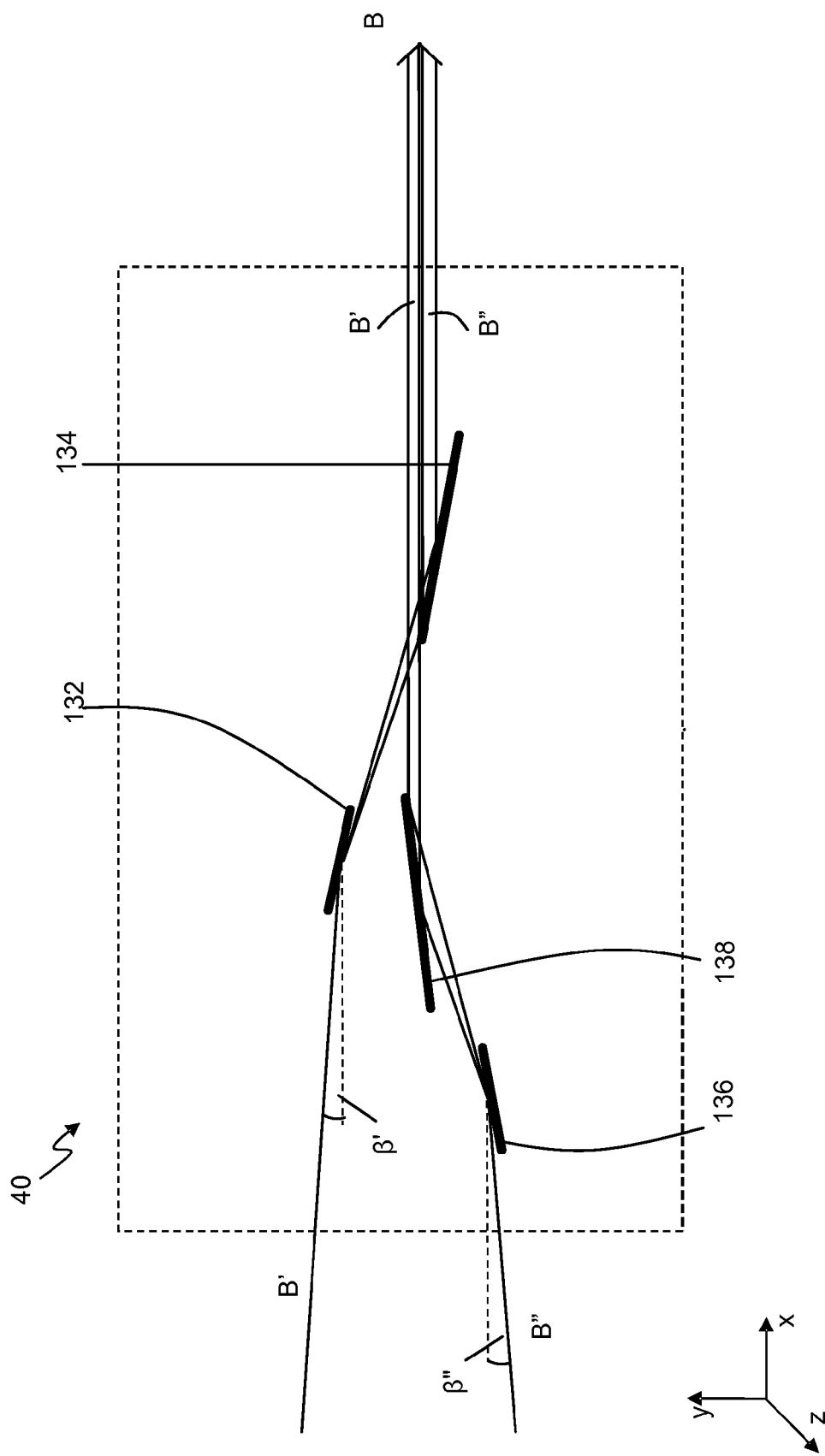
FIG. 5 is a schematic illustration of an optical system.

FIG. 5 is a schematic depiction of an embodiment of an optical system 40 according to an embodiment of the invention which is arranged to receive a beam of radiation B', B" from each of the free electron lasers FEL', FEL" and to output an output radiation beam B. The radiation beam B that is output by the optical system 40 is received by the beam splitting apparatus 20 (see FIG. 1).

The optical system 40 comprises four optical elements: first and second optical elements 132, 134 associated with a first one of the free electron lasers FEL'; and first and second optical elements 136, 138 associated with a second one of the free electron lasers FEL". The optical elements 132, 134, 136, 138 are arranged to alter the size and shape of the cross section of the radiation beams B', B" from the free electron lasers FEL', FEL".

In particular, the first optical elements 132, 136 are convex mirrors, which act to increase the cross sectional area of the radiation beams B', B" from the free electron lasers FEL', FEL". Although in FIG. 5 the first optical elements 132, 136 appear to be substantially flat in the x-y plane they may be convex both in this plane and in the z direction. Since the first optical elements 132, 136 are convex, they will increase the divergence of the EUV radiation beams B', B", thereby decreasing the heat load on mirrors downstream of them. The first optical element 132 is therefore a diverging optical element arranged to increase the cross sectional area of the radiation beam B' received from the first free electron laser FEL'. The first optical element 136 is a diverging optical element arranged to increase the cross sectional area of the radiation beam B" received from the second free electron laser FEL. This may allow mirrors downstream to be of a lower specification, with less cooling, and therefore less expensive. Additionally or alternatively, it may allow the downstream mirrors to be nearer to normal incidence. In practice, the radiation beam B output by the radiation source SO may be split by a plurality of consecutive, static, knife edge mirrors arranged in series in the path of the beam B. Increasing the size of the beam B (by, for example, using convex mirrors as the first optical elements 132, 136) reduces the accuracy with which the mirrors must be located in the beam B path. Therefore, this allows for more accurate splitting of the output beam B by the splitting apparatus 20.

The second optical elements 134, 138 are concave and are complementary in shape to the first optical elements such that the beams leaving the second optical elements 134, 138 have substantially zero divergence. Therefore, downstream of the second optical elements 134, 138 the beams are substantially collimated. Again, although in FIG. 5 the second optical elements 134, 138 appear to be substantially flat in the x-y plane they are in fact concave both in this plane and in the z direction.

It may be preferable for the output beam B, which is received by the beam splitting apparatus 20, to have a different shape and/or intensity distribution to that output by the free electron lasers FEL', FEL". For example, a rectangular shape may be preferable to a circular beam for consecutive knife edge extraction mirrors within the beam splitting apparatus 20. Therefore, in addition to increasing the cross sectional area of the radiation beams B', B", the optical elements 132, 134, 136, 138 may act to alter the cross sectional shape of the radiation beams B', B". In particular, the optical elements 132, 134, 136, 138 may be astigmatic or aspherical and may be shaped so as to ensure that the radiation beams B', B" leaving the second optical elements 134, 138 are more rectangular in shape than the radiation beams B', B" produced by the free electron lasers FEL', FEL". For example, the optical elements may be shaped so that the beams B', B" leaving the second optical elements 134, 138 are generally rectangular but with rounded corners, although other shapes are also possible. The two dimensions of such a rectangular shape may be related to radii of curvature of the optical elements in two perpendicular directions such as, for example, in the x-y plane and in the z direction. Advantageously, this allows the mirrors that are used to split the output radiation beam B into branch radiation beams $B_1$-$B_{20}$ (see FIG. 1) before they enter the lithographic apparatuses $LA_1$-$LA_{20}$, to be identical or at least very similar. This is especially beneficial from a manufacturing point of view.

When both of the free electron lasers FEL', FEL" are on, the optical system 40 is operable to combine their radiation beams B', B" to form a composite radiation beam B. In this embodiment, this is achieved by offsetting the first and second optical elements 132, 134 of the first free electron laser FEL' from those 136, 138 of the second free electron laser FEL" in the x-direction so that the beams B', B" leaving the second optical elements 134, 138 are both adjacent to each other and mutually parallel. In particular, the first and second optical elements 132, 134 of the first free electron laser FEL' are disposed "downstream" (with respect to the direction of propagation of the laser beams B', B") of those 136, 138 of the second free electron laser FEL".

In such an arrangement, the optical system 40 is operable to combine the two radiation beams B', B" to form a composite radiation beam. The composite beam is the output radiation beam B output by the optical system 40. It will be appreciated that FIG. 5 is merely exemplary and that the optical system 40 may be implemented other than as shown in FIG. 5.

Referring again to FIG. 4, the buildings 31', 31" are configured to substantially prevent radiation (other than the radiation beams B', B") which is generated by an operating free electron laser from propagating out of the buildings 31', 31". Housing the first and second free electron lasers inside separate buildings therefore allows maintenance and/or repair to be safely carried out on one of the free electron lasers whilst the other free electron laser continues to operate. For example, the first electron laser FEL' may be taken out of operation in order to allow the first free electron laser FEL' to be repaired or to undergo maintenance. During this time the second free electron laser FEL" may continue to operate in order to provide radiation to the optical system 40 and to the lithographic apparatus $LA_1$-$LA_{20}$. Radiation will therefore be generated in the second building 31" due to the operation of the second free electron laser FEL". Dangerous levels of radiation do not however leave the second building 31" and do not enter the first building 31' due to the radiation shielding which is provided by the walls of the second building 31". The first building may therefore be safely entered by maintenance workers in order to repair or carry out maintenance to the first free electron laser FEL'.

It is a feature of embodiments that a multi-LINAC, multi-pass FEL radiation source is provided in which clearing gaps are provided in the sequence of electron bunches to enable the clearing of ions from the electron beam, since focusing by clouds of such ions can degrade bunch properties and reduces conversion efficiency in the undulator. Before describing a two-pass FEL laser according to an embodiment, in which co-ordinated clearing gaps are provided, a further example of a single pass FEL radiation source is described briefly with reference to FIG. 6.

Figure 6:
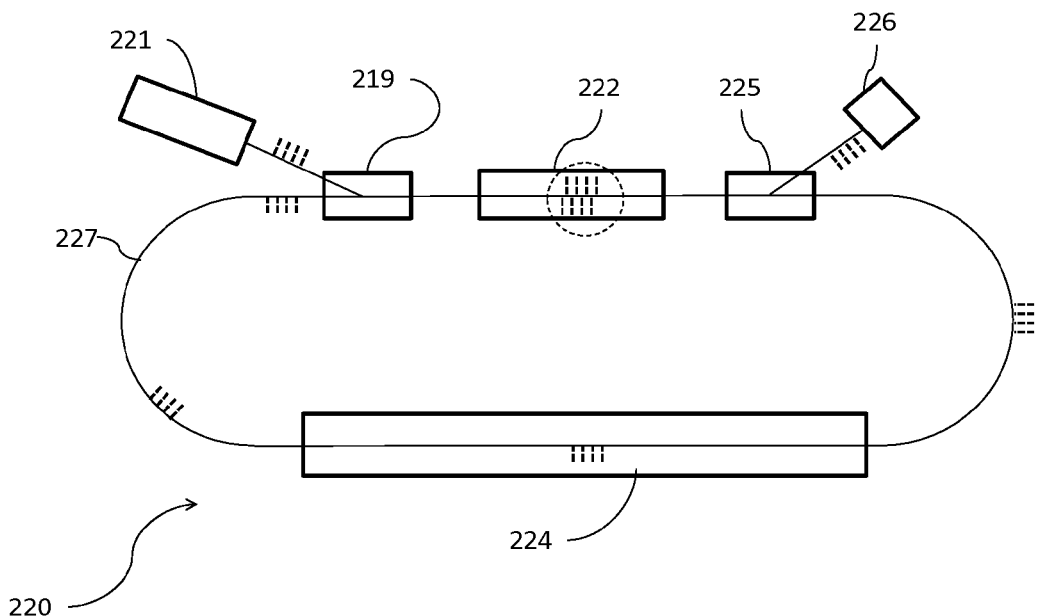
FIG. 6 is a schematic illustration of a further free-electron laser.

The single pass FEL radiation source of FIG. 6 is similar to that of FIG. 3, and includes an electron source in the form of injector 221, a merger component 219 for merging electron bunches from the injector 221 into an electron bunch stream, a LINAC 222 including a series of LINAC modules, an undulator 224, and a demerger component 225 for extracting decelerated electron bunches and directing them towards a beam dump 226. The radiation source also includes steering units, not shown in FIG. 6, that are operable to direct electron bunches along an electron bunch path 227 leading from the injector 221 through the LINAC 222, where they are accelerated, through the undulator 224, back through the LINAC 222, where they are decelerated, and then to the dump 226.

Each of the components of the single pass FEL radiation source 220 of FIG. 6 is similar or the same as a corresponding component of the radiation source of FIG. 3, and both radiation sources operate in a similar way.

In operation of the FEL radiation source 220, each electron bunch passes through the LINAC 222 once during an acceleration phase, and once during a deceleration phase, and hence the FEL radiation source may be referred to as a single pass FEL radiation source.

The acceleration phase of an electron bunch in this case may be considered to comprise the passage of the electron bunch from the entry to the LINAC 222 for the first time until the entry of the electron bunch into the undulator 224, even though it will be appreciated that the increase in energy of the electron bunch during the acceleration phase primarily occurs during passage of the electron bunch through the LINAC. The deceleration phase of an electron bunch in this case may be considered to comprise the passage of the electron bunch from the exit of the undulator 224 up to the exit of the electron bunch from the LINAC 222 for the last time, even though it will be appreciated that the decrease in energy of the electron bunch during the deceleration phase primarily occurs during passage of the electron bunch through the LINAC 222.

It is a feature of the radiation source of FIG. 6 that the production of electron bunches by the source is controlled to include periodic longer gaps between electron bunches, and those periodic longer gaps can also be referred to as clearing gaps. The electron bunches in the absence of the clearing gaps are also periodically spaced, with a period less than that of the clearing gap period.

The radiation source 220 of FIG. 6 can be configured to operate such that each clearing gap between electron bunches that are in their acceleration phase passes through the LINAC 222 at the same time as a clearing gap between electron bunches that are in their deceleration phase, such that the presence of the clearing gaps does not disrupt significantly the energy recovery operation of the LINAC 222. For a single pass FEL radiation source such as that of FIG. 6 in order to overlap clearing gaps at the LINAC 222 it is sufficient to require that the clearing gaps are provided at a regular rate and that the repetition rate of the clearing gaps is substantially equal to N/t, where N is an integer, t is time for electron to travel a single loop (for example from merger component 219 back to merger component 219) and t=L/c where L is the length of the loop and c is the average speed of the electron bunches, which is close to the speed of light.

Figure 7:
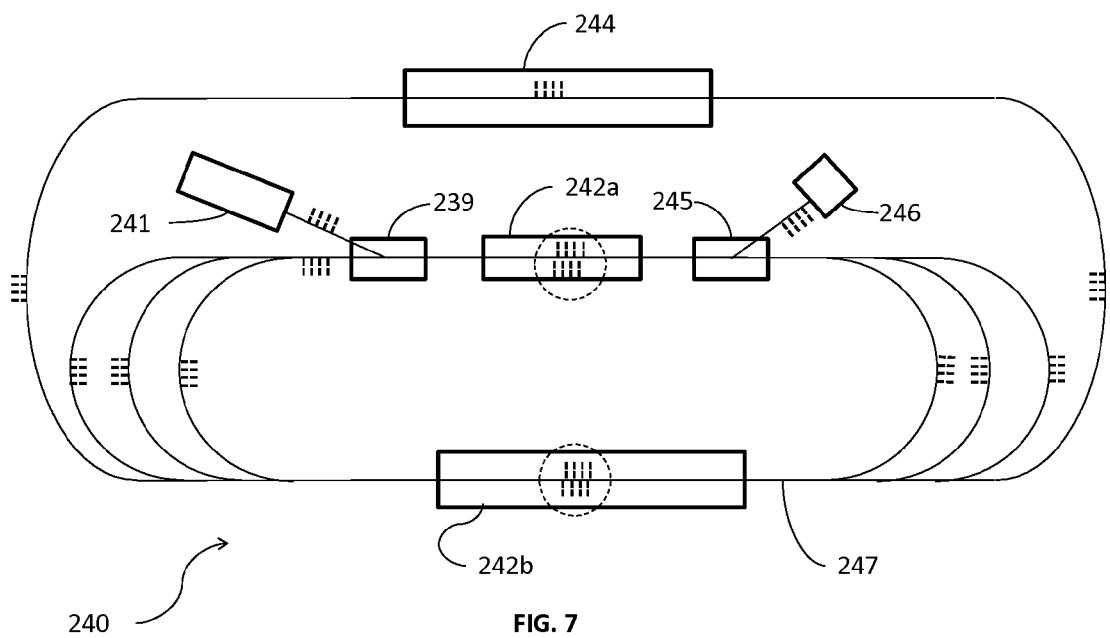
FIG. 7 is a schematic illustration of a free-electron laser radiation source including two energy-recover multi-pass LINACs, according to an embodiment.

Turning to a two-pass rather than a single-pass configuration, a two-pass FEL radiation source 240 according to an embodiment is illustrated schematically in FIG. 7.

The two pass, split acceleration FEL radiation source 240 of FIG. 7 includes an electron source in the form of injector 241, a merger component 239 for merging electron bunches from the injector 241 into an electron bunch stream, a pair of LINACs 242a, 242b each including a series of LINAC modules, an undulator 244, and a demerger component 245 for extracting decelerated electron bunches and directing them towards a beam dump 246. The radiation source also includes steering units, not shown in FIG. 6, that are operable to direct electron bunches along an electron bunch path 247.

Each of the components of the single pass FEL radiation source 240 of FIG. 7 is similar or the same as a corresponding component of the FEL radiation sources of FIG. 3 or 6. The radiation source 242 is configured to operate in such a way that, for each of the LINACs 242a, 242b accelerating and decelerating electron bunches pass through the LINAC substantially simultaneously but 180 degrees out of phase relative to the r.f. fields such that energy is effectively exchanged between the accelerating and decelerating bunches and the LINAC operates as an energy recovery LINAC.

In operation of the FEL radiation source 240, each electron bunch passes through each of the LINACs 242a, 242b twice during an acceleration phase and twice during a deceleration phase, and hence the FEL radiation source may be referred to as a two-pass FEL radiation source.

The acceleration phase of an electron bunch in this case may be considered to comprise the passage of the electron bunch from the entry to the LINAC 242a for the first time until the entry of the electron bunch into the undulator 244, even though it will be appreciated that the increase in energy of the electron bunch during the acceleration phase primarily occurs during passage of the electron bunch through the LINACs 242a, 242b. The deceleration phase of an electron bunch in this case may be considered to comprise the passage of the electron bunch from the exit of the undulator 244 up to the exit of the electron bunch from the LINAC 244a for the last time, even though it will be appreciated that the decrease in energy of the electron bunch during the deceleration phase primarily occurs during passage of the electron bunch through the LINACs 242a, 242b.

An electron bunch path 247 is shown schematically in FIG. 7 and certain sequential points on the electron bunch path 247 for an electron bunch leaving the injector 241 are indicated by reference numerals a1, a2, a3, a4, a5, a6, a7, a8. An electron bunch passes between points a1 to a8, also passing through the LINACs 242a, 242b and the undulator 244, as can be understood by following the path 247 of FIG. 7 via points a1 to a8. The electron bunch path includes a number of loops such that each electron bunch passes through the same points more than once, as can be seen from FIG. 7.

Figure 8:
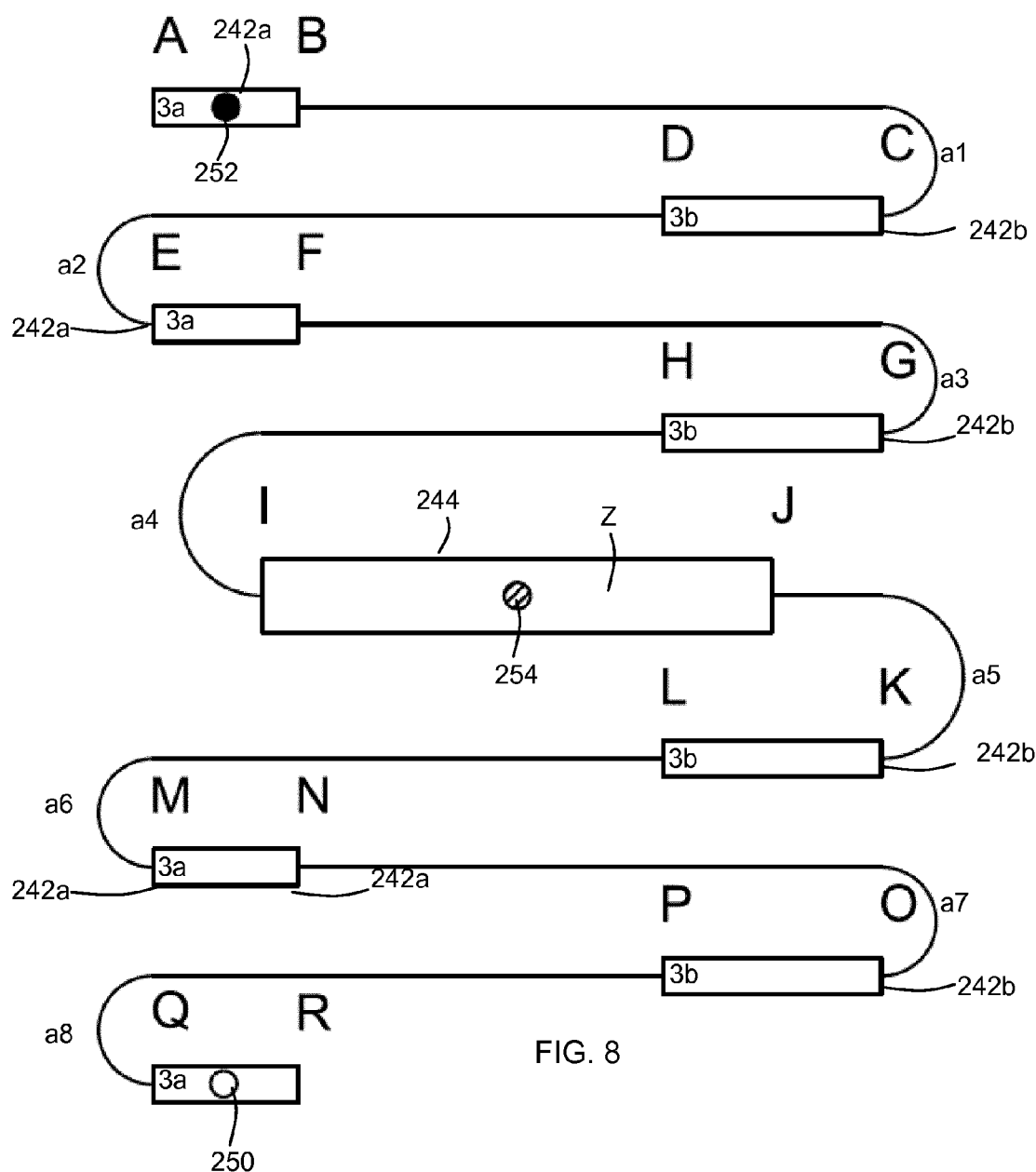
FIGS. 8 to 11 are schematic illustrations showing the progress of pair of clearing gaps along an electron bunch path according to a first mode of operation of the free-electron laser radiation source of FIG. 7.

The sequential passage of electron bunches through the apparatus of FIG. 7 can also be understood with reference to FIG. 8, showing the passage of an electron bunch from a point A indicating entry to the first LINAC 242a for the first time to point J indicating exit from the first LINAC 242a for the last time. The passage of an electron bunch from point A to point I (entrance to the undulator 244) may be referred to as the acceleration phase for the electron bunch, and the passage of the electron bunch from point J (the exit from the undulator) to point R may be referred to as a deceleration phase for the electron bunch.

It is a feature of the embodiment of FIG. 7 that clearing gaps are provided in the electron bunch sequence, and that the timing of the clearing gaps is controlled by the electron source such that during operation, for each of the plurality of LINACS 242a, 242b, a clearing gap in the bunch sequence having surrounding electron bunches in their acceleration phase and a further clearing gap in the bunch sequence having surrounding electron bunches in the deceleration phase are co-ordinated during their passage through the LINACs. The electron bunches may be provided in a periodic sequence and the clearing gaps may be considered to represent missing bunches from the periodic sequence in some cases. Each electron bunch is extracted from the photo-cathode of the electron source when it is illuminated by a flash of pulsed laser. Clearing gaps or missing bunches may be obtained by interrupting the electron beam by suppressing the laser illumination temporarily. That can be done, for example, by one or several Pockels cells rotating polarization of the laser in combination with a polarizing filter and/or by appropriately actuating the amplification of the laser. In practice, a missing bunch may still include some electrons as in many embodiments it is not possible to switch from a full charge bunch to an exactly zero charge state in the time between consecutive bunches with the optical and electrical components that are used. A clearing gap or a missing bunch can therefore be a bunch for which charge has been reduced in comparison to a normal bunch of the sequence sufficiently to allow for ion clearing.

The embodiment of FIG. 7 is configured to operate such that each time one of the clearing gaps (in one of an acceleration or deceleration phase for surrounding bunches of that gap) is present in a LINAC, a corresponding clearing gap (in the other of an acceleration or deceleration phase for surrounding bunches of the gap) is also present in the LINAC and the clearing gaps are co-ordinated such as to maintain the corresponding accelerating and decelerating electron bunches (e.g. at least the immediately preceding and following electron bunches that define the boundaries of the clearing gaps) out of phase thereby to maintain energy recovery operation of the LINACs with minimal electric field gradient variations despite the presence of the clearing gaps. The clearing gaps may wholly or partly overlap during their passage through the LINAC.

The design of suitable co-ordinated clearing gap sequences for a two-pass energy recovery LINAC system with undulator, such as that of FIG. 7 is complex. Suitable clearing gap sequences for modes of operation of the apparatus of FIG. 7, according to embodiments are now described with reference to FIGS. 8 to 18.

In a first mode of operation, described with reference to FIGS. 8 to 11, either two or three clearing gaps are present in the apparatus 240 at points along the electron bunch path between points between A and J at any one time. FIG. 8 shows a clearing gap 250 present in the first LINAC 242a at the end of its deceleration phase and, a clearing gap 252 at the start of its acceleration phase also present in the first LINAC 242a, and a further clearing gap 254 simultaneously present in the undulator 244. Reference to a clearing gap being an acceleration phase can be understood as referring to a clearing gap for which at least one of the surrounding electron bunches is in an acceleration phase, and similarly reference to a clearing gap being in a deceleration phase can be understood as referring to a clearing gap for which at least one of the surrounding electron bunches is in a deceleration phase.

Figure 9:
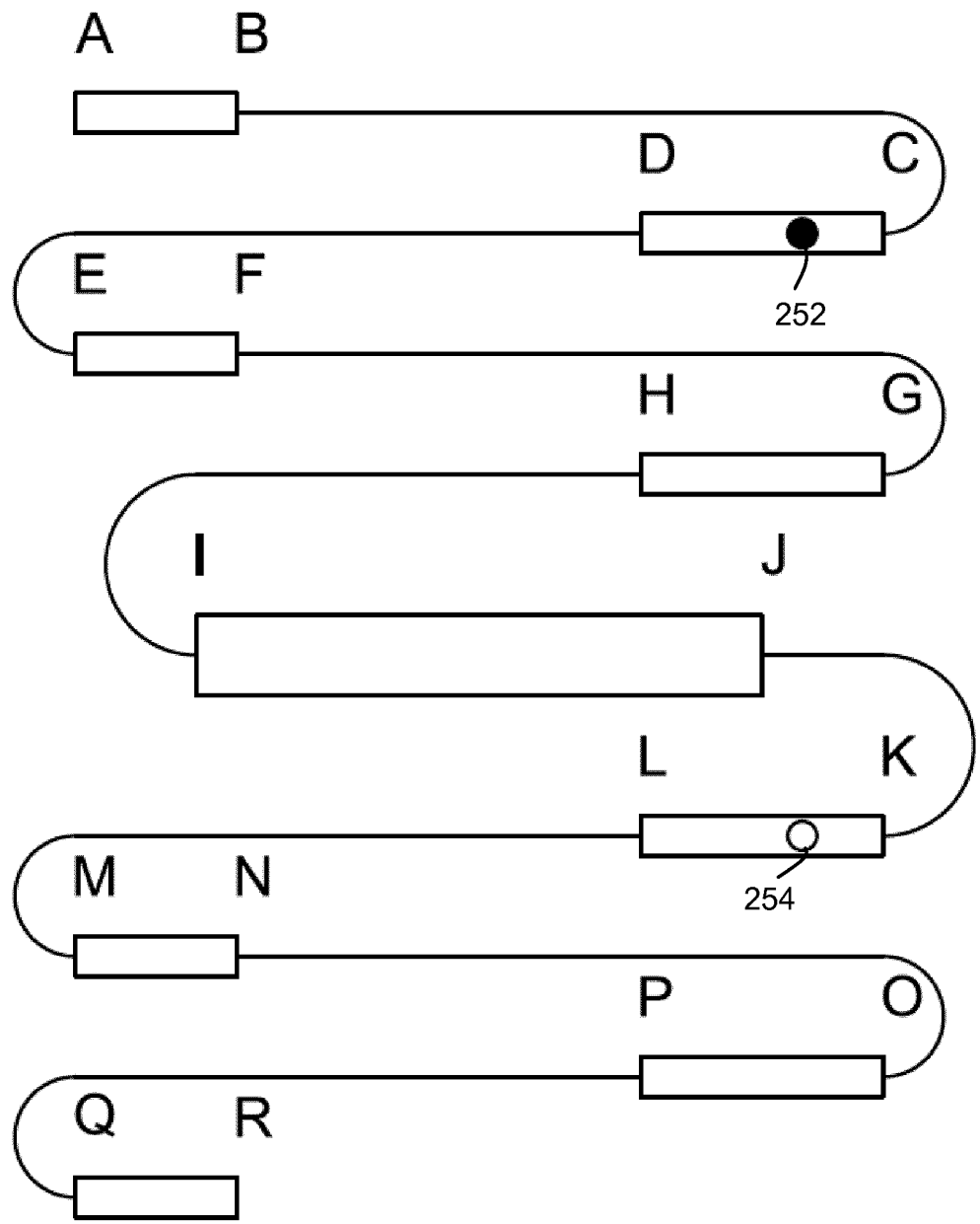
Figure 10:
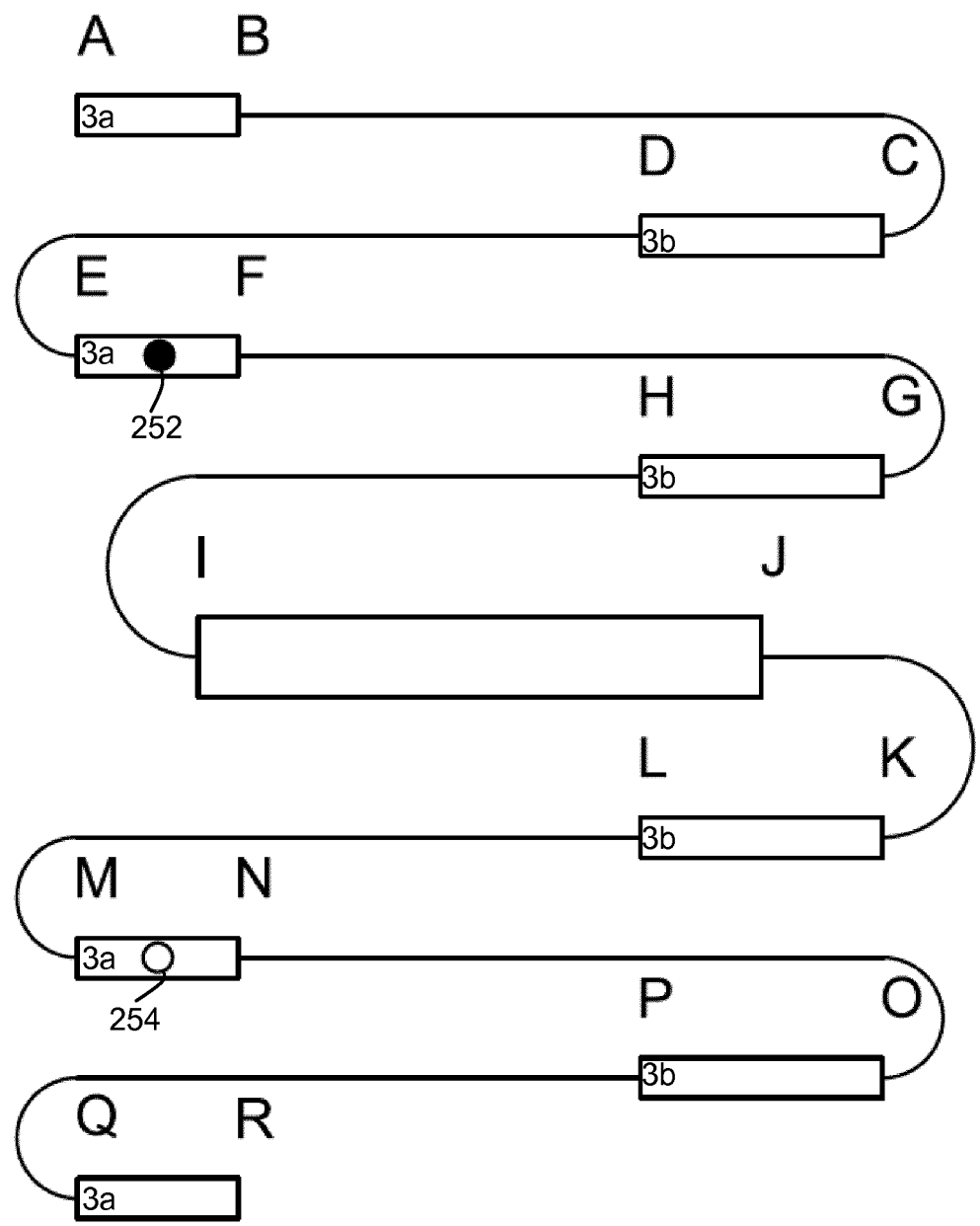
Figure 11:
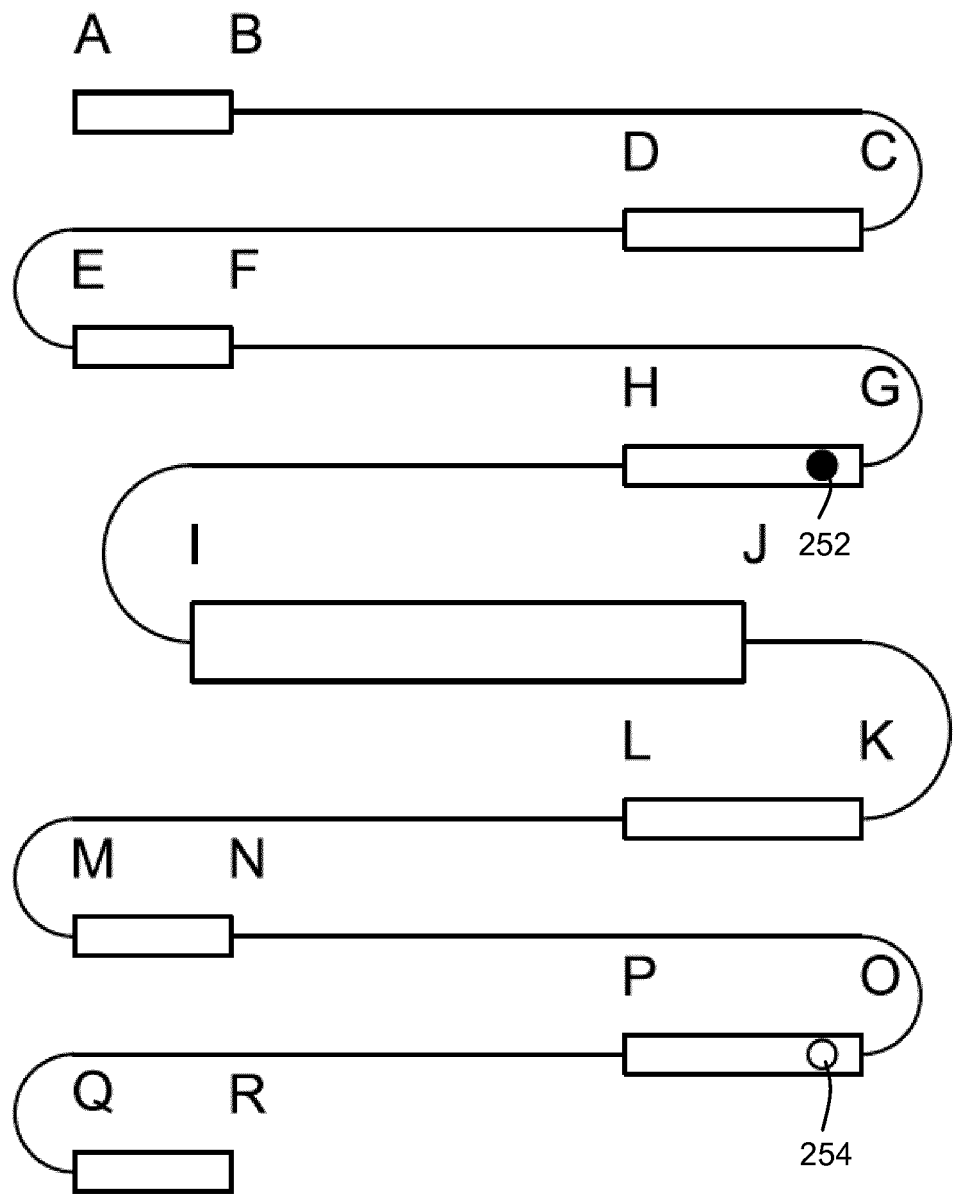
Figure 12:
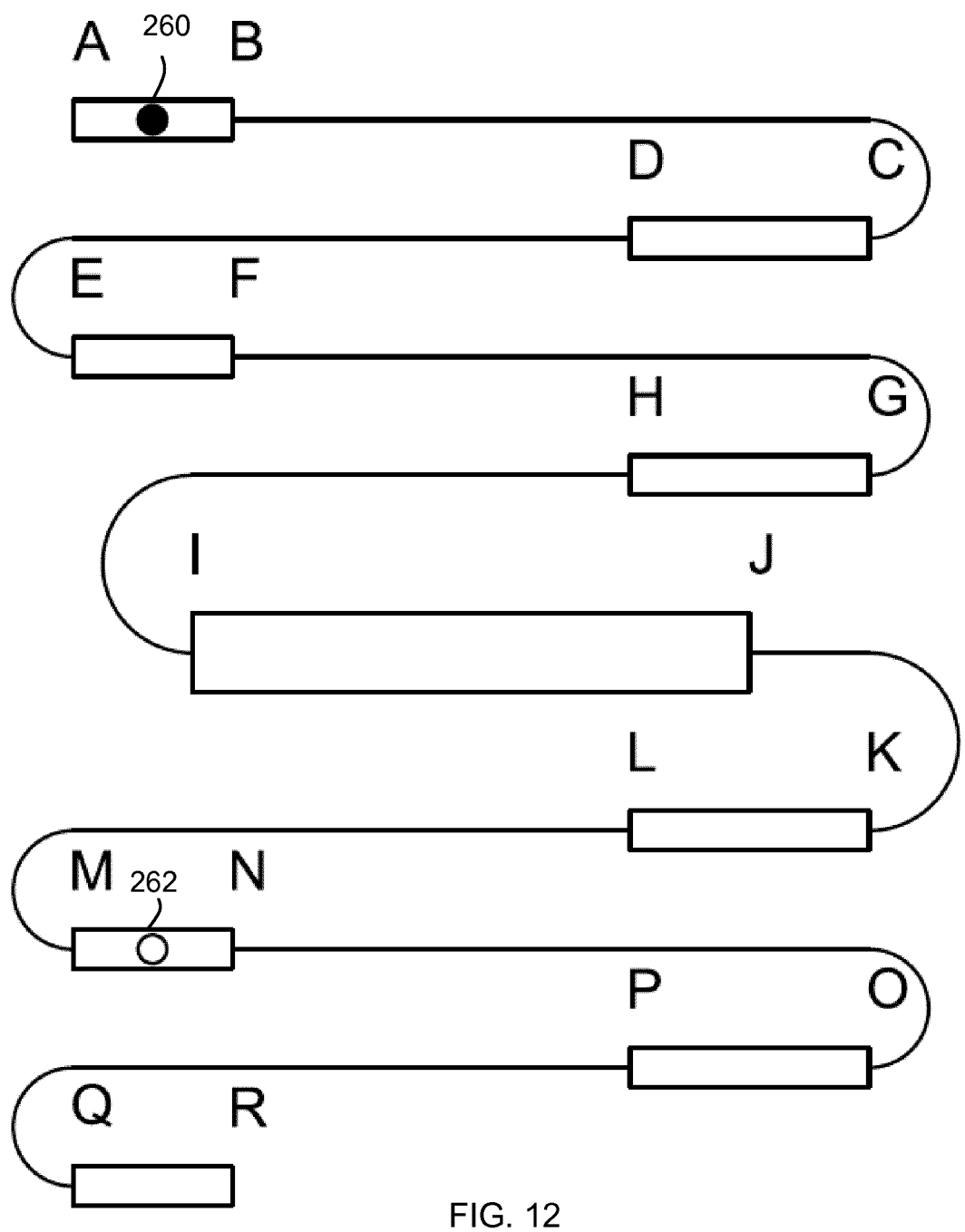
Figure 13:
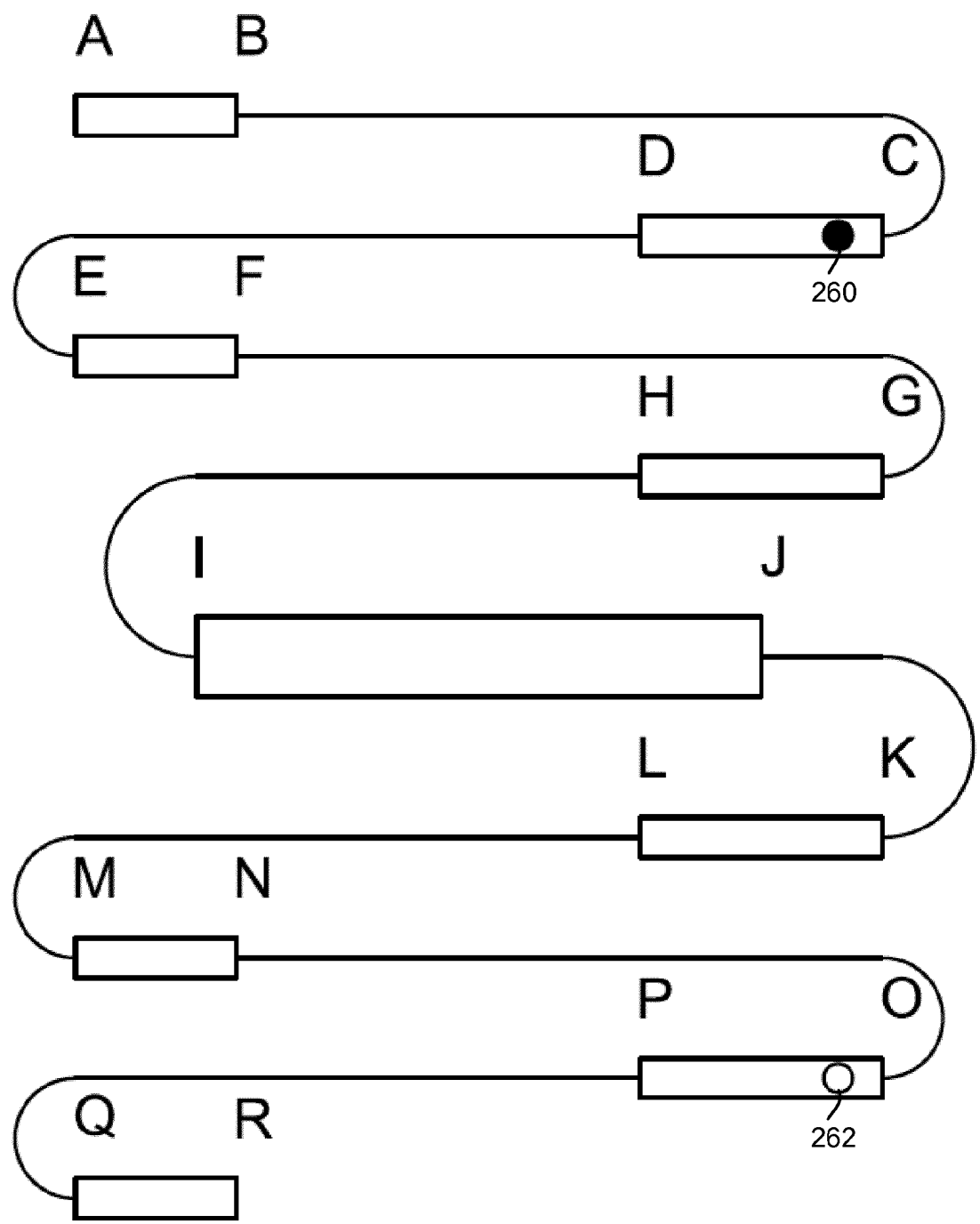

FIGS. 9 to 11 show each of the clearing gaps 252, 254 at their respective simultaneous positions on the electron bunch path 257 at later points in time. It can be seen that each time one of the clearing gaps 252 passes through one of the LINACs 242a, 242b the other of the clearing gaps 254 is simultaneously present in that LINAC.

The clearing gap sequence to provide the co-ordination of clearing gaps illustrated in FIGS. 8 to 11 (which are not to scale) is provided if there is a point Z (for example as indicated in FIG. 8 for one case) in the beam path 247 including the undulator 244 such that the following conditions are substantially satisfied:

$$ZK=BC$$

$$DE=LM$$

$$FG=NO$$

$$HZ=PQ$$

and if clearing gaps are supplied at a regular rate substantially equal to one per $\Delta Z/c$, where c is the average speed of the electron bunches along the bunch path and where:

A is the entrance to the first LINAC 242a for a first pass of the electron bunch in its acceleration phase through the first LINAC 242a;

B is the exit from the first LINAC 242a for a first pass of the electron bunch in its acceleration phase through the first LINAC 242a;

C is the entrance to the second LINAC 242b for a first pass of the electron bunch in its acceleration phase through the second LINAC 242b;

D is the exit from the second LINAC 242a for a first pass of the electron bunch in its acceleration phase through the second LINAC 242b;

E is the entrance to the first LINAC 242a for a second pass of the electron bunch in its acceleration phase through the first LINAC 242a;

F is the exit from the first LINAC 242a for a second pass of the electron bunch in its acceleration phase through the first LINAC 242a;

G is the entrance to the second LINAC 242b for a second pass of the electron bunch in its acceleration phase through the second LINAC 242b;

H is the exit from the second LINAC 242a for a second pass of the electron bunch in its acceleration phase through the second LINAC 242b;

I is the entrance to the undulator;

J is the exit from the undulator;

K is the entrance to the second LINAC 242b for a first pass of the electron bunch in its deceleration phase through the first LINAC 242b;

L is the exit from the second LINAC 242b for a first pass of the electron bunch in its deceleration phase through the first LINAC 242b;

M is the entrance to the first LINAC 242a for a first pass of the electron bunch in its deceleration phase through the first LINAC 242a;

N is the exit from the first LINAC 242a for a first pass of the electron bunch in its deceleration phase through the first LINAC 242a;

O is the entrance to the second LINAC 242b for a second pass of the electron bunch in its deceleration phase through the second LINAC 242b;

P is the exit from the second LINAC 242b for a second pass of the electron bunch in its deceleration phase through the second LINAC 242a;

Q is the entrance to the first LINAC 242a for a second pass of the electron bunch in its deceleration phase through the first LINAC 242a;

R is the exit from the first LINAC 242a for a second pass of the electron bunch in its acceleration phase through the first LINAC 242a, and ZK is the distance between points Z and K along the electron bunch path, BC is the distance between points B and C along the electron bunch path etc.

In this case path equality (for example ZK=BC) may mean that travel time of electron bunches from Z to K and from B to C are matched within accuracy about $+/-\Delta L/4$, where $\Delta L$ is clearing gap duration. With such accuracy, a figure of merit (deviation of acceleration gradient from nominal times duration of such deviation) is about 10 times smaller than in the case of non-coordinated clearing gaps, which is sufficient in this embodiment provided that gap duration is smaller than 500 ns. At the same time path lengths should be accurate to preserve the difference of phases of accelerating and decelerating bunches to about 180 degrees. In alternative embodiments the conditions are the same, but the clearing gaps are supplied at a higher rate, with the repetition rate of the gaps being rate substantially equal to one per $\Delta Z/nc$, where c is the average speed of the electron bunches along the bunch path and where n is an integer.

If the conditions set out in the preceding paragraph for providing the co-ordination of the clearing gaps according to the first mode of operation are complied with precisely then, subject to the effects of tolerances and variations of actual components in practice, matching clearing gaps in acceleration and deceleration phases are co-ordinated so that preceding (and following) electron bunches of the clearing gaps are precisely 180 degrees out of phase relative to the r.f. field during their passage through the LINACs, thus minimising the variation of electric field gradient in the r.f. cavities of the LINACs and maintaining optimum energy recovery operation of the LINACs.

If the conditions are deviated from then the matching clearing gaps in acceleration and deceleration phases may cause preceding (and following) electron bunches of the clearing gaps to shift from being precisely 180 degrees out of phase, but that may still provide a reduction in the variation of electric field gradient in the r.f. cavities of the LINACs compared to the case where the clearing gaps are not co-ordinated at all.

Points A to R and Z are only shown on FIG. 8 and are not shown on FIGS. 9 to 16, but it will be understood that those points are in the same positions on FIGS. 9 to 16 as shown on FIG. 8.

In a second mode of operation, illustrated schematically in FIGS. 12 to 16, the clearing gaps are provided at higher repetition rates than for the first mode of operation illustrated in FIGS. 8 to 11, and either eight or nine clearing gaps are present in the apparatus 240 along the electron bunch path between points between A and J at any one time.

Figure 14:
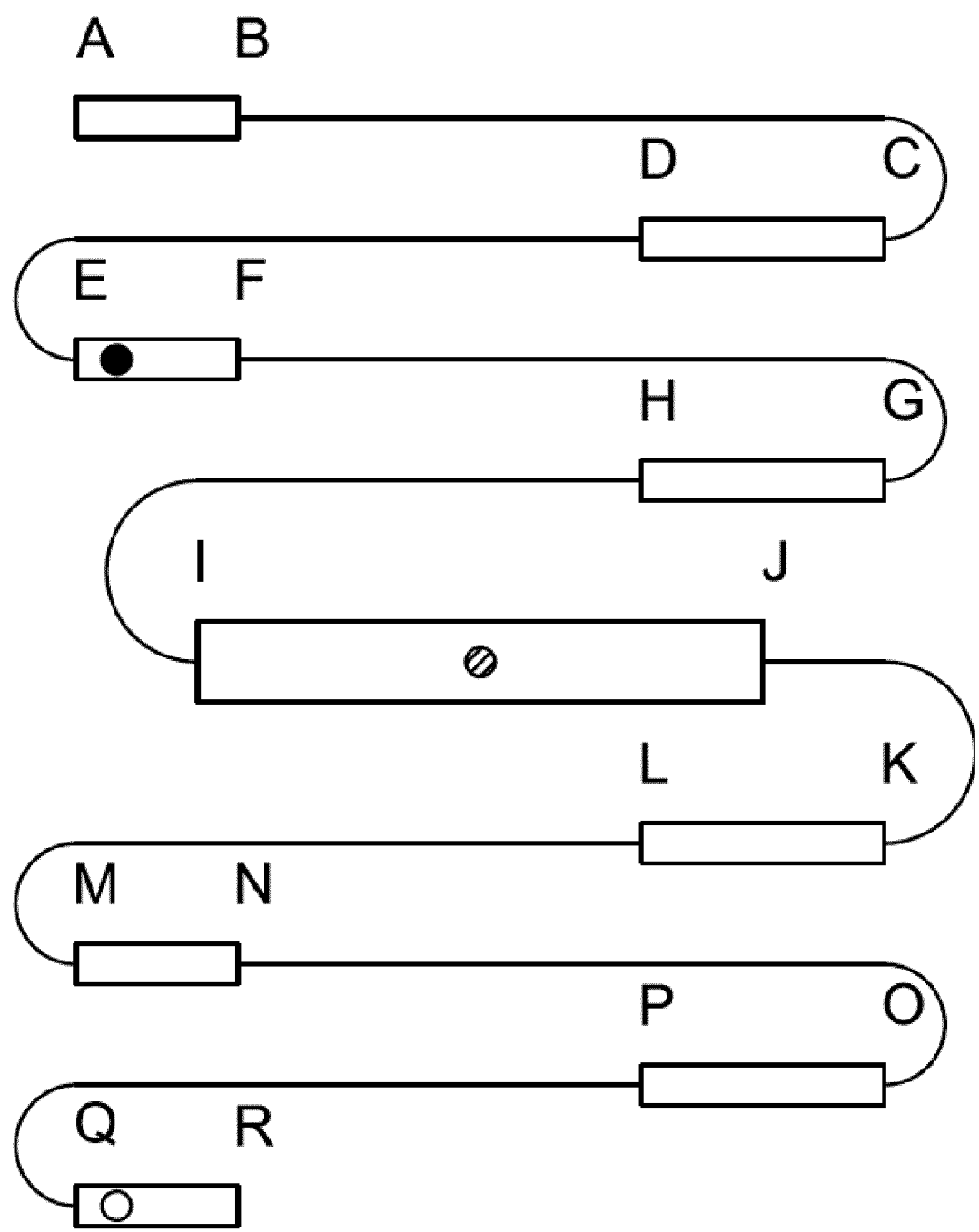
Figure 15:
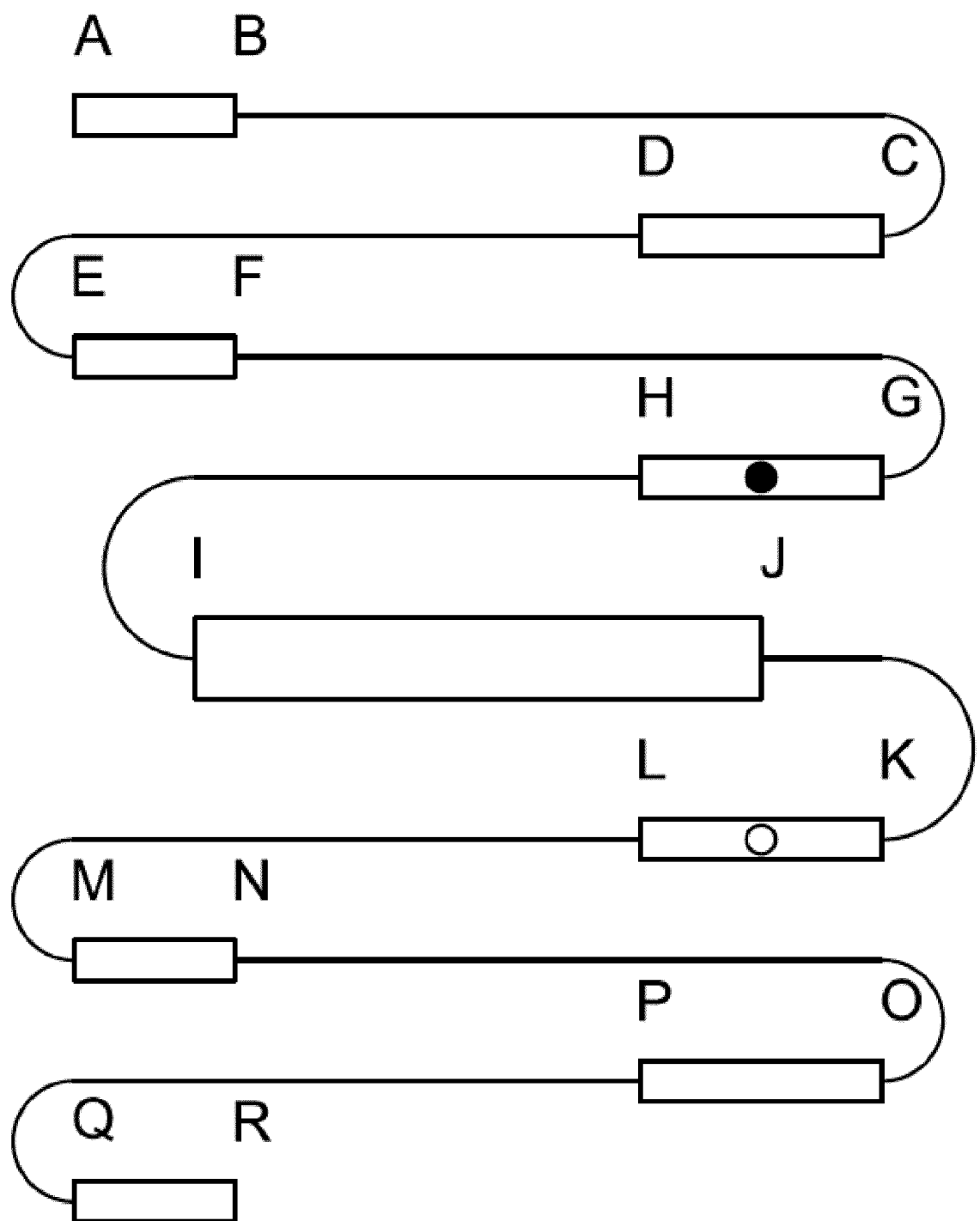
Figure 16:
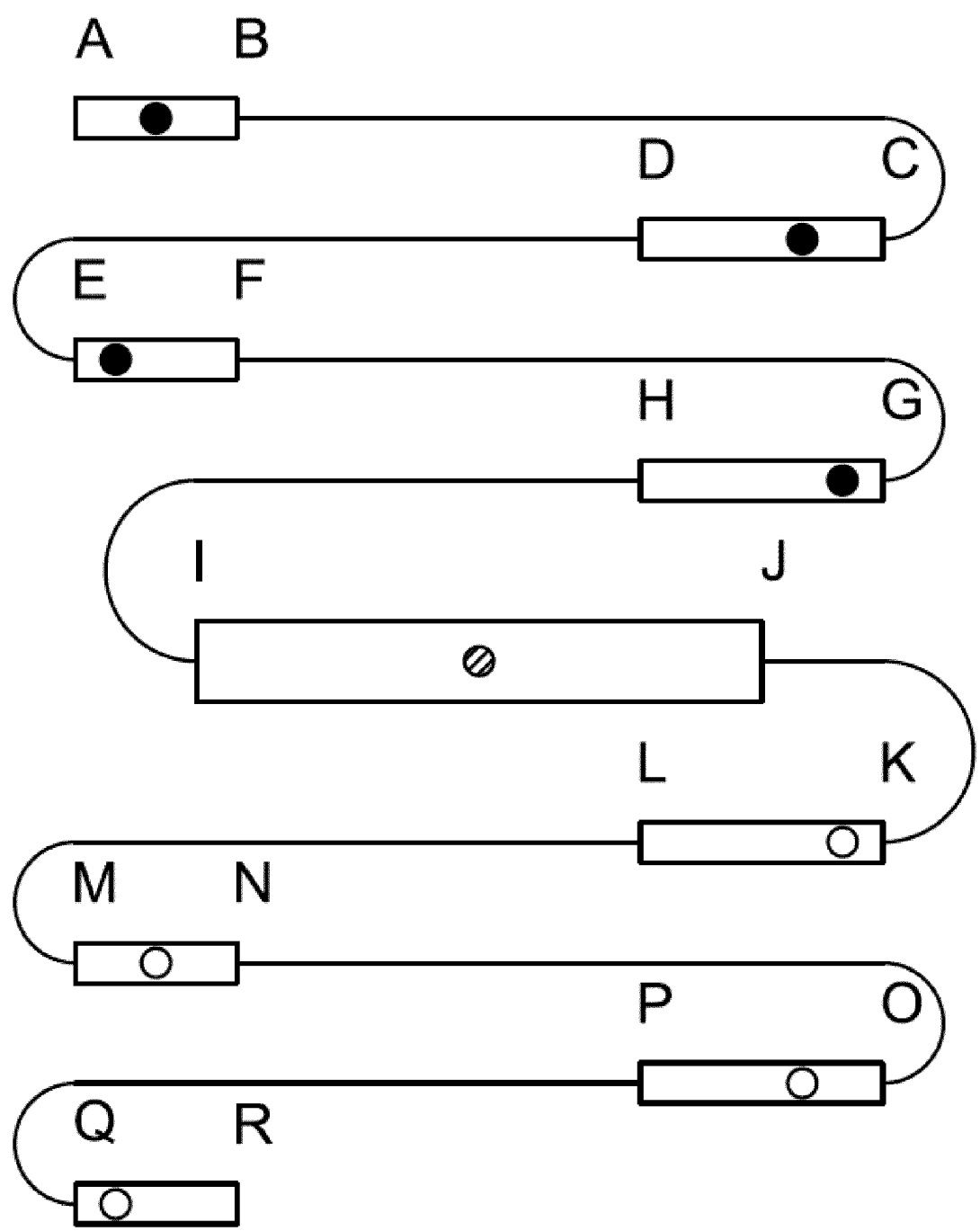
FIG. 16 is a schematic illustration showing the position of multiple clearing gaps along an electron bunch path at a point in time, according to the second mode of operation of the free-electron laser radiation source of FIG. 7.

FIGS. 12 to 15 show the progress of only one pair of the clearing gaps 260, 262 for clarity, with a further clearing gap 264 joining the sequence in FIG. 14. It can be seen that, as with the first mode of operation, each time one of the clearing gaps 260 passes through one of the LINACs 242a, 242b another one of the clearing gaps 262 or 264 is simultaneously present in that LINAC. The same also applies to the other pairs of clearing gaps (not shown in FIGS. 12 to 15 for clarity) that are simultaneously present along the electron bunch path according to the second mode of operation. FIG. 16 shows all nine clearing gaps simultaneously present along the electron bunch path at one moment in time for the second mode of operation.

The clearing gap sequence to provide the co-ordination of clearing gaps according to the second mode of operation, illustrated in FIGS. 12 to 16, is provided if there is a point Z in the beam path 247 including the undulator 244 such that the following conditions are substantially satisfied:

AC=CE=EG=GZ=ZK=KM=MO=OQ and if clearing gaps are supplied at a regular rate substantially equal to AC/c. It may also be that BC=NO and DE=PQ in some cases. In this case path equality (for example AC=CE) may mean that travel time of electron bunches from A to C and from C to E are matched within accuracy about +/−ΔL/4, where ΔL is clearing gap duration. In alternative embodiments the conditions are the same, but the clearing gaps are supplied at a higher rate, with the repetition rate of the gaps being rate substantially equal to one per AC/nc, where c is the average speed of the electron bunches along the bunch path and where n is an integer.

As was the case for the first mode of operation, if the conditions set out in the preceding paragraph for providing the co-ordination of the clearing gaps according to the second mode of operation are complied with precisely then, subject to the effects of tolerances and variations of actual components in practice, matching clearing gaps in acceleration and deceleration phases are co-ordinated so that preceding (and following) electron bunches are precisely 180 degrees out of phase relative to the r.f. field during their passage through the LINACs, thus minimising the variation of electric field gradient in the r.f. cavities of the LINACs and maintaining optimum energy recovery operation of the LINACs.

If the conditions are deviated from then the matching clearing gaps in acceleration and deceleration phases may cause preceding (and following) electron bunches of the clearing gaps to shift from being precisely 180 degrees out of phase, but that may still provide a reduction in the variation of electric field gradient in the r.f. cavities of the LINACs compared to the case where the clearing gaps are not co-ordinated at all.

Figure 17:
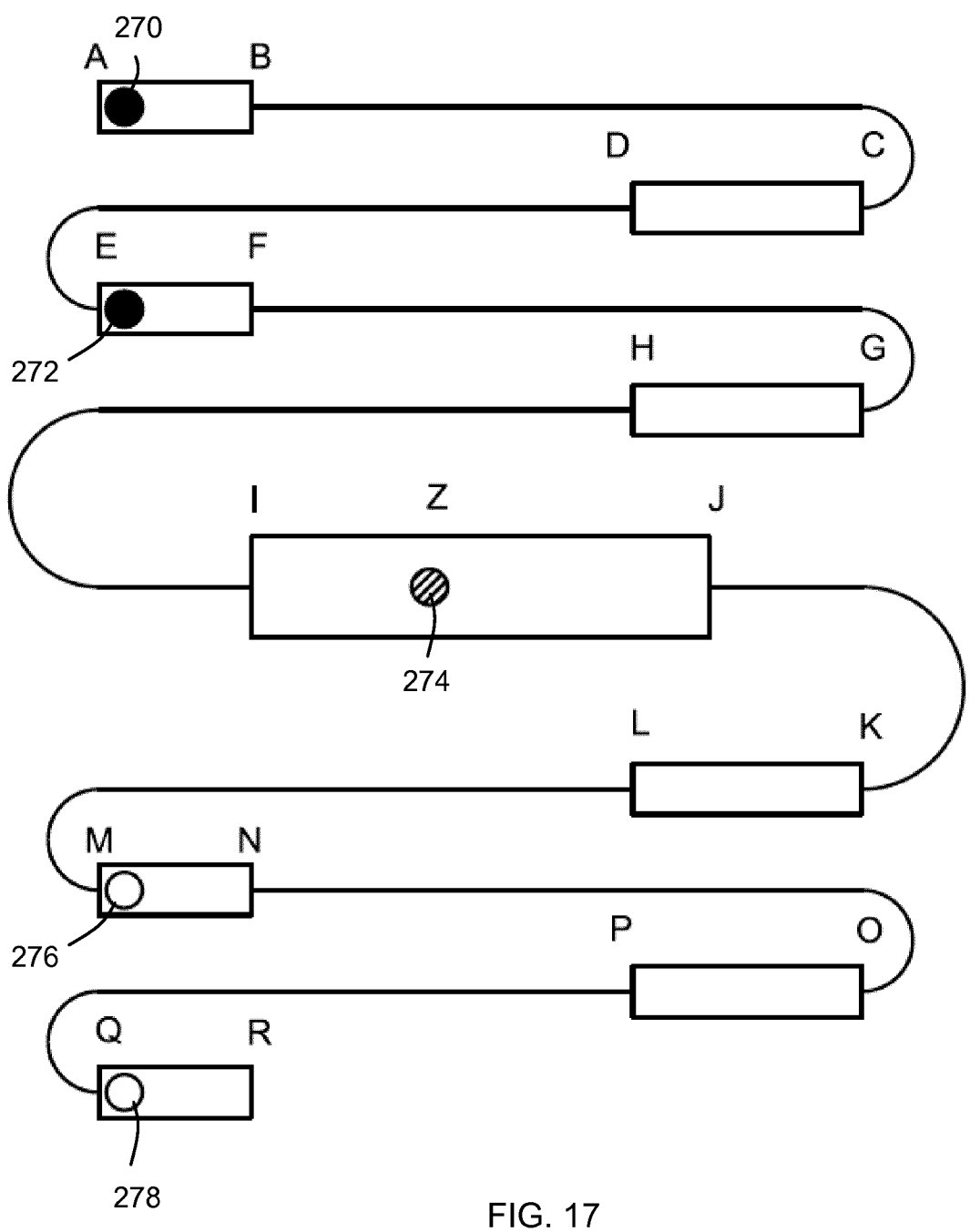
FIGS. 17 and 18 are schematic illustrations showing the progress of clearing gaps along an electron bunch path according to a third mode of operation of the free-electron laser radiation source of FIG. 7.
Figure 18:
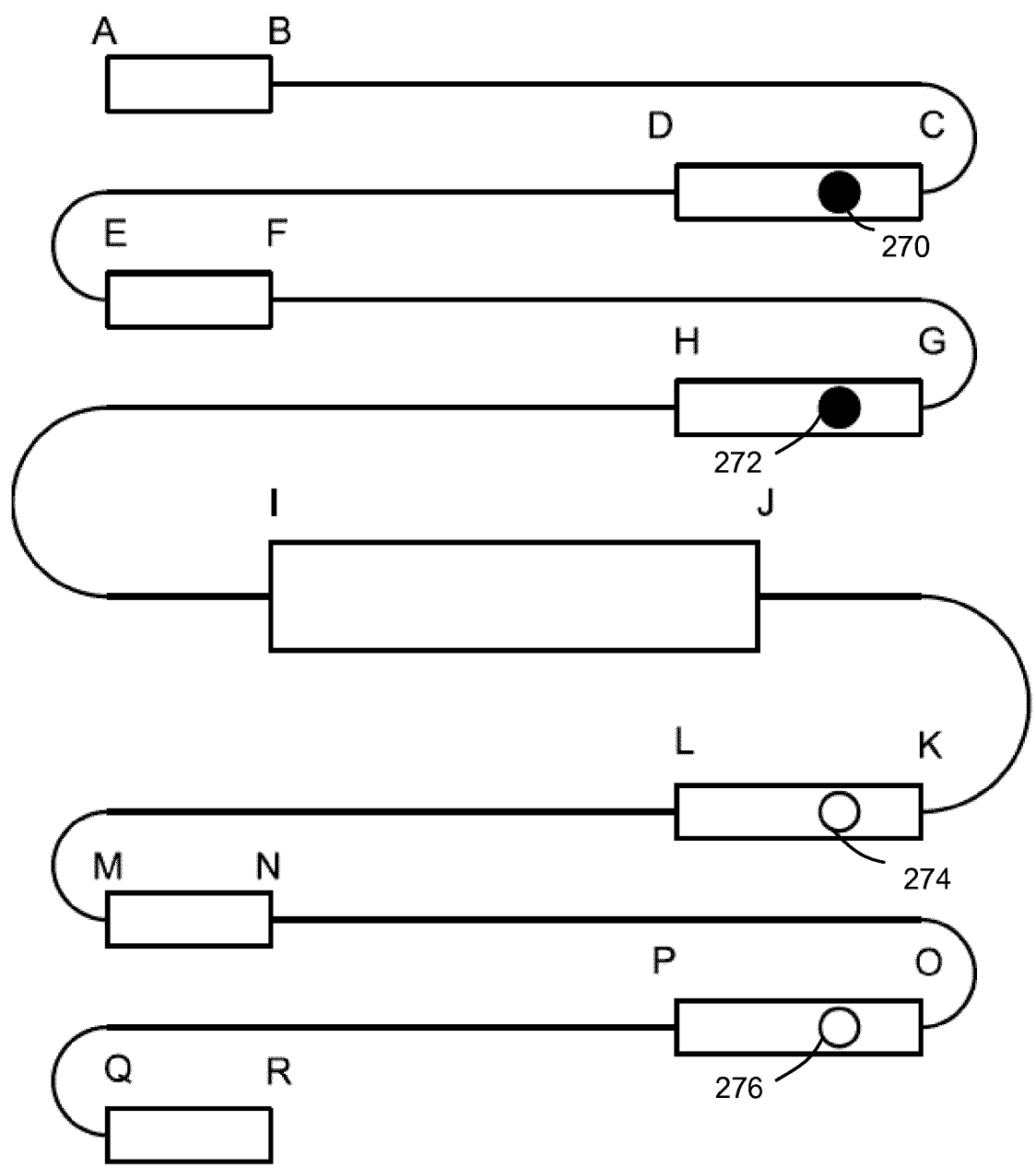

A third mode of operation is illustrated schematically in FIGS. 17 and 18, which show the progress of clearing gaps 270, 272, 274, 276, 278. The filled circles indicate clearing gaps present between accelerating bunches, the clear circles indicate clearing gaps present between decelerating bunches and the hatched circle indicates a clearing gap present between bunches that are neither accelerating nor decelerating.

The clearing gap sequence to provide the co-ordination of clearing gaps according to the third mode of operation, illustrated in FIGS. 17 and 18, is provided if there is a point Z in the beam path 247 including the undulator 244 such that the following conditions are substantially satisfied:

AC=EG=ZK=MO; and

CE=GZ=KM-OQ and the bunch repetition rate is one per AE/c, where c is the average speed of the electron bunches. In this case path equality for two paths (for example AC=EG) may mean that travel time of electron bunches for one of the paths (for example A to C) and the other of the paths (for example) are the same to an accuracy of about +/−ΔL/4, where ΔL is clearing gap duration. In alternative embodiments the conditions are the same, but the clearing gaps are supplied at a higher rate, with the repetition rate of the gaps being rate substantially equal to one per AE/nc, where c is the average speed of the electron bunches along the bunch path and where n is an integer.

Each described mode of operation can be extended to higher number of bunches travelling within the free electron laser radiation source, for example by doubling, tripling or multiplying by any other suitable integer the repetition rate of the clearing gaps. Also, the loop including the undulator may contain more than one bunch (as described before), but then the length of the loop (measured from the beginning of the second LINAC through the undulator to the beginning of the second LINAC again) should be N times longer than one in the described cases, where N is an integer.

Each of the first, second and third modes of operation provide a required pattern of clearing gap overlap within LINAC modules of the first and second LINACs. A difference between them is the repetition rate of the clearing gaps and thus the number of clearing gaps simultaneously present in energy recovery LINACs of the apparatus.

Following investigation of ion stability for different rate of clearing gap repetition it has been discovered that lower repetition rate can be beneficial (provided accelerating gradient variation of a booster component of the injector 241 in response to alternating load can be sufficiently well compensated). The benefit can be understood from the observation that with same duty cycle and lower repetition rate of clearing gaps the drift time ions have to clear the beam increases.

It will be understood that other clearing gap sequences that provide for simultaneous presence of clearing gaps in acceleration and deceleration phases in the energy recovery LINACs of the apparatus of FIG. 7 are possible in alternative embodiments. However, the clearing gap sequences of the modes of operation described in relation to FIGS. 8 to 18 have lower repetition rates than at least some other suitable clearing gap sequences. Other sequences (with higher number of bunches travelling in the loop which includes the undulator 244) are possible, but may not be optimal.

The conditions for the modes of operation described above in relation to FIGS. 8 to 16 have been set out. Other operating parameters, for example length and repetition frequency of the electron bunches, energy of the electron bunches, length of the clearing gaps may be varied in accordance with those conditions.

In modes of operation in one embodiment in accordance with FIG. 7 and FIGS. 8 to 18, the average beam current is a few tens of milliamps, and the beam energy at the undulator is a few hundred MeV. The repetition rate of the electron bunches is a few hundred MHz, and a few tens of kW of power is delivered in the EUV radiation beam emitted by the undulator. The LINACs provide acceleration of around 5 to 10 MV/m in these embodiments, with a required final energy of ~1 GeV, which results in acceleration length of around 100 m to 200 m, which in turn results in an acceleration plus deceleration length of around 200 to 400 m. The length of arcs connecting LINACs and undulator is defined by minimal bending radius (~10 m, limited by coherent synchrotron radiation losses) thus overall length of the bends is ~100 to 200 m. Undulator length with added injector length is also ~100 m. Thus, the length of the electron bunch path is thus around 800 m and the optimal clearing gap repetition period in this case is around 1 µs, for example 1.3 µs, which corresponds to the case with three clearing gaps travelling in the system (2*c*T=800 m). The optimum clearing gap repetition rate is thus around 1 MHz in this case, as it provides the longest clearing gaps with a given duty cycle, and the clearing gaps duty cycle to at least 10% of the beam pattern duration (e.g. the length of the clearing gap is at least 10% of the clearing gap repetition period in this case), corresponding to a length of each clearing gap of around 100 ns minimum. The duty cycle (5% to 25%) with repetition rate ~1 MHz is found to be most efficient to cause ion removal from the electron beam by ion motion stability simulations.

Simulations have been performed for the apparatus of FIG. 7 in which clearing gaps are provided but are not co-ordinated such that clearing gaps in their acceleration and deceleration phases do not overlap during their passage through the LINACs (e.g. so that the clearing gaps are not provided in accordance with the modes of operation described in relation to FIGS. 8 to 18). The presence of such non-matching clearing gaps causes a variation in electric field gradient in the LINAC modules. It is found that a relative r.m.s. amplitude variation of the full gradient in the LINAC modules of up to around $5 \times 10^{-3}$ may be acceptable from the specification on EUV wavelength variation (for 1 MHz clearing gap repetition frequency, length of clearing gap of around 100 ns, beam current around 20 mA and electric field gradient in superconducting radio frequency cavities of the LINAC of around 10 MV/m).

It is noted that in some embodiments, there is a further LINAC associated with the electron source, and referred to as a booster of the injector (the accelerator which brings electron bunch energy to ~10 MeV and through which only one beam—from the electron source—passes). The electron beams cannot be balanced in that further LINAC as it is used for acceleration of the electron bunches before injection into the loop. Application of clearing gaps will cause significant gradient variations that cannot be compensated by state of the art RF amplifiers. The variation budget for such cases is strict: ~$10^{-4}$ relative energy variation due to filtering off unwanted electrons after the booster in the dispersive sections of the beam line. Usually energy acceptance of such filtering is ~1% and the electron beam needs a margin to pass through a collimator of the apparatus without losing too many electrons in the nominal case. Thus, the clearing gap pattern that is selected is dependent on gradient variations in the booster as well as on the desire to provide zero current moments for parts of the energy recovery LINAC where several beams co-propagate.

Figure 19:
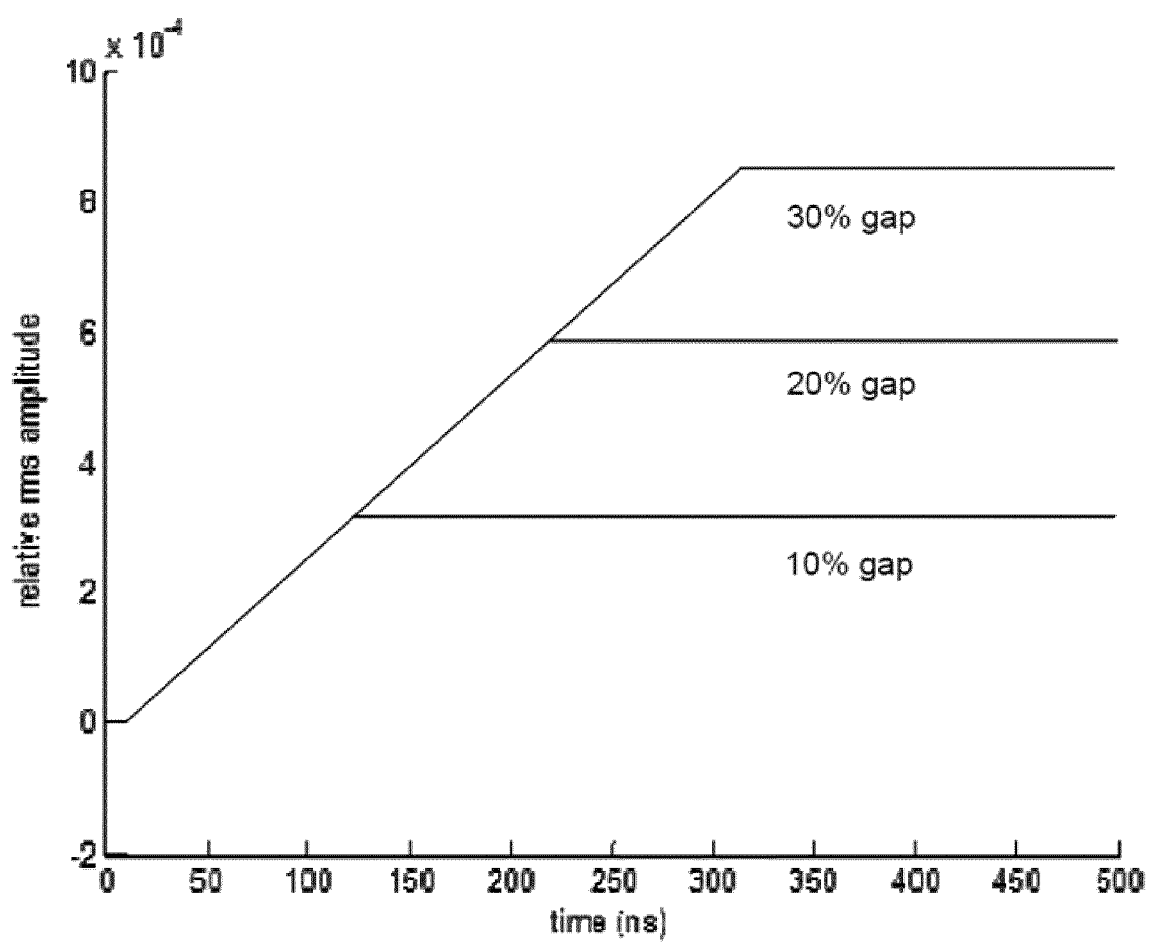
FIG. 19 is a graph of relative r.m.s. amplitude gradient variation in LINAC modules during passage of a clearing gap, in a case where passage of the clearing gap is not co-ordinated with other clearing gaps.

FIG. 19 is a plot of relative r.m.s amplitude variation of the LINAC module gradient as a function of time for a LINAC module of the embodiment of FIG. 7, with a non-matching clearing gap being introduced to the LINAC module after around 8 ns, the gap repetition rate being 1 MHz. It can be seen that for a clearing gap that has a length equal to 10% of the clearing gap repetition period the relative r.m.s. amplitude variation of the LINAC module gradient stays within the acceptable level of around $5 \times 10^{-4}$. However, for longer clearing gaps relative to the clearing gap repetition period (20% or 30% gaps) it can be seen that the variation in electric field gradient becomes unacceptably high, and also that it scales approximately linearly with the gap size relative to the gap repetition period.

Although it can be understood from FIG. 17 that even non-matching clearing gaps may provide acceptable performance in some particular cases, if the clearing gap length is kept sufficiently short relative to the clearing gap repetition period, the use of clearing gap sequences that provide matching of clearing gaps in the LINACs (such as those described with reference to FIGS. 8 to 16) can provide for reduced LINAC electric field gradient variations, allow for the use of longer clearing gaps, and can provide acceptable performance levels despite possible variations of other operating parameters.

In practice, the clearing gaps in the electron bunch sequence can also provide clearing of ions at other parts of the electron beam path as well as in the undulator, for example in parts of the path where the electron beam is more focused than in other parts. Such parts of the path where the electron beam is more focused and ion clearing may occur comprise, in some cases, substantially straight sections of the path, for example one or more of a LINAC, a matching section before or after a bend, as well as the undulator. The beam is generally not so focused in bend sections, due to dispersion and as such focusing may cause deterioration of properties due to bend radiation.

A variety of parameters may be specified at the input of the undulator 24 of the FEL in order to achieve a desirable conversion efficiency and power of produced EUV radiation. The peak current of electron bunches may be of the order of 500 A. The average current may be of the order of tens of milliamps such as, for example, 30 mA. The transverse emittance of the electron beam may be limited to the order of tenths of mm*mRad such as, for example, less than 0.6 mm*mRad. The longitudinal emittance of the electron beam may be limited to the order of tens of KeV*ps such as, for example, less than 100 KeV*ps.

A number of parameters may be specified at the output of the undulator 24 in order to further define conversion efficiency and power of produced EUV radiation. These output undulator parameters may also be specified to support energy recovery from used electron bunches in an energy recovery linear accelerator (LINAC). Transverse emittance growth of the electron beam may be limited in the full length of the undulator 24 in order to maintain a desirable gain length in the undulator. The transverse emittance growth of the electron beam may be limited to the order of tenths of mm*mRad such as, for example, being limited to 0.1 mm*mRad.

The transverse emittance and longitudinal emittance of the electron beam may be limited when the electron bunches are decelerated and directed towards the beam dump 26 in order to restrict the number of potentially damaging electron losses when approaching the beam dump. The transverse emittance of the electron beam may be limited to the order of ones of mm*mRad such as, for example, 1 mm*mRad. The peak to peak longitudinal emittance of the electron beam may be limited to the order of 5%. Any additional scattering produced emittance growth occurring between the undulator 24 and the beam dump 26 may be limited to a range of the order of 0.1 to 1 mm*mRad in order to further restrict any associated electron losses.

Known free electron lasers are operated under ultra-high vacuum conditions. For example, a free electron laser may be operated at a residual pressure of approximately 1 nTorr. However, residual gas is still present in the electron beam path during operation. The majority of the residual gas consists of Hydrogen. As explained further above, during operation of the FEL accelerated electrons collide with residual Hydrogen gas producing positive ions. Synchrotron radiation emitted by the accelerated electrons also interacts with the residual Hydrogen gas resulting in the production of further positive ions. Without any mitigation efforts the number of positive ions created in the electron beam path increases and the positive ion charge matches the electron beam charge in approximately ten seconds. When the positive ion charge matches the electron beam charge there is a large increase in electron beam emittance due to the effects described below.

Most positive ions are created near the centre of the electron beam. Once created, the positive ions are forced towards the electron beam axis due to electromagnetic interactions with the electron beam. The force experienced by a positive ion is proportional to the distance between the positive ion and the electron beam axis. This proportionality causes the positive ions to oscillate about the electron beam axis. In a set of regular electron bunches that have near uniform charge and/or emittance the positive ion oscillation is uniform and takes place within a small diameter around the beam axis. That is, the ions are 'trapped' oscillating within the electrostatic potential of the electron beam without any significant change in oscillation amplitude or velocity.

A cloud of oscillating positive ions forming and surrounding the electron beam will alter the momentum of the electrons. The electrons will be forced towards the electron beam axis due to electrostatic interactions with the surrounding positive ions. The change in momentum experienced by the electrons results in a change of the electron beam emittance.

The electron beam emittance may increase so much so that the FEL conversion efficiency drops to zero as the electron beam is too diffuse to form coherent microbunches in the undulator 24 (see FIG. 3). The increase in electron beam emittance may also result in a significant number of electron loses in the FEL due to electrons deviating from the intended beam path. Where this is the case the energy recovery LINAC 22 is unable to operate as too few electrons reach the energy recovery section of the LINAC.

The concentration of positive ions should be approximately 4 or more orders smaller than the concentration of electrons in order to limit deterioration of the electron beam emittance. To achieve this limitation of electron beam emittance deterioration the positive ions should be removed from the electron beam within approximately 1 millisecond of being created.

Several strategies may be used alone, or in various combinations, to remove positive ions from the electron beam. One strategy involves placing ion extraction electrodes in locations where positive ions accumulate. The ion extraction electrodes provide an electric field which forces positive ions out of the electron beam. Ion extraction electrodes are particularly effective at removing heavy ions for example ions with a mass to charge ratio greater than ten. Another strategy as mentioned above involves introducing ion clearing gaps which allow positive ions to drift out of the electron beam.

One method of removing positive ions from the electron beam path involves introducing fast variation of the electron bunch properties such as charge and/or emittance. Such variation may be introduced for electron beams with and without clearing gaps. Such variation applied to an electron beam with clearing gaps may reduce steady state ion concentration by two or more orders of magnitude, compared with practicing clearing gaps only. Altering the charge and/or emittance of the electron bunches may cause unwanted variation of acceleration gradients in the energy recovery section of the LINAC 22. The charge and/or emittance of the electron bunches may be varied within a pre-determined range to avoid detrimental effects to the operation of the LINAC. The function defining the variation of bunch charge and/or emittance may be chosen such, that average charge (average emittance) delivered by the electron beam per every bunch train is kept constant or may be allowed to deviate by no more than 10% from nominal, optionally by no more than 1% from nominal. Such a function with a variation of between approximately 1% and 10% of the electron beam charge and/or emittance may provide sufficient positive ion removal without negatively impacting the operation of the energy recovery section of the LINAC 22. The variation may be a peak-to peak variation of the nominal values of the electron beam charge and/or emittance. The charge and emittance of electron bunches may be coupled i.e. increasing (decreasing) the bunch charge by 1% may increase (decrease) the bunch emittance by 1%.

The method of introducing fast variation of electron bunch properties to remove positive ions from the electron beam may be understood by considering a bunched electron beam without any ion clearing gaps. The transverse electron bunch charge distribution may be approximated as a Gaussian distribution centred on the electron beam axis. The size of the electron beam in the transverse plane may therefore be described as the width of this Gaussian distribution ($\sigma$). The majority of positive ions will be produced within two-sigma of the electron beam size. Within the two-sigma region of the electron beam the effect of the electron bunches acting on the positive ions may be linearized. That is, the force, or change in velocity, experienced by the positive ions due to the electron bunches is proportional to the distance of the positive ions from the electron beam axis:

$$\Delta v_{x,y} = \frac{2r_p c N_b A}{Z \beta \sigma_{x,y}(\sigma_x + \sigma_y)} * (x, y) = a_{x,y} * (x, y)$$

Wherein:
$r_p$—the classical proton radius;
A/Z—the ratio of ion mass (in atomic units) to ion charge;
c—the speed of light;
$\sigma_{x,y}$—the electron beam size in the x (or y) direction (Gaussian transverse beam shape);
$N_b$—the number of electrons in the electron bunch;
$\beta$—the ratio of the speed of the electron bunch to the speed of light;
(x, y)—the x (or y) coordinate of the ion with respect to the electron beam axis.

In the case of an electron beam that consists of regular electron bunches that share substantially the same properties the oscillation of positive ions within the electron beam may be described by the following matrix:

$$[A] = \left( \begin{bmatrix} 1 & 0 \\ -a_x & 1 \end{bmatrix} * \begin{bmatrix} 1 & t_b \\ 0 & 1 \end{bmatrix} \right)^N$$

Wherein:
N—the number of electron bunches
$t_b$—the time in which the ion may drift between the arrival of two electron bunches The modulus of the trace of the matrix [A] in the typical EUV FEL conditions described earlier is less than two. This result means that the ions are effectively 'trapped' within the electron beam. That is, neither the velocity nor the oscillation amplitude of the positive ions increase indefinitely after an arbitrary number of regular electron bunches have passed the positive ion.

Figure 20:
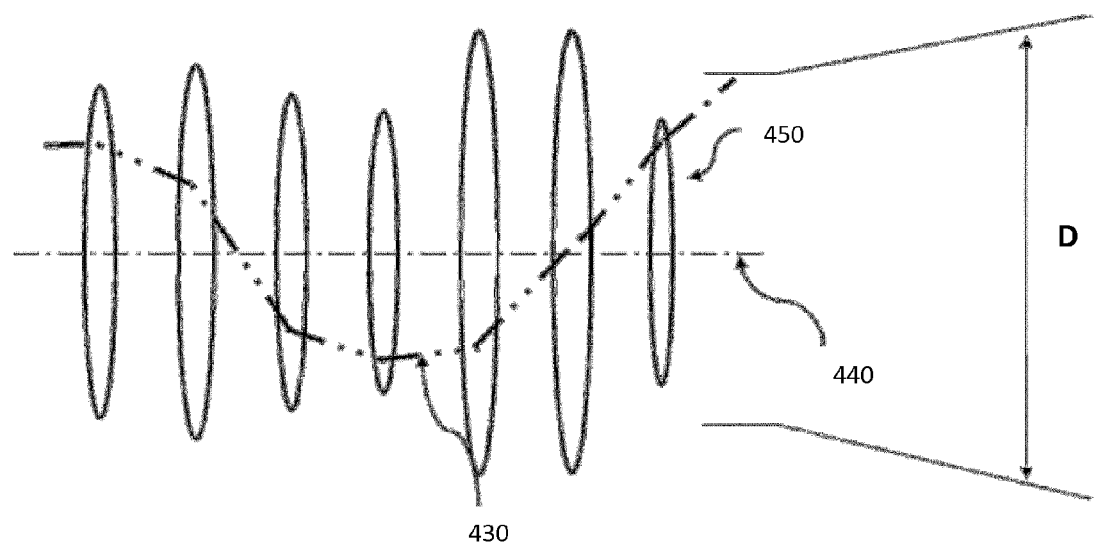
FIG. 20 is a schematic illustration of the effect of irregular electron bunches on the trajectory of positive ions in an electron beam path.

FIG. 20 is a diagram illustrating the effect of irregular electron bunches 450 on the trajectory of positive ion 430 in the electron beam path 440. Introducing fast variation of electron bunch charge and/or emittance creates a set of irregular electron bunches 450. Each electron bunch induces a different force on the positive ions. The differing induced forces acting on the positive ions cause a non-uniform oscillation 430 about the electron beam axis 440.

The differing forces exerted by the irregular electron bunches 450 on the positive ions can increase the amplitude of their oscillation 430 so that the positive ions exit the electron beam path 440. The positive ions oscillation amplitude D may increase so much that the positive ions collide with the beam-pipe wall of the FEL and recombine to form produce neutral species which may then be removed from the FEL via an ultra-high vacuum pump. The positive ion oscillation amplitude D may increase enough so that there are substantially no positive ions present in the electron beam path 440 even when large numbers of positive ions are present in the FEL.

Figure 23:
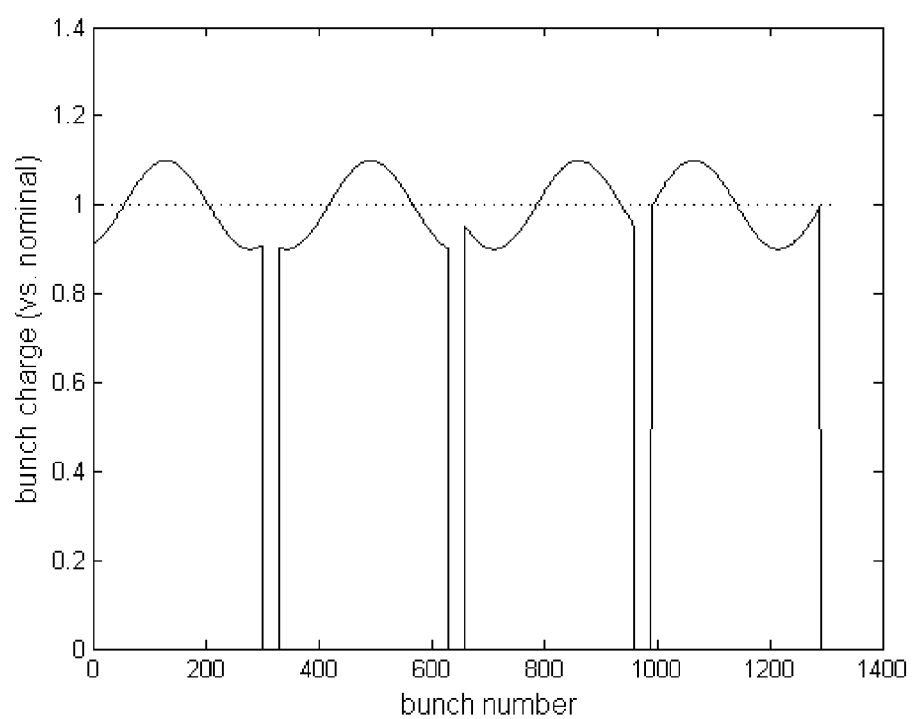
FIG. 23 is a graph of an example of an optimal charge modulation function

The removal of positive ions by electron bunch variation may be significantly accelerated via the introduction of ion clearing gaps. In typical FEL conditions (beam current few tens mA, beam size 0.1-1 mm, ion mass to charge ratio 1-30, clearing gap ~0.1 us, clearing gap repetition rate ~1 MHz) ions oscillate around central axis of electron beam with frequency in the range 0.1-10 MHz. By introducing a beam modulation function for charge and/or emittance in the same frequency range, it is possible to drive ions into resonance and thus to increase ions oscillation amplitude to the extent of the beam pipe quickly (<10 ms). By removing positive ions from the electron beam path the emittance growth of the electron beam is mitigated. This method of positive ion removal may maintain an acceptable FEL conversion efficiency whilst avoiding any detrimental effects to the operation of the LINAC 22. Examples of optimal modulation functions are given in FIGS. 23 and 24. An example of a sub-optimal modulation function is given in FIG. 25. FIG. 23 contains a sinusoidal modulation function, which experiences random jumps of phase from 0 to $2\pi$ during clearing gaps, which take 10% of oscillation period, thus in the Fourier spectrum frequencies from zero to ten times base frequency (base frequency ~1 MHz in this example) will be present, which effectively drives ions with the same range of eigen frequencies into resonance and thus removes them.

Figure 21:
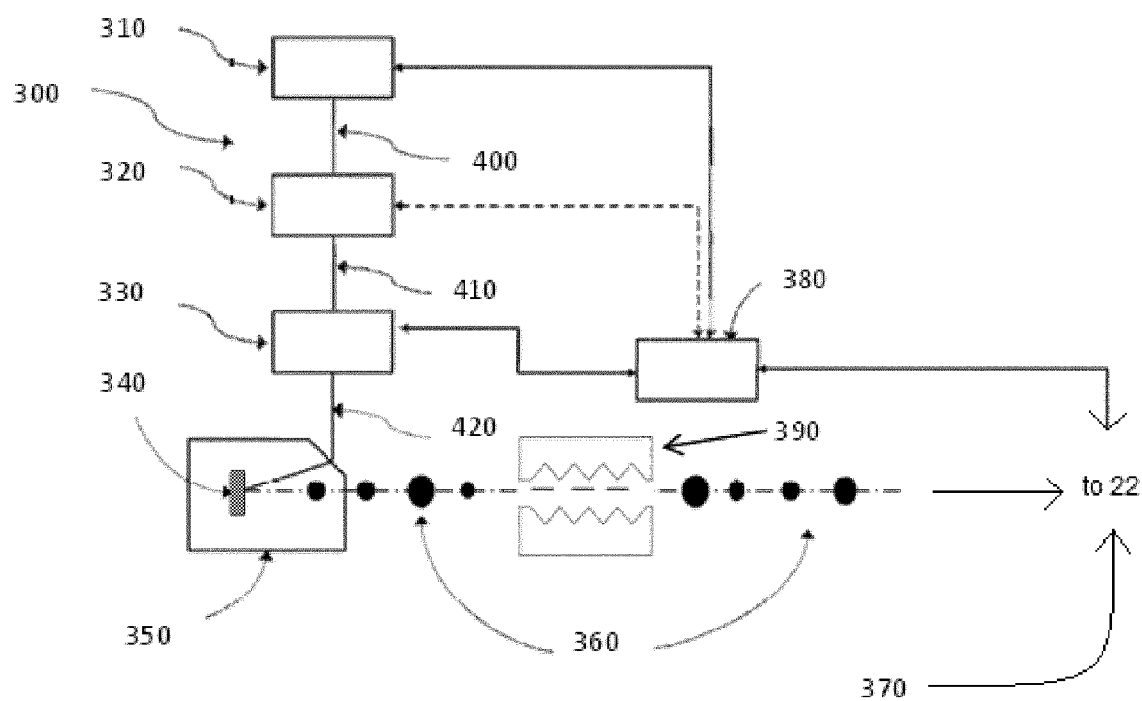
FIG. 21 is a schematic illustration of an embodiment of an electron injector.

FIG. 21 is a schematic depiction of an embodiment of an electron injector. The injector comprises a drive laser 310, a cathode 340 and an electron booster 390. The cathode 340 is inside an electron gun chamber 350. The electron gun chamber 350 is arranged to receive a beam of radiation 420 from a radiation source 300. The radiation source 300 may, for example, comprise a drive laser 310 which emits a laser beam 400. The drive laser may comprise a seed laser and optical amplifiers (not shown). The laser beam 420 is directed into the electron gun chamber 350 and is incident on the cathode 340. In the embodiment shown in FIG. 21, the laser beam 420 is reflected by a mirror (not shown) such that it is incident on the cathode 340.

The cathode 340 is held at a high voltage. For example, the cathode 340 may be held at a voltage of approximately several hundred kilovolts. The cathode 340 may be held at a high voltage by using a voltage source which may form part of the electron gun chamber 350 or may be separate from the electron gun chamber. Photons in the laser beam 420 are absorbed by the cathode 340 and excite electrons in the cathode. Some electrons in the cathode 340 are excited to a high enough energy state that they are emitted from the cathode. The high voltage of the cathode 340 is negative and thus serves to accelerate electrons which are emitted from the cathode away from the cathode, thereby forming a beam of electrons.

The laser beam 400 is a pulsed laser beam. Electrons are emitted from the cathode 340 in bunches which correspond to the pulses of the laser beam 420. The electron beam therefore comprises a series of electron bunches 360. The laser 310 may, for example, be a picosecond laser and thus pulses in the laser beam may have a duration of approximately a few picoseconds. The voltage of the cathode 340 may be a DC voltage or an AC voltage. In embodiments in which the voltage of the cathode 340 is an AC voltage the frequency and phase of the cathode voltage may be matched with pulses of the laser beam 400 such that pulses of the laser beam coincide with peaks in the voltage of the cathode. Pulses of the laser beam 400 may be matched with accelerating fields in the electron booster 390 such that electron bunches 360 arrive at the electron booster at a time at which the accelerating fields act to accelerate the electron bunches. Similarly the laser beam pulses 400 and the accelerating fields of the LINAC 22 may also be synchronised.

The drive laser 310 sends a pulsed laser beam through a fast modulation unit 320 and a gap introducing unit 330 before the laser beam 420 is incident on the cathode 340. A control unit 380 is used to adjust the duration and timing of the drive laser 310. The control unit 380 is also used to control the fast modulation unit 320 and the gap introducing unit 330. A control loop exists between the control unit 380 and the energy recovery LINAC 22 and booster 390 which compensates for alterations of the accelerating gradients in the LINAC. If the electron bunches are modulated using a known function, a feed-forward loop may exist between the control unit 380 and the LINAC 22. If electron bunch modulation is to be implemented via noise amplification of the drive laser 310 then the fast modulation unit and the drive laser may be combined to form a single unit.

The electron beam which is emitted from the cathode 340 is accelerated by the electron booster 390. The electron booster 390 serves to accelerate the electron bunches along a beam path and towards the energy recovery LINAC 22 which further accelerates the electron bunches to relativistic speeds. The electron booster 390 may, for example, accelerate electron bunches 360 to energies in excess of approximately 5 MeV. In some embodiments the electron booster 390 may accelerate electron bunches 360 to energies in excess of approximately 10 MeV. In some embodiments the electron booster 390 may accelerate electron bunches 360 to energies of up to approximately 20 MeV.

The electron booster 390 may be similar to the energy recovery LINAC 22 and may, for example, comprise a plurality of radio frequency cavities and one or more radio frequency power sources. The radio frequency power sources may be operable to control electromagnetic fields in the beam path. As bunches of electrons 360 pass between the cavities, the electromagnetic fields controlled by the radio frequency power sources cause each bunch of electrons to accelerate. The cavities may be superconducting radio frequency cavities. Alternatively, the cavities may be conventionally conducting (i.e. not superconducting), and may be formed from, for example, copper.

As was described above each pulse of the laser beam 420 which is incident on the cathode 340 causes a corresponding electron bunch 360 to be emitted from the cathode 340. Each electron bunch 360 in the electron beam E is accelerated by the electron booster 390 and by the energy recovery LINAC 22. The accelerated electron bunches 360 pass into the undulator where they stimulate emission of radiation to form a radiation beam. The radiation beam is a pulsed radiation beam with each electron bunch 360 in the undulator causing emission of a pulse of radiation in the radiation beam. For each pulse in the laser beam 420 which is incident upon the cathode 340 there is therefore a corresponding electron bunch 360 in the electron beam and a corresponding pulse in the radiation beam which is emitted from the free electron laser FEL.

There are multiple ways in which the charge and/or emittance of electron bunches may be varied in order to remove positive ions form the electron beam path. One embodiment of the present invention involves altering the energy of laser pulses of the drive laser beam.

The energy of pulses emitted by the drive laser 310 may be altered through the amplification of noise associated with the drive laser (e.g. shot noise). For example, noise associated with a seed laser of the drive laser 310 may be applied to optical amplifiers which are used to amplify laser pulses. This will introduce a variation of the amplification provided by the optical amplifiers, thereby causing a pulse-to-pulse variation of the power of the laser pulses provided to the cathode 340. The noise amplification causes a pulse-to-pulse variation of electron bunch charge produced at the injector. That is, different amounts of electrons are emitted from the cathode 340 in each bunch due to different numbers of photons in each pulse through the amplified shot noise effect. High frequency (>10 MHz) modulation is optimal for removing ions with M/Z<10 in electron beams with σ<100 um (M/Z being the ratio of the mass of the ion in atomic units to its charge, σ being the electron beam size (Gaussian)).

The energy of laser pulses generated by the drive laser 310 may be altered using the fast modulation unit 320. The fast modulation unit 320 may for example comprise a Pockels cell. A Pockels cell together with a polarizer can be used to block light, the amount of light which is blocked being determined by the voltage across the Pockels cell. Modulation of the voltage across the Pockels cell may therefore be used to modulate the energy of pulses emitted by the drive laser 310 before the pulses are incident upon the cathode 340. Modulation of the energy pulses of the drive laser 310 will result in the modulation of bunch charge produced by the cathode 340 in the injector. Moderate frequency modulation (0.1-10 MHz) is efficient for ions M/Z<100 in electron beams σ<1 mm.

A further alternative embodiment of the present invention comprises inducing variation of the wavefront of pulses produced by the drive laser 310 before the pulses are incident upon the cathode 340. The variation of the wavefront of pulses produced by the drive laser may be achieved using a cavity amplified Pockels cell operated with high mode beating. Varying the wavefront of drive laser pulses reaching the cathode results in a changing profile of the illuminated area of the cathode 340. Changing the illuminated area of the cathode 340 causes a change in the space-charge dominated emittance of the produced electron bunches.

Yet a further alternative embodiment of the present invention consists of inducing a variation of the temperature of the cathode 340 to apply a variation of emittance of the produced electron bunches. Varying the cathode temperature between pulses changes the starting electron thermal energy to produce variation in starting electron bunch emittance. A different laser to the drive laser 310 may also be incident on the cathode and may be used to vary the temperature of the cathode in a random or modulated manner. The second laser may be IR laser, so to prevent electron emission by photo-effect. When the cathode temperature is different for each electron bunch then each electron bunch will have a different starting emittance.

Figure 22:
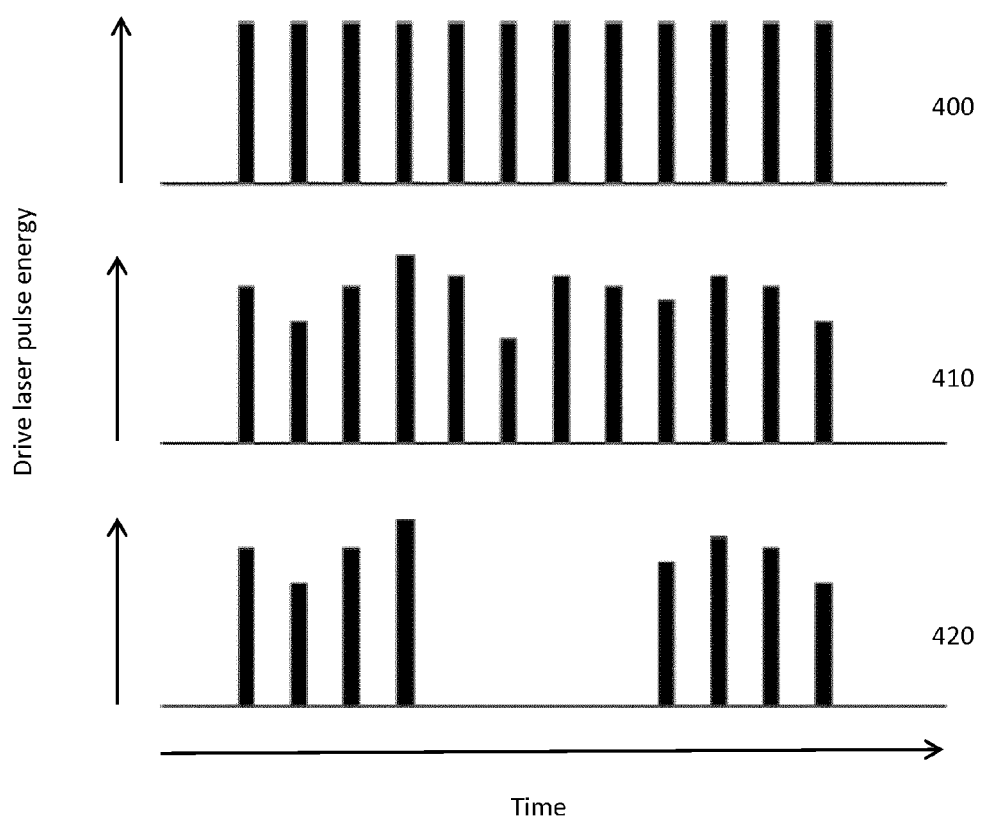
FIG. 22 is a graph of a change in energy of a set of laser pulses generated by a drive laser as they travel through a fast modulation unit and a gap introducing unit.
Figure 24:
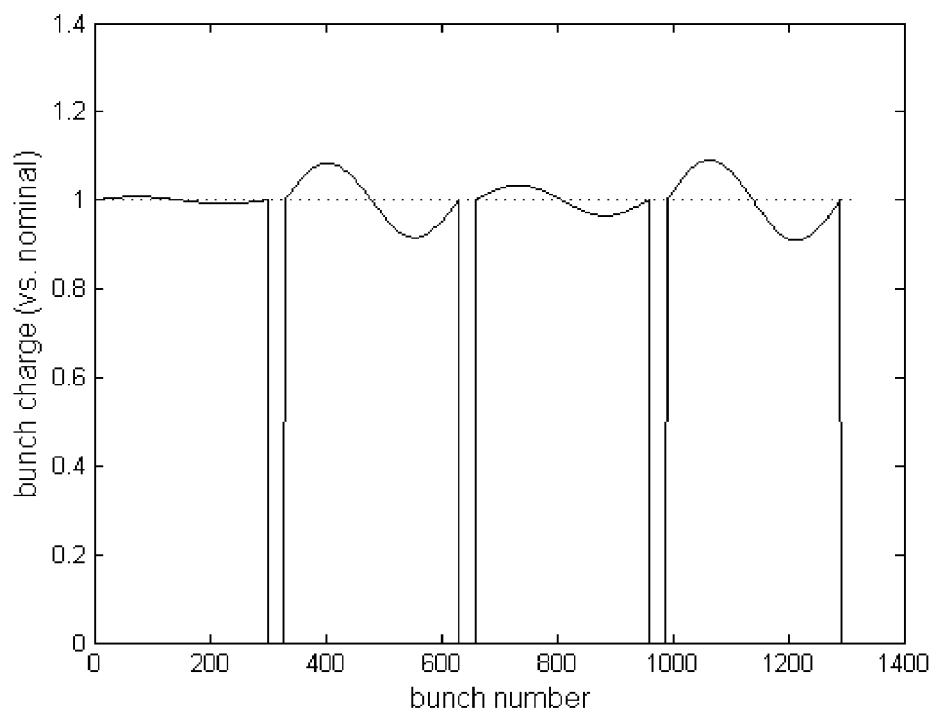
FIG. 24 is a graph of another example of an optimal charge modulation function
Figure 25:
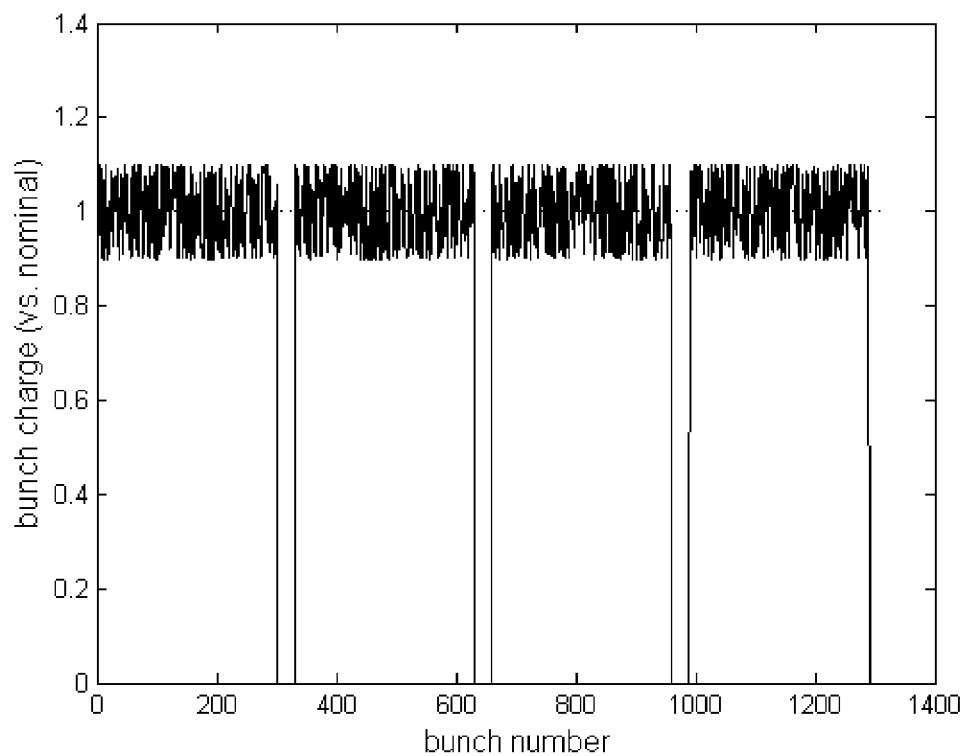
FIG. 25 is a graph of an example of a sub-optimal charge modulation function

FIG. 22 is an illustrative graph showing the change in energy of a set of laser pulses 400 generated by the drive laser as they travel through the fast modulation unit 410 and the gap introducing unit 420 depicted in FIG. 21. FIGS. 23 and 24 are illustrative examples of charge modulation functions, which are optimal for ion removal in typical FEL conditions (contain all frequencies in the range 0.1-10 MHz with sufficient power and preserve average charge per bunch train). FIG. 23 is an example of phase modulated charge (one or integer number of oscillation periods fit in one bunch train), phase of oscillation jumps [from 0 to $2\pi$] during the clearing gap. FIG. 24 is an example of amplitude modulated charge (one or integer number of oscillation periods fit in one bunch train) amplitude of modulation (within 0-10%) jumps during clearing gap. FIG. 25 is an example of high frequency modulation (on the pulse-to-pulse basis) which is only efficient for limited number of cases (M/Z<10 and σ<0.1 mm).

The fast modulation unit and the gap introducing unit may be separated, since each unit operates at very different frequencies and amplitudes.

Noise-like variation of phase and/or amplitude as described above of electron bunch charge and/or emittance will increase the efficiency of ion clearing gaps at removing positive ions from the electron beam path whilst ensuring only a small distortion of the accelerating gradients and current loading associated with the LINAC/s. The reduction in steady state concentration is at least two orders of magnitude, compared to the case of beam with every bunch similar and applied clearing gaps.

A feed forward loop operated using the control unit may be used to compensate for any current loading and acceleration gradient variation that may occur in the LINAC due to function-like modulated electron bunch charge and/or emittance variation.

The modulation unit 320 together with the control unit 380 may be considered to be an example of an ion removal apparatus, since these in combination apply a variation to the charge or emittance of the electron bunches which removes ions from the beam path. In embodiments in which a variation is applied to the drive laser 310 to vary the charge or emittance of pulses output from the drive laser, the drive laser together with the modulation unit 380 may be considered to be an example of an ion removal apparatus.

As mentioned earlier, this method of positive ion removal may be used alone or in combination with other ion removal methods. Other positive ion removal methods include, but are not limited to, the use of ion clearing gaps and/or the use of ion extraction electrodes. Using the method of fast variation of electron bunch properties to substantially remove positive ions from the electron beam may allow operation of a FEL to produce EUV radiation if the other methods are not sufficient in doing so.

As electron bunches pass through the FEL they induce electromagnetic wakefields within ion extraction electrodes that may be present. The creation of these electromagnetic wakefields constitutes a loss of electron beam energy and reduces the brightness of the electron bunches at the undulator 24. Fast variation of electron bunch properties may reduce the number of ion extraction electrodes required to substantially remove positive ions from the electron beam when used in combination. Having a reduced number of ion extraction electrodes present in the FEL system means that there will be fewer electromagnetic 'wakefield' loses experienced by the electron bunches which will improve the conversion efficiency of the FEL.

Using the technique of varying electron bunch properties may also simplify commissioning of the FEL LINAC system. This is because the removal of positive ions from the electron beam may eradicate the need to retune elements of the LINAC to compensate for the aforementioned electron beam focussing effect caused by positive ions. Fast variation of the electron beam properties may also reduce the vacuum requirements of the FEL as more positive ions may be removed from the electron beam with greater ease. For example the number of vacuum pumps required and/or the amount of gas absorbing coating applied to the inner walls of the FEL may be reduced.

Although ion extraction electrodes may induce electromagnetic wakefields as mentioned above, it may nevertheless be advantageous to use ion extraction electrodes in order to provide efficient extraction of ions from the FEL. In a typical arrangement electrodes are provided on opposite sides of a beam pipe within which the electron beam propagates. A voltage difference is applied across the electrodes and generates an electric field which extends between the electrodes and transverse to the direction of the electron propagation. Positive ions which are generated in the vicinity of the electric field are attracted towards a cathode of the extraction electrode. The ions receive electrons from the cathode or from a wall of the beam pipe and form neutral molecules. The neutral molecules are extracted from the beam pipe by a vacuum pump.

The electron beam of the FEL may itself provide a longitudinal electrical potential which pushes ions from their place of their generation towards extraction electrodes. Acceleration of a positive ion by this potential (which may be referred to as the effective beam potential) will depend upon the mass of the positive ion. Heavy ions (e.g. with an atomic mass greater than 10) will be accelerated less quickly than lighter ions. In some parts of the free electron laser, such as steering units 23, 25 (see FIG. 3), where the electron beam changes direction, the effective beam potential may be considerable. This may cause ions to move to extraction electrodes sufficiently quickly that they do not cause a significant deterioration of the EUV radiation beam emitted by the free electron laser. They may for example be extracted from the electron beam path within 1 ms. However, in other parts of the free electron laser, particularly where the electron beam is propagating in a straight line, the effective beam potential may be relatively small and as a result ions may not be extracted sufficiently quickly to avoid deterioration of the EUV radiation beam. The undulator 24 is an example of such a position. Although transverse dimensions of the electron beam may change as it propagates along the undulator 24 the sum of the X and Y dimensions remain relatively consistent and thus a flat longitudinal potential occurs. Consequently, there is little or no effective beam potential within an undulator module.

It may be impractical to provide extraction electrodes within for example a module of the undulator 24 of the FEL. The undulator 24 may for example comprise a plurality of modules which are around 2 m long and within which a beam pipe having a 1 cm diameter is provided. Providing extraction electrodes within such an undulator module may be difficult to achieve, and there is a risk that the extraction electrodes would compromise smoothness of the inner surface of the beam pipe. Furthermore, there may not be sufficient space within the undulator module to provide an opening for connection to a vacuum pump for extraction of molecules formed in the vicinity of the extraction electrodes. For these reasons, extraction electrodes may be provided between undulator modules rather than within undulator modules.

However, an ion generated towards the centre of an undulator module may take considerable time to travel to an extraction electrode located at one end of the undulator module. For example, an ion may take 10 ms or more to travel to an extraction electrode. This is undesirable because build-up of positive ions in the electron beam path will have a detrimental effect upon the emittance of the electron beam, which in turn will have a detrimental effect upon the EUV radiation beam emitted by the FEL. It may be desirable to extract positive ions within 1 ms after the positive ions have been generated.

Figure 26:
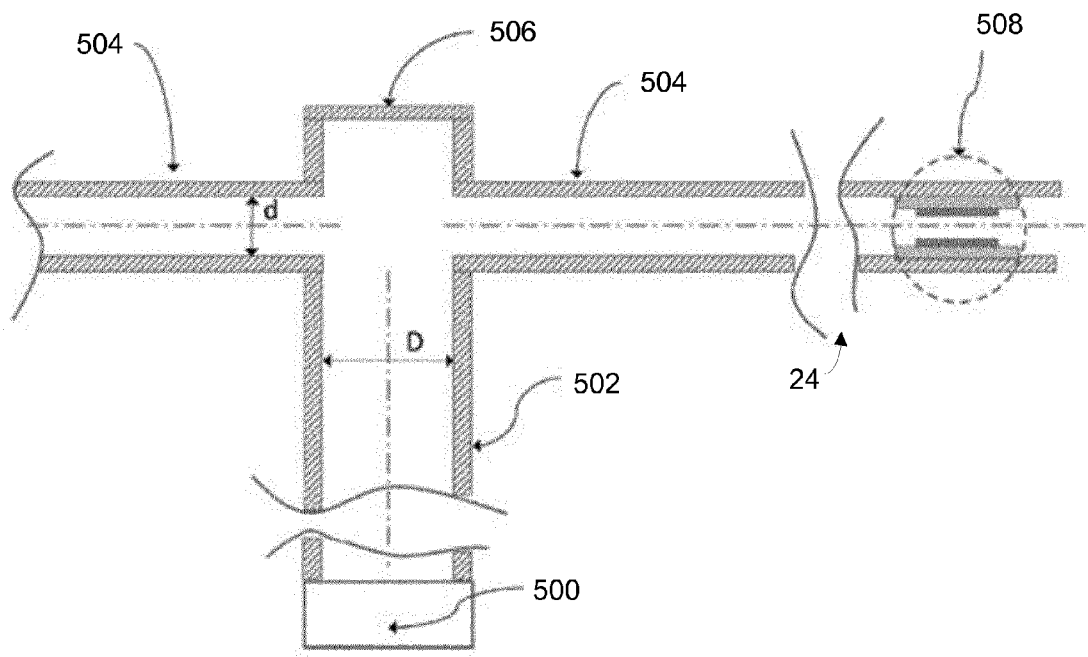
FIG. 26 is a schematic illustration of an RF electromagnetic wave injection apparatus.

An embodiment of the invention which addresses the above issue is illustrated schematically in FIG. 26, which shows an RF electromagnetic wave injection apparatus. A radio frequency (RF) electromagnetic wave emitter 500 is connected via a waveguide 502 to a beam pipe 504 which forms part of the free electron laser FEL. The RF emitter 500 and waveguide 502 may for example be provided between modules of an undulator, or may be provided at any other suitable location. A coupling antenna 506 (which may also be referred to as a resonance chamber) is provided at the location where the waveguide 502 meets the beam pipe 504. Extraction electrodes 508 are provided further along the beam pipe 504. For example, the extraction electrodes may be located on an opposite side of an undulator module 24 from the coupling antenna 506. The undulator module 24 is not depicted but is located in the labelled gap.

In an embodiment, the RF electromagnetic wave emitted from the RF emitter 500 propagates along the waveguide 502 and into the coupling antenna 506, but does not propagate along the beam pipe 504. Instead, an evanescent wave generated by the RF electromagnetic wave extends into the beam pipe 504. The evanescent wave provides an electric field with a gradient extending along the beam path 504. Positive ions experience an electrical potential gradient due to the electric field and will travel along that electrical potential gradient.

The evanescent electromagnetic wave extends into the undulator module 24 and provides an electrical potential which pushes positive ions out of the undulator module. The ions are pushed towards the extraction electrodes 508 which then remove the ions from the beam path. The electrical potential provided by the evanescent electromagnetic wave may be sufficiently strong that ions are removed from the beam path within 1 ms or less.

The electrical potential $U_w$ provided by the evanescent electromagnetic wave is maximum at the point where the guided RF electromagnetic wave meets the beam pipe 504. In the illustrated embodiment this is at the coupling antenna 506. The electrical potential drops with an average gradient of $U_w/\lambda_w$, where $\lambda_w$ is the wavelength of the evanescent electromagnetic wave in the beam pipe 504. The gradient of the electrical potential may for example be in the region of 0.1-10 V/m (this will depend upon the charge of the ion and the power of the electromagnetic wave). Ions follow the gradient of the electrical potential with an acceleration which depends upon the charge to mass ratio of the ions. The ions may be extracted for example in around 1 ms or less.

In an embodiment the evanescent electromagnetic wave may be applied continuously in a TE mode, i.e. with an electric field perpendicular to the axis of the electron beam path (the electron beam path is indicated by a dotted line in FIG. 26). Where this is the case the interaction of the electron beam with the magnetic field of the evanescent electromagnetic wave is zero (they are parallel to each other). An electron energy/momentum change caused by the electric field of the evanescent electromagnetic wave is of the order of 10 eV. This has a negligible effect upon the electron beam, and has a negligible effect on the EUV radiation beam emitted from the FEL.

In an alternative embodiment the evanescent electromagnetic wave may be applied continuously in a TM mode, i.e. with a magnetic field perpendicular to the axis of the electron beam path. Where this is the case an energy/momentum change of electrons caused by the electrical field may be around 100 KeV. The effect of the magnetic field is negligible.

In an embodiment, the RF emitter 500 may be operated in a pulsed mode in which the RF emitter only operates during ion clearing gaps. Where this is the case, the electron beam is completely unaffected by the evanescent electromagnetic wave because the evanescent electromagnetic wave is not present when the electron beam is travelling along the beam pipe 504.

In an embodiment, it may be desirable to provide an evanescent wave which extends along the beam pipe 504 by around 2 m (this may correspond with the length of an undulator module). It may be desirable to provide a potential gradient of 0.1 V/m or more. The beam pipe may for example have a radius of around 5 mm. According to the round waveguide formula in such an example the cutoff frequency for an electromagnetic wave is 17.58 GHz. This corresponds with a wavelength of 2 cm.

The following formula may be used to determine the frequency of electromagnetic wave which should be provided by the RF emitter 500:

$$f = \frac{f_c}{\left(1 + \left(\frac{\lambda}{\lambda_w}\right)^2\right)^{0.5}} \cong f_c\left(1 - \frac{1}{2}\left(\frac{\lambda}{\lambda_w}\right)^2\right) = \left(1 - \frac{10^{-4}}{2}\right)f_c$$

Where f is the cutoff frequency, λ is the wavelength which corresponds with the cutoff frequency, and $\lambda_w$ is the desired wavelength of the evanescent wave (2 m in this example). Using this equation it can be seen that a frequency which is around 8.8 MHz below the 17.58 GHz cutoff frequency will provide the desired evanescent wave.

Figure 27:
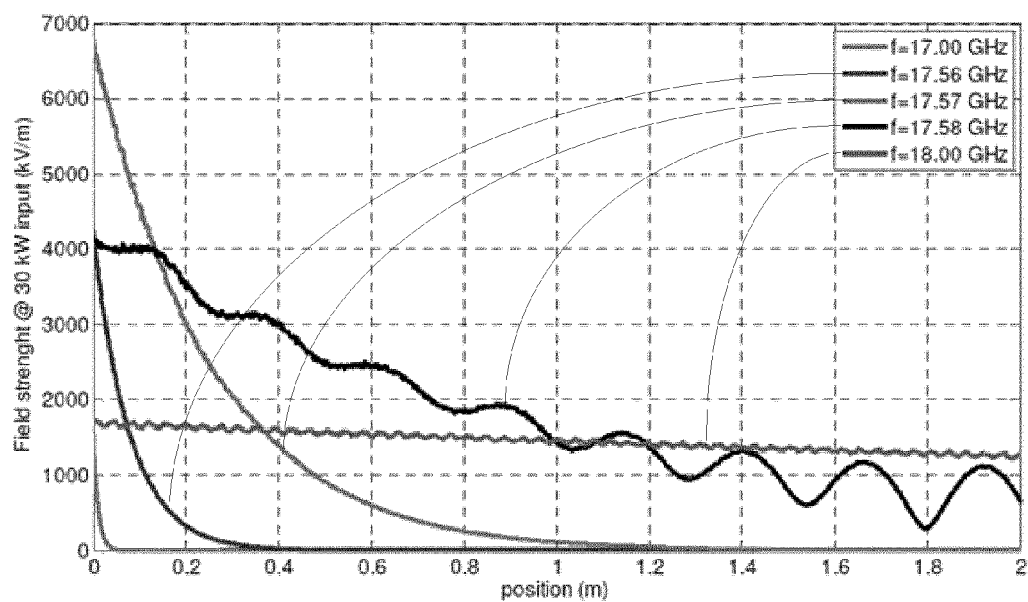
FIG. 27 is a graph which illustrates field strength of an evanescent electromagnetic wave generated using the electromagnetic wave injection apparatus.

FIG. 27 is a graph which shows how the field strength of an evanescent wave extending into a 5 mm radius beam pipe with a length of 2 m varies for different frequencies of RF wave. The cutoff frequency of the beam pipe is 17.58 GHz. The unlabelled curve depicted in the bottom left hand corner of the graph is the 17.00 GHz curve. As may be seen from the graph, for frequencies significantly below 17.58 GHz the evanescent wave extends along only a small proportion of the 2 m length of the beam pipe. As the frequency approaches 17.58 GHz the evanescent wave extends further along the beam pipe, for example extending by over 1 m when the frequency is 17.57 GHz. Furthermore, the evanescent wave at this frequency has a field strength with a substantial gradient (the field strength drops from 7,000 kV/m to zero). When the cutoff frequency is reached an evanescent wave is no longer present, and instead a modulating field is seen.

A tuneable RF source may be used to generate the RF signal which drives the RF emitter 500. The RF source may have a frequency stability of $1 \times 10^{-5}$ or better in order to ensure that a frequency can be provided which is sufficiently close to the cutoff frequency to provide the desired evanescent wave. An example of an RF source with stability better than $1 \times 10^{-5}$ is the N5193A signal generator which is available from Keysight Technologies, USA.

An electric field strength of around 300 kV/m may be desirable in order to provide an electrical potential which is sufficiently strong to remove a heavy ion (e.g. an ion with atomic mass units of 10 or more) from an undulator module within 1 ms or less. This may in turn require that a power of around 30 kW is delivered from the RF emitter 500. The electromagnetic wave is just below the cut-off frequency of the beam pipe 504, and as a result a significant amount of power may be dissipated due to ohmic losses in the beam pipe. Some power may also be dissipated in the extraction electrodes. The electrodes may be designed such that no resonance is induced at or adjacent to the electrodes which would increase power dissipation.

The width D of the waveguide 502 and the width d of beam pipe 504 are both labelled in FIG. 26. Providing the waveguide 502 with a greater width than the width of the beam pipe 504 may allow an RF electromagnetic wave to be generated in the waveguide which forms an evanescent wave in the beam pipe. In embodiments in which the waveguide or beam pipe has a circular cross-section the width corresponds with the diameter of the waveguide or beam pipe.

In an alternative embodiment, instead of arranging for an evanescent wave to extend into the beam pipe 504, propagating electromagnetic waves with two different frequencies may be provided in the beam pipe. The propagating waves may be sufficiently close in frequency that they generate a beating electromagnetic wave. The phases of the electromagnetic waves may be controlled to provide a maximum amplitude of the beating electromagnetic wave at an injection point (e.g. coupling antenna 506) and provide a minimum amplitude at extraction electrodes 508. The beating electromagnetic wave pushes ions along the beam pipe 504 towards the extraction electrodes 508. In an embodiment the injection point may be on one side of an undulator module 24 and the extraction electrodes may be on an opposite side of the undulator module.

In an embodiment which uses a beating electromagnetic wave the RF emitter may provide RF electromagnetic radiation at a frequency which is well below the cutoff frequency of the beam pipe 504. For example in an embodiment the frequency may be 9.75 GHz. Two electromagnetic waves are provided, and may have a detuning of around 1% between them. The strength of the electric field of the beating electromagnetic wave in the beam pipe 504 may for example be around 30 KV/m in order to provide a potential drop of 0.1 V/m for an ion with a mass of 10 atomic units (assuming that the ion is missing one electron). This electric field may be provided by generating electromagnetic waves with a power of around 300 W.

In general, the relationship between the electric field strength and the resulting electrical potential may be determined using the following equation:

$$U_{rf} = \frac{Z^2}{A} * \left(\frac{m_u c^2}{4}\right) * \left(\frac{\bar{\lambda} e E}{m_u c^2}\right)^2$$

where $U_{rf}$ is the electrical potential, Z is the charge of the ion, A is the mass of the ion in atomic mass units, $m_u c^2$ is the energy equivalent of the atomic mass unit (931.5 MeV), $\bar{\lambda}$ is the wavelength of the electromagnetic wave divided by 2π, e is the charge of an electron, and E is the amplitude of electric field oscillations in the electromagnetic wave.

A control unit (not illustrated) may be used to control an RF source which provides the RF signal that drives the RF emitter 500. The control unit may be used to tune the RF signal to provide a desired electromagnetic wave in the beam pipe 504 (e.g. an evanescent wave or a beating wave). A sensor may be used to monitor the strength of the electromagnetic wave.

In the above described examples the electromagnetic wave provided by the emitter 500 provides an electrical potential which pushes ions towards extraction electrodes 508. Additionally or alternatively, ions may be pushed by the electromagnetic wave to a location in the beam path in which the electron beam is so focused that ions which enter that location become unstable and are kicked towards the wall of the beam pipe 504 (e.g. due to the effect of clearing gaps and/or combination of clearing gaps and beam modulation or due to an additional electron being stripped from the ion by the electron beam which reduces its mass-to-charge ratio).

The free electron laser FEL may form part of the lithographic system LS of FIG. 1, wherein radiation produced by the free electron laser is ultimately received by one or more substrates within one or more lithographic apparatus $LA_1$-$LA_{20}$. These substrates may be considered to comprise target portions which are arranged to receive patterned radiation.

In an embodiment, there is provided a free electron laser (FEL) radiation source comprising an electron source for generating bunches of electrons; a plurality of linear accelerators (LINACs) for accelerating and decelerating the bunches of electrons; an undulator configured such that in operation passage of the bunches of electrons through the undulator generates radiation at a desired wavelength; a plurality of steering units for guiding the bunches of electrons along a desired electron bunch path between the electron source, the plurality of LINACs and the undulator, wherein the FEL radiation source is configured to operate such that in operation: each electron bunch passes along the electron bunch path from the electron source through each of the plurality of LINACs at least once during an acceleration phase, then passes through the undulator, then passes through the plurality of LINACs at least once during a deceleration phase; passage through the LINACs of electron bunches in their acceleration phase is coordinated with passage through the LINACs of electron bunches in their deceleration phase, to provide for energy recovery operation of the LINACs; and each successive pair of electron bunches are spaced in time by a respective bunch spacing, in accordance with a repeating electron bunch sequence, the electron source is configured to provide clearing gaps in the electron bunch sequence for allowing clearing of ions at the undulator; and the electron source is configured to provide the clearing gaps in accordance with a clearing gap sequence such that, for each of the plurality of energy recovery LINACS, and for substantially all of the clearing gaps: for each passage of the clearing gap through the LINAC in an acceleration phase or deceleration phase the clearing gap is coordinated with a further one of the clearing gaps passing through the LINAC in a deceleration phase or acceleration phase thereby to maintain energy recovery operation of the LINAC.

In an embodiment, the radiation source is configured such that, in operation, each electron bunch passes through each LINAC at least twice during an acceleration phase and at least twice during a deceleration phase. In an embodiment, the clearing gaps and the further one of the clearing gaps are coordinated such that that preceding and/or following electron bunches of the clearing gaps are substantially out of phase during their passage through the LINACs. In an embodiment, the electron bunch sequence comprises a periodic electron bunch sequence and the clearing gaps are provided by providing missing electron bunches from the periodic electron bunch sequence. In an embodiment, the clearing gap sequence is such that the clearing gaps are provided at a selected periodic rate that is dependent on the length of the electron bunch path, the electron bunch path comprises a plurality of loops, and the length of one of the loops that includes the undulator has a selected relationship to a length of at least one other of the loops, wherein the selected periodic rate and the selected relationship between loop lengths are such as to provide for the co-ordination of the clearing gaps in operation. In an embodiment, the plurality of LINACs comprise a first LINAC and a second LINAC, arranged such that in operation each electron bunch passes through each of the first and second LINACs at least two times during an acceleration phase and at least two times during a deceleration phase and there is a point (Z) in a path of the electron bunches such that: a distance (ZK) along the electron bunch path for an electron bunch in its deceleration phase from the point (Z) to the entrance (K) to the second LINAC for a first pass of the electron bunch in its deceleration phase through the second LINAC is substantially equal to a distance (BC) along the electron bunch path for an electron bunch in its acceleration phase from the exit (B) from the first LINAC to the entrance (C) to the second LINAC for a first pass of the electron bunch in its acceleration phase through the second LINAC; a distance (DE) along the electron bunch path for an electron bunch in its acceleration phase from the exit (D) from the second LINAC to the entrance (E) to the first LINAC for a second pass of the electron bunch in its acceleration phase through the first LINAC is substantially equal to a distance (LM) along the electron bunch path for an electron bunch in its deceleration phase from the exit (L) from the second LINAC to the entrance (M) to the first LINAC for the first pass of the electron bunch in its deceleration phase through the first LINAC; a distance (FG) along the electron bunch path for an electron bunch in its acceleration phase from the exit (F) from the first LINAC to the entrance (G) to the second LINAC for the first pass of the electron bunch in its acceleration phase through the second LINAC is substantially equal to a distance (NO) along the electron bunch path for an electron bunch in its deceleration phase from the exit (N) from the first LINAC to the entrance (O) to the second LINAC for the second pass of the electron bunch in its deceleration phase through the second LINAC; a distance (HZ) along the electron bunch path for an electron bunch in its acceleration phase from the exit (H) of the second LINAC to the point (Z) in the undulator is substantially equal to a distance (PQ) along the electron bunch path for an electron bunch in its deceleration phase from the exit (P) from the second LINAC to the entrance (Q) to the first LINAC for the second pass of the electron bunch in its deceleration phase through the first LINAC. In an embodiment, the clearing gaps are provided at a repetition rate R, and R or R*n (n is an integer) is substantially equal to one per AZ/c, where AZ is a distance along the electron bunch path from the entrance to the first LINAC for an electron bunch for its first passage through the first LINAC during its acceleration phase to said point (Z), and c is the average speed of the electron bunches along the electron bunch path. In an embodiment, for each pair of distances along the electron bunch path that are stated as being substantially equal (ZK=BC, DE=LM, FG=NO, HZ=PQ) a travel time of an electron bunch along one of those distances of the pair (ZK, DE, FG, or HZ) is substantially the same as, optionally different by less than $+/-\Delta L/4$ where $\Delta L$ is clearing gap duration, where c is the average speed of the electron bunches along the electron bunch path, to the travel time of an electron bunch along the other of those distances of the pair (BC, LM, NO, PQ). In an embodiment, the radiation source is configured to operate such that two or three clearing gaps are present simultaneously on the electron bunch path. In an embodiment, the plurality of LINACs comprise a first LINAC and a second LINAC, arranged such that in operation each electron bunch passes through each of the first and second LINACs at least two times during an acceleration phase and at least two times during a deceleration phase and there is a point (Z) in the path of the electron bunches such that: the distances AC, CE, EG, GZ, ZK, KM, MO and OQ are substantially equal, where: AC is a distance along the electron bunch path for an electron bunch in its acceleration phase from the entrance (A) to the first LINAC to the entrance (C) to the second LINAC for a first pass of the electron bunch in its acceleration phase through the first and second LINACs; CE is a distance along the electron bunch path for an electron bunch in its acceleration phase from the entrance (C) to the second LINAC to the entrance (E) to the first LINAC for a second pass of the electron bunch in its acceleration phase through the first LINAC; EG is a distance along the electron bunch path for an electron bunch in its acceleration phase from the entrance (E) to the first LINAC to the entrance (G) to the second LINAC for a second pass of the electron bunch in its acceleration phase through the first and second LINACs; GZ is a distance along the electron bunch path for an electron bunch in its acceleration phase from the entrance (G) to the second LINAC to a point (Z) in the undulator for a second pass of the electron bunch in its acceleration phase through the second LINAC; KM is a distance along the electron bunch path for an electron bunch in its deceleration phase from the entrance (K) to the second LINAC to the entrance (M) to the first LINAC for a first pass of the electron bunch in its deceleration phase through the first and second LINACs; MO is a distance along the electron bunch path for an electron bunch in its deceleration phase from the entrance (M) to the first LINAC to the entrance (O) to the second LINAC for a first pass of the electron bunch in its deceleration phase through the first LINAC; OQ is a distance along the electron bunch path for an electron bunch in its deceleration phase from the entrance (O) to the second LINAC to the entrance (Q) to the first LINAC for a second pass of the electron bunch in its deceleration phase through the first and second LINACs. In an embodiment, the clearing gaps are provided at a repetition rate R, and R or R*n (n is an integer) is substantially equal to one per AC/c, where c is the average speed of the electron bunches along the electron bunch path. In an embodiment, the radiation source is configured to operate such that eight or nine clearing gaps are present simultaneously on the electron bunch path. In an embodiment, the travel times of electron bunches along each of the distances AC, CE, EG, GZ, ZK, KM, MO and OQ are substantially the same, optionally different by less than +/−ΔL/4, where ΔL is clearing gap duration. In an embodiment, the plurality of LINACs comprise a first LINAC and a second LINAC, arranged such that in operation each electron bunch passes through each of the first and second LINACs at least two times during an acceleration phase and at least two times during a deceleration phase and there is a point (Z) in the path of the electron bunches such that: the distances AC, EG, ZK, and MO are substantially equal; and the distances CE, GZ, KM and OQ are substantially equal, where: AC is a distance along the electron bunch path for an electron bunch in its acceleration phase from the entrance (A) to the first LINAC to the entrance (C) to the second LINAC for a first pass of the electron bunch in its acceleration phase through the first and second LINACs; CE is a distance along the electron bunch path for an electron bunch in its acceleration phase from the entrance (C) to the second LINAC to the entrance (E) to the first LINAC for a second pass of the electron bunch in its acceleration phase through the first LINAC; EG is a distance along the electron bunch path for an electron bunch in its acceleration phase from the entrance (E) to the first LINAC to the entrance (G) to the second LINAC for a second pass of the electron bunch in its acceleration phase through the first and second LINACs; GZ is a distance along the electron bunch path for an electron bunch in its acceleration phase from the entrance (G) to the second LINAC to a point (Z) in the undulator for a second pass of the electron bunch in its acceleration phase through the second LINAC; KM is a distance along the electron bunch path for an electron bunch in its deceleration phase from the entrance (K) to the second LINAC to the entrance (M) to the first LINAC for a first pass of the electron bunch in its deceleration phase through the first and second LINACs; MO is a distance along the electron bunch path for an electron bunch in its deceleration phase from the entrance (M) to the first LINAC to the entrance (O) to the second LINAC for a first pass of the electron bunch in its deceleration phase through the first LINAC; OQ is a distance along the electron bunch path for an electron bunch in its deceleration phase from the entrance (O) to the second LINAC to the entrance (Q) to the first LINAC for a second pass of the electron bunch in its deceleration phase through the first and second LINACs. In an embodiment, the clearing gaps are provided at a repetition rate R, and R or R*n (n is an integer) is substantially equal to c/AE, where c is the average speed of the electron bunches along the electron bunch path. In an embodiment, the travel times of electron bunches along each of the distances AC, EG, ZK, and MO are substantially the same, optionally different by less than +/−ΔL/4, where ΔL is clearing gap duration; and the travel times of electron bunches along each of the distances CE, GZ, KM and OQ are substantially the same, optionally different by less than +/−ΔL/4, where ΔL is clearing gap duration. In an embodiment, each clearing gaps is separated from the next clearing gap in the bunch sequence by a clearing gap repetition period, each clearing gap has a clearing gap duration, and a ratio of the clearing gap duration to a clearing gap repetition period is between 5% and 20%, optionally substantially equal to 10%. In an embodiment, the clearing gaps are provided at a clearing gap repetition rate, and the repetition rate is in the range 0.5 MHz to 5 MHz, optionally substantially equal to 1.5 MHz. In an embodiment, each of the clearing gaps has a duration greater than 10 ns, optionally greater than 100 ns. In an embodiment, the electron bunches have an electron bunch duration in a range 10 fs to 10 ps. In an embodiment, the electron bunches are provided at a bunch repetition rate in a range 100 MHz to 1 GHz.

In an embodiment, the electron bunches follow a bunch path and the length of the bunch path for each of the bunches between the electron source and the exiting of a last of the LINACs by the bunch for a final time is in a range 500 m to 1500 m, optionally around 800 m. In an embodiment, the undulator is configured such that in operation passage of the bunches of electrons through the undulator generates radiation at a wavelength in a range 4 nm to 25 nm. In an embodiment, the electron bunch sequence comprises a periodic electron bunch sequence and the clearing gaps are provided by providing electron bunches with a reduced charge. In an embodiment, the clearing gaps are provided by providing electron bunches with an at least 10 times reduced charge.

In an embodiment, there is provided a lithographic system comprising a radiation source as described herein, a lithographic apparatus arranged to receive radiation from the radiation source and to use the radiation to project a pattern from a patterning device onto a substrate.

In an embodiment, there is provided a method of operation free electron laser (FEL) radiation source that comprises: an electron source for generating bunches of electrons; a plurality of linear accelerators (LINACs) for accelerating and decelerating the bunches of electrons; an undulator configured such that in operation passage of the bunches of electrons through the undulator generates radiation at a desired wavelength; and a plurality of steering units for guiding the bunches of electrons along a desired electron bunch path between the electron source, the plurality of LINACs and the undulator, wherein the method comprises operating the FEL radiation source such that in operation: each electron bunch passes along the electron bunch path from the electron source through each of the plurality of LINACs at least once during an acceleration phase, then passes through the undulator, then passes through the plurality of LINACs at least once during a deceleration phase; passage through the LINACs of electron bunches in their acceleration phase is coordinated with passage through the LINACs of electron bunches in their deceleration phase, to provide for energy recovery operation of the LINACs; and successive pairs of electron bunches are spaced in time by a respective bunch spacing, in accordance with a repeating electron bunch sequence, clearing gaps are provided in the electron bunch sequence for allowing clearing of ions at the undulator; and the method comprises providing the clearing gaps in accordance with a clearing gap sequence such that, for each of the plurality of energy recovery LINACS, and for substantially all of the clearing gaps: for each passage of the clearing gap through the LINAC in an acceleration phase or deceleration phase the clearing gap is coordinated with a further one of the clearing gaps passing through the LINAC in a deceleration phase or acceleration phase thereby to maintain energy recovery operation of the LINAC.

In an embodiment, there is provided a method of producing extreme ultraviolet (EUV) radiation using a free electron laser (FEL), the method comprising: directing a drive laser beam onto a cathode to generate electron bunches; passing the electron bunches to a linear accelerator (LINAC) to accelerate the electron bunches; passing the electron bunches along an electron bunch path through an undulator configured to generate EUV radiation; the method further comprising: removing positively charged ions from the electron bunch path by applying a variation of charge or emittance of the electron bunches within a pre-determined range; wherein the pre-determined range of charge or emittance variation is selected to restrict variation of accelerating gradients in the LINAC.

In an embodiment, the pre-determined range of the variation of charge or emittance of the electron bunches is 10% or less of the charge or emittance of the electron bunches. In an embodiment, a variation is applied to both the charge and the emittance of the electron bunches. In an embodiment, the applied variation is implemented by altering the energy of laser pulses of the drive laser beam which are incident upon the cathode. In an embodiment, altering the energy of laser pulses of the drive laser beam comprises an amplification of noise associated with the drive laser. In an embodiment, a Pockels cell is used to alter the energy of pulses of the drive laser. In an embodiment, the wavefront of pulses produced by the drive laser is varied. In an embodiment, a Pockels cell is used to vary the wavefront of pulses produced by the drive laser. In an embodiment, the temperature of the cathode is varied to apply the variation of emittance of the electron bunches. In an embodiment, a laser incident on the cathode is used to vary the temperature of the cathode.

In an embodiment, there is provided a free electron laser (FEL) extreme ultraviolet (EUV) radiation source comprising a drive laser configured to emit laser pulses, a cathode configured to receive the laser pulses and generate electron bunches, a linear accelerator (LINAC) configured to accelerate the electron bunches, and an undulator configured to receive the electron bunches and output an EUV radiation beam; wherein the FEL further comprises an ion removal apparatus which comprises an electron bunch charge or emittance variation apparatus controlled by a control unit to vary the charge or emittance of the electron bunches within a pre-determined range, the pre-determined range being selected to remove ions from the FEL but restrict variation of accelerating gradients in the LINAC.

In an embodiment, there is provided a free electron laser (FEL) extreme ultraviolet (EUV) radiation source comprising a linear accelerator (LINAC) configured to accelerate electron bunches and an undulator configured to receive the electron bunches and output an EUV radiation beam; wherein the FEL further comprises an RF electromagnetic wave emitter configured to provide an RF evanescent electromagnetic wave or a beating RF electromagnetic wave which extends into a beam pipe of the FEL.

In an embodiment, the RF electromagnetic wave emitter is connected to the beam pipe on one side of an undulator module of the undulator. In an embodiment, extraction electrodes are provided on an opposite side of the undulator module.

In an embodiment, there is provided a method of producing extreme ultraviolet (EUV) radiation using a free electron laser (FEL), the method comprising passing electron bunches to a linear accelerator (LINAC) to accelerate the electron bunches then passing the electron bunches along an electron bunch path through an undulator configured to generate EUV radiation; the method further comprising generating an RF evanescent electromagnetic wave or a beating RF electromagnetic wave which extends into a beam pipe of the FEL and which pushes the ions along the beam pipe.

In an embodiment, the beam pipe into which the RF evanescent electromagnetic wave or beating RF electromagnetic wave extends is located in an undulator module. In an embodiment, the RF evanescent electromagnetic wave or beating RF electromagnetic wave provides an electrical potential which pushes ions towards an opposite end of the undulator module. In an embodiment, extraction electrodes are provided on an opposite side of the undulator module. In an embodiment, the electrical potential has a sufficiently high gradient to remove ions from the free electron laser within around 1 ms.

The term "EUV radiation" may be considered to encompass electromagnetic radiation having a wavelength within the range of 4-20 nm, for example within the range of 13-14 nm. EUV radiation may have a wavelength of less than 10 nm, for example within the range of 4-10 nm such as 6.7 nm or 6.8 nm.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A method of producing extreme ultraviolet (EUV) radiation using a free electron laser (FEL), the method comprising:
    directing a drive laser beam onto a cathode to generate electron bunches;
    passing the electron bunches to a linear accelerator (LINAC) to accelerate the electron bunches;
    passing the electron bunches along an electron bunch path through an undulator configured to generate EUV radiation; and
    removing positively charged ions from the electron bunch path by applying a variation of charge or emittance of the electron bunches within a pre-determined range;
    wherein the pre-determined range of charge or emittance variation is selected to restrict variation of accelerating gradients in the LINAC.

2. The method of claim 1, wherein the pre-determined range of the variation of charge or emittance of the electron bunches is 10% or less of the charge or emittance of the electron bunches.

3. The method of claim 1, wherein a variation is applied to both the charge and the emittance of the electron bunches.

4. The method of claim 1, wherein the applied variation is implemented by altering the energy of laser pulses of the drive laser beam which are incident upon the cathode.

5. The method of claim 4, wherein altering the energy of laser pulses of the drive laser beam comprises an amplification of noise associated with the drive laser.

6. The method of claim 4, wherein a Pockels cell is used to alter the energy of pulses of the drive laser.

7. The method of claim 1, wherein the wavefront of pulses produced by the drive laser is varied.

8. The method of claim 7, wherein a Pockels cell is used to vary the wavefront of pulses produced by the drive laser.

9. The method of claim 1, wherein the temperature of the cathode is varied to apply the variation of emittance of the electron bunches.

10. The method of claim 9, wherein a laser incident on the cathode is used to vary the temperature of the cathode.

11. A free electron laser (FEL) extreme ultraviolet (EUV) radiation source comprising:
    a drive laser configured to emit laser pulses;
    a cathode configured to receive the laser pulses and generate electron bunches;
    a linear accelerator (LINAC) configured to accelerate the electron bunches;
    an undulator configured to receive the electron bunches and output an EUV radiation beam; and
    an ion removal apparatus which comprises an electron bunch charge or emittance variation apparatus controlled by a control unit to vary the charge or emittance of the electron bunches within a pre-determined range, the pre-determined range being selected to remove ions from the FEL but restrict variation of accelerating gradients in the LINAC.

12. A free electron laser (FEL) extreme ultraviolet (EUV) radiation source comprising,
    a linear accelerator (LINAC) configured to accelerate electron bunches;
    an undulator configured to receive the electron bunches and output an EUV radiation beam; and
    an RF electromagnetic wave emitter configured to provide an RF evanescent electromagnetic wave or a beating RF electromagnetic wave which extends into a beam pipe of the FEL.

13. The FEL of claim 12, wherein the RF electromagnetic wave emitter is connected to the beam pipe on one side of an undulator module of the undulator.

14. The FEL of claim 13, wherein extraction electrodes are provided on an opposite side of the undulator module.

15. A method of producing extreme ultraviolet (EUV) radiation using a free electron laser (FEL), the method comprising:
    passing electron bunches to a linear accelerator (LINAC) to accelerate the electron bunches;
    then passing the electron bunches along an electron bunch path through an undulator configured to generate EUV radiation; and
    generating an RF evanescent electromagnetic wave or a beating RF electromagnetic wave which extends into a beam pipe of the FEL and which pushes the ions along the beam pipe.

16. The method of claim 15, wherein the beam pipe into which the RF evanescent electromagnetic wave or beating RF electromagnetic wave extends is located in an undulator module.

17. The method of claim 16, wherein the RF evanescent electromagnetic wave or beating RF electromagnetic wave provides an electrical potential which pushes ions towards an opposite end of the undulator module.

18. The method of claim 17, wherein extraction electrodes are provided on an opposite side of the undulator module.

19. The method of claim 18, wherein the electrical potential has a sufficiently high gradient to remove ions from the free electron laser within around 1 ms.

* * * * *